United States Patent
Chen et al.

(10) Patent No.: US 12,154,251 B2
(45) Date of Patent: Nov. 26, 2024

(54) IMAGE PROCESSING METHOD AND RELATED APPARATUS

(71) Applicant: Huawei Technologies Co., Ltd., Shenzhen (CN)

(72) Inventors: Gang Chen, Beijing (CN); Jiangwei Li, Beijing (CN); Wei Luo, Shanghai (CN); Chunlin Qin, Shenzhen (CN); Zhen Wang, Guangdong (CN); Jing Hu, Beijing (CN); Jinlei Zhang, Shanghai (CN); Zheng Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 17/784,342

(22) PCT Filed: Dec. 14, 2020

(86) PCT No.: PCT/CN2020/136178
§ 371 (c)(1),
(2) Date: Jun. 10, 2022

(87) PCT Pub. No.: WO2021/115483
PCT Pub. Date: Jun. 17, 2021

(65) Prior Publication Data
US 2023/0056332 A1 Feb. 23, 2023

(30) Foreign Application Priority Data

Dec. 13, 2019 (CN) .......................... 201911285717.4
Apr. 29, 2020 (CN) .......................... 202010357077.X
Dec. 11, 2020 (CN) .......................... 202011446454.3

(51) Int. Cl.
*G06K 9/00* (2022.01)
*G06T 3/40* (2006.01)
(Continued)

(52) U.S. Cl.
CPC .................. *G06T 5/50* (2013.01); *G06T 3/40* (2013.01); *G06T 5/73* (2024.01); *G06T 5/77* (2024.01);
(Continued)

(58) Field of Classification Search
None
See application file for complete search history.

(56) References Cited

U.S. PATENT DOCUMENTS 8,682,049 B2    3/2014   Zhao et al.
2012/0328197 A1  12/2012  Sanderson et al.
(Continued)

FOREIGN PATENT DOCUMENTS

CN    106375660 A    2/2017
CN    106447741 A    2/2017
(Continued)

OTHER PUBLICATIONS

Yue et al., "Landmark image super-resolution by retrieving Web images" (Year: 2013).*
(Continued)

*Primary Examiner* — S J Park
(74) *Attorney, Agent, or Firm* — Conley Rose, P.C.

(57) ABSTRACT

An image processing method includes segmenting, by a cloud server and based on a zoom ratio of a high-definition image in a high-definition image library, a low-definition image of a small zoom ratio from a terminal to obtain a plurality of image blocks. For each image block, performing, by the cloud server, retrieval and matching in the high-definition image library to obtain one or more high-definition reference images, and then performing, by the cloud server, image quality improvement using an image enhancement network that is based on the high-definition reference images to obtain a plurality of high-definition
(Continued)

image blocks. Finally, stitching, by the cloud server, the high-definition image blocks into a super-definition image with higher resolution and higher definition, and returning, by the cloud server, the super-definition image to the terminal.

20 Claims, 67 Drawing Sheets

(51) Int. Cl.
*G06T 5/50* (2006.01)
*G06T 5/73* (2024.01)
*G06T 5/77* (2024.01)
*G06V 10/26* (2022.01)
*G06V 10/74* (2022.01)
*G06V 10/75* (2022.01)
*G06V 20/70* (2022.01)

(52) U.S. Cl.
CPC .......... *G06V 10/267* (2022.01); *G06V 10/759* (2022.01); *G06V 10/761* (2022.01); *G06V 20/70* (2022.01); *G06T 2207/20021* (2013.01)

(56) References Cited

U.S. PATENT DOCUMENTS

2017/0316548 A1   11/2017   Zhang et al.
2019/0005305 A1   1/2019   Huang
2023/0056332 A1   2/2023   Chen et al.

FOREIGN PATENT DOCUMENTS

| CN | 106998459 A | 8/2017 |
| CN | 107169928 A | 9/2017 |
| CN | 107507158 A | 12/2017 |
| CN | 107566529 A | 1/2018 |
| CN | 107967669 A | 4/2018 |
| CN | 108419009 A | 8/2018 |
| CN | 108805919 A | 11/2018 |
| CN | 109089040 A | 12/2018 |
| CN | 109302600 A | 2/2019 |
| WO | 2021115483 A1 | 6/2021 |

OTHER PUBLICATIONS

Huang Quanliang et al, Single image super-resolution combined with learning algorithm, Nov. 2013, 9 pages (with an English translation).

Libin Sun et al., "Super-resolution from Internet-scale Scene Matching," Apr. 2012, 12 pages.

Shen, H., "Structural-Correlated Self-Examples Based Superresolution of Single Remote Sensing Image," IEEE Journal of Selected Topics in Applied Earth Observations and Remote Sensing, IEEE, USA, vol. 11, No. 9, Sep. 2018, 15 pages.

* cited by examiner

Before cloud enhancement

After cloud enhancement

Local image before cloud enhancement

Local image after cloud enhancement

High-definition reference image 2331

High-definition image block 2332

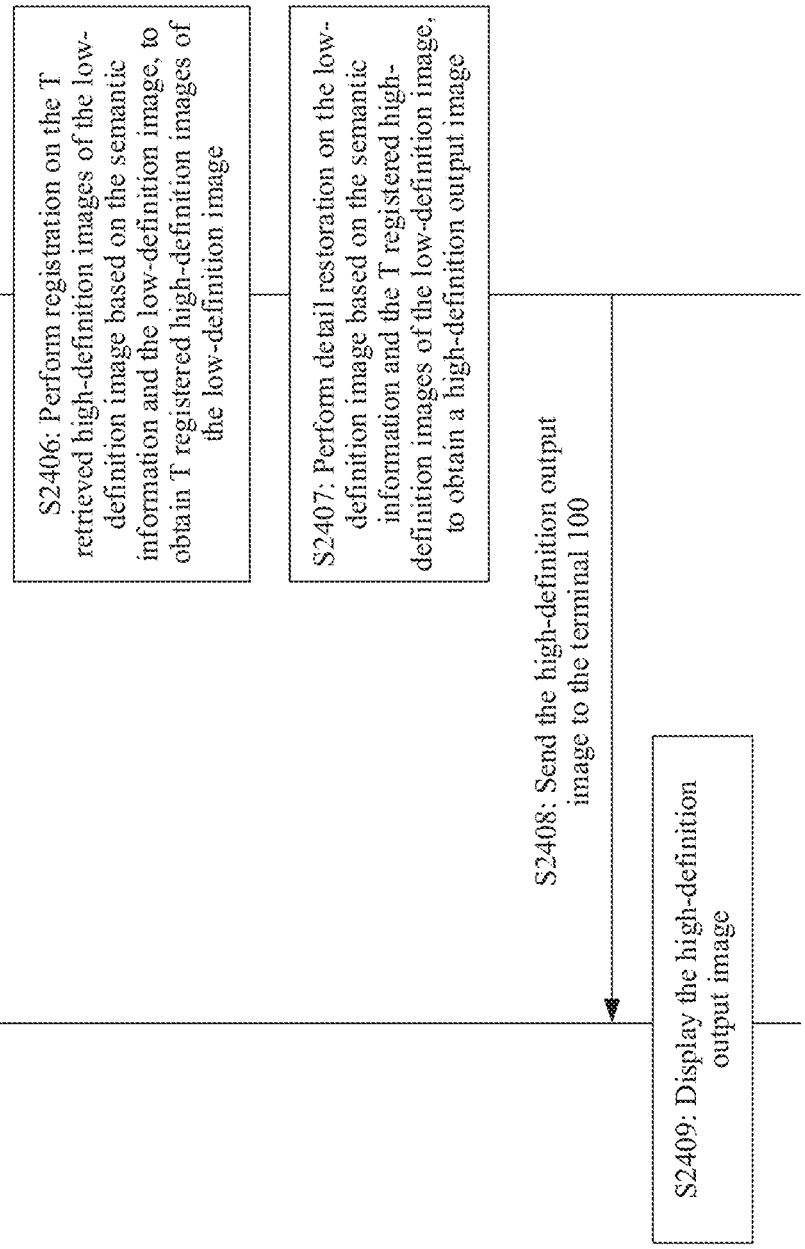

IMAGE PROCESSING METHOD AND RELATED APPARATUS

CROSS-REFERENCE TO RELATED APPLICATIONS

This is a U.S. National Stage of International Patent Application No. PCT/CN2020/136178 filed on Dec. 14, 2020, which claims priority to Chinese Patent Application Ser. No. 20/191,1285717.4 filed on Dec. 13, 2019, Chinese Patent Application No. 202010357077. X filed on Apr. 29, 2020, and Chinese Patent Application No. 202011446454.3 filed on Dec. 11, 2020. All of the aforementioned applications are hereby incorporated by reference in their entireties.

TECHNICAL FIELD

This application relates to the field of computer vision, and in particular, to an image processing method and a related apparatus.

BACKGROUND

With development of smartphones, photographing has become one of the most important features of the smartphones. Both a basic imaging component and an imaging algorithm are greatly developed and changed. This has promoted repeated changes in photographing of mobile phones and improved photographing experience of users. However, as the repeated changes occur, costs of components also become higher, and imaging quality is getting closer to a bottleneck.

In an existing solution, to improve quality of an image photographed by a terminal, after a camera obtains a photographed image, the terminal usually generates image data by using an image signal processor (image signal processing, ISP), and processes and optimizes the image data by using a preset algorithm, to improve an image effect. However, because the terminal processes images by using a fixed algorithm, processed images are of a same style. In addition, because of a limitation of a capability of the terminal, quality of processed images is low. In addition, different scenes present different styles. For example, historic sites such as the Forbidden City, Beijing present a style of ancient charm, and urban attractions such as the Bund, Shanghai present a metropolitan style. A same scene also presents different styles in different environments. For example, the Forbidden City in summer and the Forbidden City in winter also present different styles. For a camera operator, each style has corresponding image parameters such as definition, color richness, contrast, white balance, details, and texture. In the existing solution, a method for improving quality of a photographed image by the terminal is quite limited, and imaging quality is low.

SUMMARY

This application provides an image processing method and a related apparatus, to equip a terminal with a photographing and imaging system by combining a cloud server and the terminal and fully using high-quality image data and an algorithm, so that the terminal can break through an imaging quality limit of the terminal, and a common camera can also achieve a same effect as a professional digital single-lens reflex camera, thereby greatly improving quality of an image photographed by the terminal and photographing experience of a user while reducing costs of the mobile phone.

According to a first aspect, this application provides an image processing method. The method includes: A cloud server obtains a low-definition image that is sent by a terminal and photographing information that is used for photographing the low-definition image and that is sent by the terminal. The photographing information includes a zoom ratio of the low-definition image. The cloud server identifies semantic information of the low-definition image. The cloud server determines a quantity N of image blocks based on a zoom ratio of a high-definition image in a high-definition image library and the zoom ratio of the low-definition image. N is a positive integer. The cloud server segments the low-definition image into N image blocks based on the quantity N of image blocks, and marks a type of image content in each of the N image blocks based on the semantic information of the low-definition image. The cloud server retrieves, from the high-definition image library, T retrieved high-definition images matching photographed content of a first-type image block. T is a positive integer. The cloud server performs detail restoration on the first-type image block based on the T retrieved high-definition images, to obtain a first-type high-definition image block. Resolution of the first-type high-definition image block is greater than that of the first-type image block. The cloud server replaces the first-type image block in the low-definition image based on the first-type high-definition image block, to obtain a high-definition output image, and sends the high-definition output image to the terminal.

In a possible implementation, the photographing information of the low-definition image further includes one or more of the following: geographic location information, weather information, season information, time information, a photographing parameter, and photographing posture information.

In a possible implementation, that the cloud server retrieves, from the high-definition image library, T retrieved high-definition images matching photographed content of a first-type image block specifically includes: The cloud server determines at least one first matched image from the high-definition image library based on the photographing information of the low-definition image. A degree of matching between photographing information of the first matched image and the photographing information of the low-definition image is greater than a first threshold, and resolution of the first matched image is greater than that of the low-definition image. The cloud server separately obtains a first feature corresponding to each of the at least one first matched image and a first feature corresponding to the first-type image block. One first matched image corresponds to one first feature. The cloud server determines, from the at least one first matched image based on a similarity between the first feature corresponding to each of the at least one first matched image and the first feature corresponding to the first image block, T retrieved high-definition images whose photographed content is most similar to photographed content of the first-type image block.

In a possible implementation, that the cloud server determines, from the at least one first matched image based on a similarity between the first feature corresponding to each of the at least one first matched image and the first feature corresponding to the first-type image block, T retrieved high-definition images whose photographed content is most similar to photographed content of the first-type image block specifically includes: The cloud server determines, based on the similarity between the first feature corresponding to each of the at least one first matched image and the first feature corresponding to the first-type image block, at least one second matched image whose first feature is most similar to the first feature of the first-type image block. The cloud server separately obtains a second feature corresponding to each of the at least one second matched image and a second feature corresponding to the first-type image block. One second matched image corresponds to one second feature. The cloud server determines, based on a similarity between the second feature corresponding to each of the at least one second matched image and the second feature corresponding to the first-type image block, T retrieved high-definition images whose second features are most similar to the second feature of the first-type image block. The second feature is finer than the first feature.

In a possible implementation, that the cloud server performs detail restoration on the first-type image block based on the T retrieved high-definition images, to obtain a first-type high-definition image block specifically includes: The cloud server obtains an image spatial coordinate transformation parameter between the first-type image block and each of the T retrieved high-definition images. The cloud server adjusts, based on the image spatial coordinate transformation parameter of matched feature point pairs in the first-type image block and each of the T retrieved high-definition images, a feature point that is in each retrieved high-definition image and that matches a feature point in the first-type image block to a same location as that in the first-type image block, to obtain T registered high-definition images. The cloud server performs detail restoration on the first-type image block based on the T registered high-definition images, to obtain the first-type high-definition image block.

In a possible implementation, that the cloud server performs detail restoration on the first-type image block based on the T registered high-definition images, to obtain the first-type high-definition image block specifically includes: The cloud server determines, from the T registered high-definition images based on the image spatial coordinate transformation parameter of the matched feature point pairs in the first-type image block and each of the T retrieved high-definition images, L high-definition reference images for which image spatial locations of matched feature point pairs are most similar. L is a positive integer. The cloud server performs detail restoration on the first-type image block based on the L high-definition reference images, to obtain the first-type high-definition image block.

In a possible implementation, that the cloud server replaces the first-type image block in the low-definition image based on the first-type high-definition image block, to obtain a high-definition output image specifically includes: When the low-definition image includes only first-type image blocks, the cloud server stitches first-type high-definition image blocks into the high-definition output image; or when the low-definition image includes a first-type image block and a second-type image block, the cloud server stitches a first-type high-definition image block and a second-type high-definition image block into the high-definition output image.

In a possible implementation, before the cloud server segments the low-definition image into N image blocks based on the quantity N of image blocks, the method further includes: The cloud server determines, based on the photographing information of the low-definition image, a first image processing model corresponding to the environment information. The cloud server processes the low-definition image by using the first processing model. That the cloud server segments the low-definition image into N image blocks based on the quantity N of image blocks specifically includes: The cloud server segments the low-definition image processed by using the first image processing model into the N image blocks based on the quantity N of image blocks.

In a possible implementation, that the cloud server processes the low-definition image by using the first processing model specifically includes: The cloud server processes detail definition and/or a dynamic range and/or contrast and/or noise and/or a color of the low-definition image by using the first image processing model.

According to the image processing method provided in this application, a low-definition image of a small zoom ratio (namely, a large field of view) that is photographed on the terminal is sent to the cloud server by using the high-definition image database on the cloud server. The cloud server segments the low-definition image of the small zoom ratio based on a zoom ratio of a high-definition image in the high-definition image library, to obtain a plurality of image blocks. For each image block, the cloud server may perform retrieval and matching in the high-definition image library to obtain one or more high-definition reference images, and then perform image quality improvement by using an image enhancement network that is based on the high-definition reference images, to obtain a plurality of high-definition image blocks. Finally, the cloud server stitches the plurality of high-definition image blocks into a super-definition image with higher resolution and higher definition, and returns the super-definition image to the terminal. In this way, with use of a processing capability of the cloud server, a photographed image obtained when the terminal photographs an image or a video not only has a relatively large field of view, but also has rich details and texture and definition that can be achieved in a case of a large zoom ratio.

According to a second aspect, this application provides an image processing method, applied to an image processing system. The image processing system includes a terminal and a cloud server. The method includes: The terminal receives a first input of a user. In response to the first input, the terminal obtains a first image and first environment information of photographing the first image. The terminal sends the first environment information to the cloud server. The cloud server determines, based on the first environment information, a first image processing model corresponding to the environment information. The first image processing model is used to improve image quality. The cloud server sends the first image processing model to the terminal. The terminal processes the first image by using the first image processing model, to obtain a second image.

According to the image processing method provided in this application, the terminal can be equipped with a photographing and imaging system by combining processing capabilities of the terminal and the cloud server and fully using high-quality image data and an image processing algorithm on the cloud server. The cloud server may obtain, through matching by using an image and environment information (for example, geographic location information, weather information, time information, a photographing parameter, or photographing posture information) of the image that are uploaded by the terminal, an image processing algorithm suitable for the image and high-quality image data that has same photographed content as the image and has a similar photographing environment to the image. Quality and an effect of the image uploaded by the terminal can be improved by using the image processing algorithm and the high-quality image data. In this way, images photographed in different environments can present different styles and effects. In addition, the terminal can break through an imaging quality limit of the terminal, so that a common camera on the terminal can also achieve an effect of a professional digital single-lens reflex device, thereby greatly improving photographing quality of the terminal and photographing experience of the user while reducing costs of the mobile phone.

In a possible implementation, before the terminal receives the first input of the user, the method further includes: The terminal displays a photographing interface. The photographing interface is used to display a preview image, and the photographing interface includes a photograph control. The first input is an operation performed by the user on the photograph control, and the first image is the preview image in the photographing interface. In this way, when the user performs photographing, an image photographed by the terminal can be optimized and enhanced by using a processing capability of the cloud server, so that imaging quality of performing photographing by the terminal is improved.

In a possible implementation, before the terminal receives the first input of the user, the method further includes: The terminal displays a cloud enhancement interface in a gallery application. The cloud enhancement interface displays and includes a thumbnail corresponding to the first image and an upload control. The first input is an operation performed by the user on the upload control. That the terminal obtains a first image and first environment information of the first image specifically includes: The terminal obtains the first image from local storage. The terminal obtains the first environment information from exchangeable image file format Exif data of the first image. In this way, after the user selects a to-be-optimized image from the gallery, the image can be optimized and enhanced by using a processing capability of the cloud server, so that quality and an effect of the image saved on the terminal are improved.

In a possible implementation, the method further includes: The cloud server sends the first image to the cloud server. The cloud server determines a first high-definition image based on the first environment information. A similarity between second environment information of the first high-definition image and the first environment information falls within a first preset range, and a similarity between photographed content of the first high-definition image and photographed content of the first image falls within a second preset range. The cloud server performs image registration on the first image and the first high-definition image to obtain a second high-definition image. The cloud server sends the second high-definition image to the terminal. The terminal performs image fusion on the second high-definition image and the second image to obtain a third image. Definition of the third image is greater than definition of the second image. In this way, the first image can be optimized by using a specific image processing model for a specific photographing environment, so that image quality is improved.

In a possible implementation, that the cloud server determines a first high-definition image based on the first environment information specifically includes: The cloud server retrieves the first high-definition image from a high-definition image library based on the first environment information. The high-definition image library stores a plurality of high-definition images and second environment information respectively corresponding to the plurality of high-definition images.

In a possible implementation, that the cloud server determines a first high-definition image based on the first environment information specifically includes: The cloud server renders, by using a rendering engine, the first high-definition image from a three-dimensional world model based on the first environment information.

In a possible implementation, that the terminal performs image fusion on the second high-definition image and the second image to obtain a third image specifically includes: The terminal extracts feature information of the second high-definition image, and fusing the feature information into the second image to obtain the third image. The feature information includes high-definition details and high-frequency information.

In a possible implementation, that the terminal processes quality of the first image by using the first image processing model, to obtain a second image specifically includes: The terminal processes detail definition and/or a dynamic range and/or contrast and/or noise and/or a color of the first image by using the first image processing model, to obtain the second image.

In a possible implementation, after the terminal obtains the second image, the method further includes: The terminal displays the second image.

In a possible implementation, after the terminal obtains the third image, the method further includes: The terminal displays the third image.

In a possible implementation, the first environment information includes one or more of the following: geographic location information, weather information, season information, time information, a photographing parameter, photographing posture information, and the like.

According to a third aspect, this application provides an image processing method, applied to an image processing system. The image processing system includes a terminal and a cloud server. The method includes: The terminal receives a first input of a user. In response to the first input, the terminal obtains a first image and first environment information of the first image. The terminal sends the first image and the first environment information to the cloud server. The cloud server determines a first high-definition image based on the first environment information and the first image. A similarity between environment information of the first high-definition image and the first environment information falls within a first preset range, and a similarity between photographed content of the first high-definition image and photographed content of the first image falls within a second preset range. The cloud server performs image registration on the first high-definition image based on the first image, to obtain a second high-definition image. The cloud server sends the second high-definition image to the terminal. The terminal performs image fusion on the second high-definition image and the first image to obtain a third image. Definition of the third image is greater than definition of the first image.

According to the image processing method provided in this application, the terminal can be equipped with a photographing and imaging system by combining processing capabilities of the terminal and the cloud server and fully using high-quality image data and an image processing algorithm on the cloud server. The cloud server may obtain, through matching by using an image and environment information (for example, geographic location information, weather information, time information, a photographing parameter, or photographing posture information) of the image that are uploaded by the terminal, an image processing algorithm suitable for the image and high-quality image data that has same photographed content as the image and has a similar photographing environment to the image. Quality and an effect of the image uploaded by the terminal can be improved by using the image processing algorithm and the high-quality image data. In this way, images photographed in different environments can present different styles and effects. In addition, the terminal can break through an imaging quality limit of the terminal, so that a common camera on the terminal can also achieve an effect of a professional digital single-lens reflex device, thereby greatly improving photographing quality of the terminal and photographing experience of the user while reducing costs of the mobile phone.

In a possible implementation, before the terminal receives the first input of the user, the method further includes: The terminal displays a photographing interface. The photographing interface is used to display a preview image, and the photographing interface includes a photograph control. The first input is an operation performed by the user on the photograph control, and the first image is the preview image in the photographing interface. In this way, when the user performs photographing, an image photographed by the terminal can be optimized and enhanced by using a processing capability of the cloud server, so that imaging quality of performing photographing by the terminal is improved.

In a possible implementation, before the terminal receives the first input of the user, the method further includes: The terminal displays a cloud enhancement interface in a gallery application. The cloud enhancement interface displays and includes a thumbnail corresponding to the first image and an upload control. The first input is an operation performed by the user on the upload control. That the terminal obtains a first image and first environment information of the first image specifically includes: The terminal obtains the first image from local storage. The terminal obtains the first environment information from exchangeable image file format Exif data of the first image. In this way, after the user selects a to-be-optimized image from the gallery, the image can be optimized and enhanced by using a processing capability of the cloud server, so that quality and an effect of the image saved on the terminal are improved.

In a possible implementation, before the terminal performs image fusion on the second high-definition image and the first image to obtain the third image, the method further includes: The cloud server determines, based on the first environment information, a first image processing model corresponding to the first environment information. The first image processing model is used to improve image quality. The cloud server sends the first image processing model to the terminal. The terminal processes the first image by using the first image processing model. That the terminal performs image fusion on the second high-definition image and the first image to obtain a third image specifically includes: The terminal performs image fusion on the second high-definition image and the first image processed by using the first image processing model, to obtain the third image. In this way, the first image can be optimized by using a high-definition image in a same photographing environment on the cloud server, so that detail definition and the like of the image are improved.

In a possible implementation, that the cloud server determines a first high-definition image based on the first environment information specifically includes: The cloud server retrieves the first high-definition image from a high-definition image library based on the first environment information. The high-definition image library stores a plurality of high-definition images and second environment information respectively corresponding to the plurality of high-definition images.

In a possible implementation, that the cloud server determines a first high-definition image based on the first environment information specifically includes: The cloud server renders, by using a rendering engine, the first high-definition image from a three-dimensional world model based on the first environment information.

In a possible implementation, that the terminal performs image fusion on the second high-definition image and the second image to obtain a third image specifically includes: The terminal extracts feature information of the second high-definition image, and fusing the feature information into the second image to obtain the third image. The feature information includes high-definition details.

In a possible implementation, that the terminal processes the first image by using the first image processing model specifically includes: The terminal processes detail definition and/or a dynamic range and/or contrast and/or noise and/or a color of the first image by using the first image processing model.

In a possible implementation, after the terminal obtains the third image, the method further includes: The terminal displays the third image.

In a possible implementation, the first environment information includes one or more of the following: geographic location information, weather information, season information, time information, a photographing parameter, photographing posture information, and the like.

According to a fourth aspect, this application provides an image processing method, applied to an image processing system. The image processing system includes a terminal and a cloud server. The method includes: The terminal receives a first input of a user. In response to the first input, the terminal obtains a first image and first environment information of the first image. The terminal sends the first image and the first environment information to the cloud server. The cloud server determines, based on the first environment information, a first image processing model corresponding to the first environment information. The first image processing model is used to improve image quality. The cloud server processes quality of the first image by using the first image processing model, to obtain a second image. The cloud server sends the second image to the terminal.

In a possible implementation, the method further includes: The cloud server determines a first high-definition image based on the first environment information. A similarity between second environment information of the first high-definition image and the first environment information falls within a second preset range, and a similarity between photographed content of the first high-definition image and photographed content of the first image falls within a second preset range. The cloud server performs image registration on the first high-definition image based on the first image, to obtain a second high-definition image. The cloud server performs image fusion on the second high-definition image and the second image to obtain a third image. The cloud server sends the third image to the terminal.

According to a fifth aspect, this application provides an image processing method, applied to an image processing system. The image processing system includes a terminal and a cloud server. The method includes: The terminal receives a first input of a user. In response to the first input, the terminal obtains a first image and first environment information of the first image. The terminal sends the first image and the first environment information to the cloud server. The cloud server determines a first high-definition image based on the first environment information. A similarity between second environment information of the first high-definition image and the first environment information falls within a first preset range, and a similarity between photographed content of the first high-definition image and photographed content of the first image falls within a second preset range. The cloud server performs image registration on the first high-definition image based on the first image, to obtain a second high-definition image. The cloud server performs image fusion on the second high-definition image and the first image to obtain a third image. Definition of the third image is greater than definition of the first image. The cloud server sends the third image to the terminal.

In a possible implementation, before the server performs image fusion on the second high-definition image and the first image to obtain the third image, the method further includes: The cloud server determines, based on the first environment information, a first image processing model corresponding to the first environment information. The first image processing model is used to improve image quality. The cloud server processes the first image by using the first image processing model.

According to a sixth aspect, an embodiment of this application provides an image processing method. The method may be performed by a terminal or a cloud server, and the image processing method may include: obtaining an image A photographed by the terminal and photographing information of the image A. Optionally, if the method is performed by the cloud server, the terminal may send the photographed image A and the photographing information of the image A to the cloud server, and the cloud server receives the image A and the photographing information of the image A.

Further, at least one image B is determined based on the photographing information of the image A. A degree of matching between photographing information of each of the at least one image B and the photographing information of the image A is greater than a first threshold. Resolution of each of the at least one image B is greater than that of the image A. For example, the at least one image B is a high-definition image, and the image A is a low-definition image.

Optionally, the terminal may send the photographing information of the image A to the cloud server. The cloud server selects the at least one image B from a high-definition image library, and sends the at least one image B to the terminal. The terminal determines, from the at least one image B, a reference image 1 whose photographed content is most similar to photographed content of the image A.

Alternatively, the terminal may send the image A and the photographing information of the image A to the cloud server. The cloud server selects the at least one image B from a high-definition image library, and determines, from the at least one image B, a reference image 1 whose photographed content is most similar to photographed content of the image A.

In this embodiment of this application, the at least one image B is determined by using the photographing information of the image A, and then the reference image 1 whose photographed content is most similar to the photographed content of the image A is determined from the at least one image B, in other words, a retrieval range may be first narrowed by using the photographing information of the image A, so that image retrieval efficiency is improved.

With reference to the sixth aspect, in some embodiments, the photographing information may include one or more of the following information: a photographing ratio, photographing geographic location information, photographing weather condition information, and the like. The photographing ratio may be a magnification ratio. The photographing geographic location information may be geographic location information of a photographing device when the photographing device photographs the image A or the image B, and the geographic location information may be defined by using global positioning system (global positioning system, GPS) information. The photographing weather condition information may be a weather condition, for example, a sunny day, a cloudy day, or a rainy day, when the image A or the image B is photographed.

Optionally, when the photographing information includes photographing geographic location information, a degree of matching between photographing geographic location information of each of the at least one image B and photographing geographic location information of the image A is greater than a first threshold. Consistency of photographing geographic locations of the image A and the at least one image B can be ensured by matching the geographic location information. Finally, the reference image 1 whose photographed content is most similar to the photographed content of the image A is determined from the at least one image B. The photographed content of the reference image 1 is highly similar to the photographed content of the image A, and a photographing angle (namely, photographing geographic location information) of the reference image 1 is also highly consistent with a photographing angle of the image A.

Optionally, when the photographing information includes a photographing ratio, a degree of matching between a photographing ratio of each of the at least one image B and a photographing ratio of the image A is greater than a first threshold, so that it can be ensured that magnification ratios of the image A and the at least one image B do not differ greatly.

Optionally, when the photographing information includes photographing weather condition information, a degree of matching between photographing weather condition information of each of the at least one image B and photographing weather condition information of the image A is greater than a first threshold, for example, both the image A and the image B are photographed on a sunny day or a rainy day, so that consistency of image transparency can be ensured.

With reference to the sixth aspect, in some embodiments, detail restoration processing is performed on the image A based on the reference image 1, to obtain an image C. Resolution of the obtained image C is greater than the resolution of the image A, in other words, definition of the image C is greater than definition of the image A.

Optionally, the reference image 1 and the image A may be input into a deep learning neural network, high-frequency information of the reference image 1 may be extracted by using the deep learning neural network and detail restoration may be performed on the image A by using the high-frequency information, to obtain the image C with higher definition.

With reference to the sixth aspect, in some embodiments, the determining, from the at least one image B, a reference image 1 whose photographed content is most similar to photographed content of the image A may include: separately obtaining a first feature corresponding to each of the at least one image B and a first feature corresponding to the image A. Each image B corresponds to one first feature.

The first feature corresponding to each of the at least one image B may be extracted by using a retrieval network, and the first feature corresponding to the image A may also be extracted by using the retrieval network. The first feature includes but is not limited to a CNN feature. Correspondingly, the retrieval network may be a CNN network.

A similarity between the first feature corresponding to each of the at least one image B and the first feature corresponding to the image A is calculated, and M images B whose photographed content is most similar to the photographed content of the image A are determined from the at least one image B. M is an integer greater than or equal to 1. For example, M may be 15, in other words, 15 images B whose photographed content is most similar to the photographed content of the image A are selected from the at least one image B.

Similarities between first features corresponding to all images B and the first feature corresponding to the image A may be sorted, so that the M images B that are most similar to the image A are obtained.

Further, the reference image 1 whose photographed content is most similar to the photographed content of the image A is determined from the M images B. For example, the reference image 1 may be obtained by performing matching by using a finer feature.

In this embodiment, a retrieval range is gradually narrowed to obtain the reference image 1 whose photographed content is most similar to the photographed content of the image A, so that retrieval efficiency is improved, consistency of the photographed content of the retrieved reference image 1 and the image A can be further ensured.

With reference to the sixth aspect, in some embodiments, the determining, from the M images B, the reference image 1 whose photographed content is most similar to the photographed content of the image A includes: separately obtaining a second feature corresponding to each of the M images B and a second feature corresponding to the image A. Each image B corresponds to one second feature.

The second feature corresponding to each of the M images B may be extracted by using a resorting network, and the second feature corresponding to the image A may also be extracted by using the resorting network. The resorting network may be a feature extraction network that is more complex than the retrieval network. The second feature extracted by using the resorting network may be an image feature that is finer than the first feature extracted by using the retrieval network. For example, the second feature better represents a detail feature of an image than the first feature.

A similarity between the second feature corresponding to each of the M images B and the second feature corresponding to the image A is calculated, and an image B whose photographed content is most similar to the photographed content of the image A is determined from the M images B as the reference image 1.

Similarities between second features corresponding to all images B and the second feature corresponding to the image A may be sorted, so that the most similar image B is used as the reference image 1.

It may be understood that a result of sorting the similarities between the first features corresponding to all the images B and the first feature corresponding to the image A may be different from a result of sorting the similarities between the second features corresponding to all the images B and the second feature corresponding to the image A.

In this embodiment, because the retrieval network is simpler than the resorting network, retrieval efficiency is also higher. In this embodiment of this application, matching is first performed by using the first features extracted by using the retrieval network, to obtain, from at least one image B, the M images B that are approximately similar to the image A, and then matching is performed by using the second features extracted by using the resorting network, to obtain the most similar reference image 1 from the M images B, so that retrieval accuracy can be improved while retrieval efficiency is ensured.

With reference to the sixth aspect, in some embodiments, before detail restoration processing is performed on the image A based on the reference image 1, the method further includes: determining a proportion of the photographed content of the reference image 1 in the photographed content of the image A. The proportion can reflect whether the photographed content included in the retrieved reference image 1 covers the photographed content included in the entire image A.

If the proportion of the photographed content of the reference image 1 in the photographed content of the image A is less than a second threshold, photographed content matching the photographed content of the reference image 1 is removed from the photographed content of the image A to obtain an image A obtained after the removal. The second threshold may be set as actually required. For example, the second threshold may be set to 80%. If the proportion of the photographed content of the reference image 1 in the photographed content of the image A is less than 80%, it indicates that the photographed content included in the reference image 1 does not cover the photographed content included in the entire image A. and photographed content, namely, the image A obtained after the removal, other than the photographed content included in the reference image 1 may be further retrieved from the photographed content included in the image A.

Further, a reference image 2 whose photographed content is most similar to photographed content of the image A obtained after the removal is determined from the at least one image B.

For a method for determining, from the at least one image B, the reference image 2 whose photographed content is most similar to the photographed content of the image A obtained after the removal, refer to the method for determining the reference image 1 in the foregoing embodiment. Details are not described herein again.

After the reference image 1 and the reference image 2 are obtained, detail restoration processing may be performed on the image A based on the reference image 1 and the reference image 2, to obtain the image C.

It may be understood that after the reference image 1 and the reference image 2 are obtained, a proportion of the photographed content of the reference image 1 and the photographed content of the reference image 2 in the photographed content of the image A may be further determined. If the proportion is still less than the second threshold, photographed content matching the photographed content of the reference image 1 and the photographed content of the reference image 2 may be further removed from the photographed content of the image A to obtain an image A obtained after the removal, and a reference image 3 whose photographed content is most similar to photographed content of the image A obtained after the removal is further retrieved from the at least one image B. The process is repeated until a proportion of photographed content of at least one obtained reference image in the photographed content of the image A is greater than or equal to the second threshold, and then detail restoration processing is performed on the image A based on the at least one obtained reference image, to obtain the image C with higher resolution.

According to a seventh aspect, an embodiment of this application provides an image processing apparatus, including modules or units configured to perform the method in the fifth aspect.

According to an eighth aspect, an embodiment of this application provides an image processing system. The system includes a terminal and a cloud server. The first terminal sends a photographed image A and photographing information of the image A to the cloud server, and the cloud server receives the image A and the photographing information of the image A. and determines at least one image B based on the photographing information of the image A. A degree of matching between photographing information of the image B and the photographing information of the image A is greater than a first threshold, and resolution of the image B is greater than that of the image A. The cloud server determines, from the at least one image B, a reference image 1 whose photographed content is most similar to photographed content of the image A.

Optionally, the cloud server performs detail restoration processing on the image A based on the reference image 1, to obtain an image C, where resolution of the image C is greater than the resolution of the image A. and sends the image C to the terminal.

The terminal receives the image C, and displays the image C.

According to a ninth aspect, an embodiment of this application provides an image processing system. The system includes a terminal and a cloud server. The first terminal sends a photographed image A and photographing information of the image A to the cloud server, and the cloud server receives the image A and the photographing information of the image A, and determines at least one image B based on the photographing information of the image A. A degree of matching between photographing information of the image B and the photographing information of the image A is greater than a first threshold, and resolution of the image B is greater than that of the image A. The cloud server sends the at least one image B to the terminal device.

The terminal device determines, from the at least one image B, a reference image 1 whose photographed content is most similar to photographed content of the image A.

Optionally, the terminal device performs detail restoration processing on the image A based on the reference image 1, to obtain an image C, and outputs the image C. Resolution of the image C is greater than the resolution of the image A.

According to a tenth aspect, this application provides a terminal, including a camera, a transceiver, one or more processors, and one or more memories. The one or more processors are coupled to the camera, the one or more memories, and the transceiver. The one or more memories are configured to store computer program code. The computer program code includes computer instructions. When the one or more processors execute the computer instructions, the terminal is enabled to perform the image processing method in any one of possible implementations of any one of the foregoing aspects.

According to an eleventh aspect, this application provides a cloud server, including a transceiver, one or more processors, and one or more memories. The one or more memories are coupled to the one or more processors. The one or more memories are configured to store computer program code. The computer program code includes computer instructions. When the one or more processors execute the computer instructions, the cloud server is enabled to perform the image processing method in any one of possible implementations of any one of the foregoing aspects.

According to a twelfth aspect, an embodiment of this application provides a computer storage medium, including computer instructions. When the computer instructions run on a terminal, the terminal is enabled to perform the image processing method in any one of possible implementations of any one of the foregoing aspects.

According to a thirteenth aspect, an embodiment of this application provides a computer storage medium, including computer instructions. When the computer instructions run on a cloud server, the cloud server is enabled to perform the image processing method in any one of possible implementations of any one of the foregoing aspects.

According to a fourteenth aspect, an embodiment of this application provides a computer program product. When the computer program product runs on a terminal, the terminal is enabled to perform the image processing method in any one of possible implementations of any one of the foregoing aspects.

According to a fifteenth aspect, an embodiment of this application provides a computer program product. When the computer program product runs on a cloud server, the cloud server is enabled to perform the image processing method in any one of possible implementations of any one of the foregoing aspects.

BRIEF DESCRIPTION OF DRAWINGS

FIG. 24A and FIG. 24B are a schematic flowchart of another image processing method according to an embodiment of this application;

DESCRIPTION OF EMBODIMENTS

The following clearly describes the technical solutions in embodiments of this application in detail with reference to the accompanying drawings. In descriptions of embodiments of this application, unless otherwise specified, "/" indicates "or". For example, A/B may indicate A or B. A term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

Terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following describes a communications system 10 in embodiments of this application.

Figure 1:
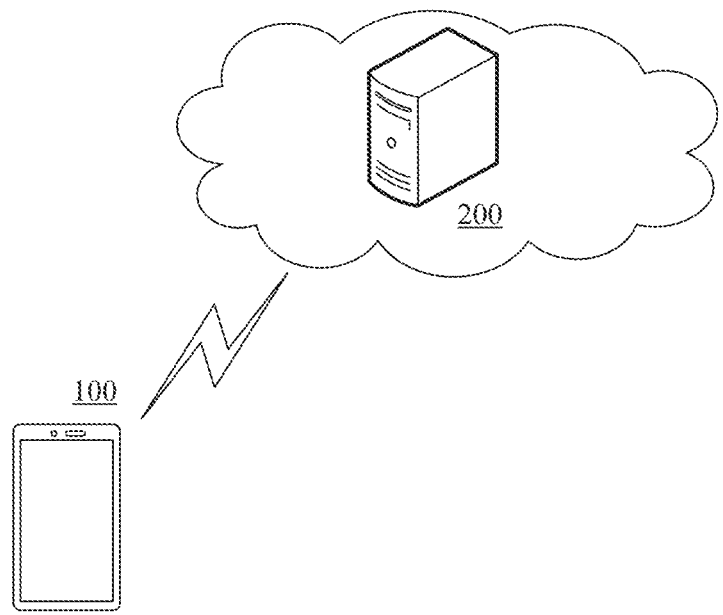
FIG. 1 is a schematic diagram of an architecture of a communications system according to an embodiment of this application.

FIG. 1 is a schematic diagram of an architecture of a communications system 10 according to an embodiment of this application. The communications system 10 may include a terminal 100 and a cloud server 200. The terminal 100 may be a device such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/a virtual reality (virtual reality, VR) device. A specific type of the terminal 100 is not specially limited in this embodiment of this application.

The terminal 100 may be connected to the cloud server 200 by using a 2G network, a 3G network, a 4G network, a 5G network, a wireless local area network (wireless local area network, WLAN), or the like. The terminal 100 may send image data and environment information (for example, geographic location information, photographing posture information of a photographing device, photographing time information, or weather information) of the image data to the cloud server 200. The cloud server 200 may send an image processing network model, high-definition image data, and the like to the terminal 100.

The cloud server 200 may establish connections to a plurality of terminals 100, and may independently process processing tasks requested by the plurality of terminals 100. The cloud server 200 may distinguish between the terminals by using accounts (for example, Huawei accounts) with which users log in to the terminals.

Figure 2A:
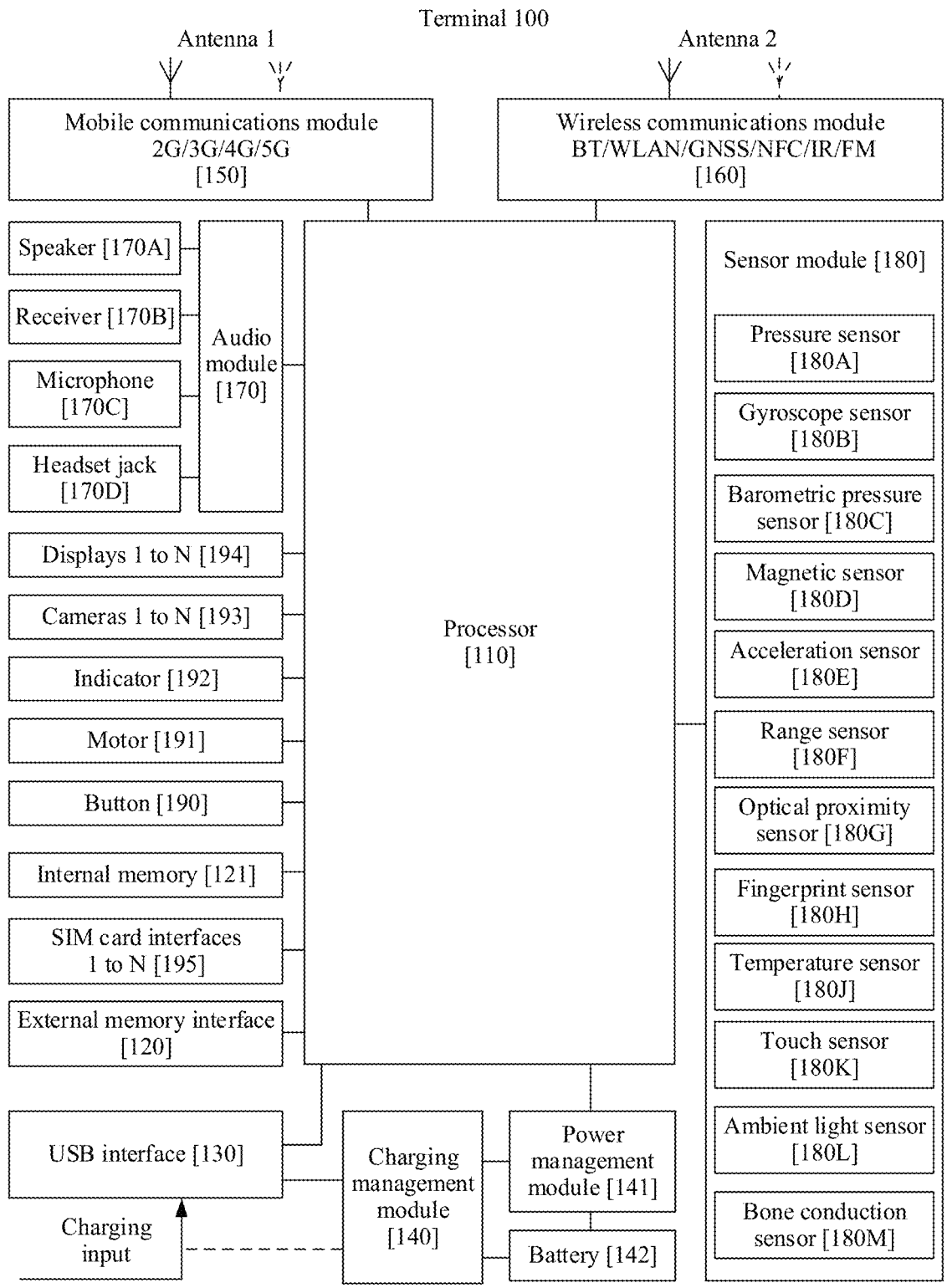
FIG. 2A is a schematic diagram of a structure of a terminal according to an embodiment of this application.

FIG. 2A is a schematic diagram of a structure of the terminal 100.

The terminal 100 is used as an example below to describe embodiments in detail. It should be understood that the terminal 100 shown in FIG. 2A is merely an example. In addition, the terminal 100 may have more or fewer components than those shown in FIG. 2A, or may combine two or more components, or may have different component configurations. Various components shown in the figure may be implemented by using hardware that includes one or more signal processing and/or application-specific integrated circuits, software, or a combination of hardware and software.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the terminal 100. In some other embodiments of this application, the terminal 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural network processing unit (neural network processing unit, NPU), and/or the like. Different processing units may be independent components, or may be integrated into one or more processors.

The controller may be a nerve center and a command center of the terminal 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, including one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The USB interface 130 is an interface that conforms to USB standard specifications, and may be specifically a mini USB interface, a micro USB interface, a USB Type-C interface, or the like. The USB interface 130 may be configured to connect to a charger to charge the terminal 100, or may be configured to transmit data between the terminal 100 and a peripheral device, or may be configured to connect to a headset to play audio through the headset, or may be configured to connect to another terminal such as an AR device.

It may be understood that an interface connection relationship between the modules shown in this embodiment of the present invention is merely an example for description, and does not constitute a limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the terminal 100. When charging the battery 142, the charging management module 140 may further supply power to the terminal by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communications function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 100 may be configured to cover one or more communications frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 can provide a solution, applied to the terminal 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers a processed signal to the application processor. The application processor outputs a sound signal by using an audio device (which is not limited to the speaker 170A, the receiver 170B, and the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the terminal 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, and the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system. SBAS).

The terminal 100 implements the display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the terminal 100 may include one or N displays 194, where N is a positive integer greater than 1.

The terminal 100 can implement the photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of the camera through a lens. The photosensitive element of the camera converts an optical signal into an electrical signal, transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may further process another digital signal in addition to the digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 can play or record videos in a plurality of coding formats, for example, moving picture experts group (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a transmission mode between human brain neurons, and can further continuously perform self-learning. Applications such as intelligent cognition of the terminal 100 may be implemented by using the NPU, for example, image recognition, facial recognition, speech recognition, and text understanding.

The external memory interface 120 may be configured to be connected to an external memory card such as a micro SD card, to extend a storage capability of the terminal 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications of the terminal 100 and data processing. The internal memory 121 may include a program storage area and a data storage area. The program storage area may store an operating system, an application required by at least one function (for example, a sound playing function or an image playing function), and the like. The data storage area may store data (for example, audio data and an address book) created when the terminal 100 is used, and the like. In addition, the internal memory 121 may include a high-speed random access memory, or may include a nonvolatile memory, for example, at least one magnetic disk storage device, a flash memory, or a universal flash storage (universal flash storage, UFS).

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The terminal 100 may listen to music or answer a hands-free call by using the speaker 170A.

The receiver 170B, also referred to as an "earpiece", is configured to convert an audio electrical signal into a sound signal. When a call is answered or a voice message is listened to by using the terminal 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound by moving the mouth close to the microphone 170C, to enter the sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, implement noise reduction, further identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The terminal 100 determines pressure strength based on a capacitance change. When a touch operation is performed on the display 194, the terminal 100 detects strength of the touch operation by using the pressure sensor 180A The terminal 100 may also calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an icon of Messages, an instruction for viewing an SMS message is executed. When a touch operation whose touch operation strength is greater than or equal to the first pressure threshold is performed on the icon of Messages, an instruction for creating an SMS message is executed.

The gyroscope sensor 180B may be configured to determine a motion posture of the terminal 100. In some embodiments, angular velocities of the terminal 100 around three axes (namely, axes x, y, and z) may be determined by using the gyroscope sensor 180B. The gyroscope sensor 180B may be configured to perform image stabilization during photographing. For example, when the shutter is pressed, the gyroscope sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyroscope sensor 180B may also be used in a navigation scenario and a motion-controlled gaming scenario.

The barometric pressure sensor 180C is configured to measure barometric pressure. In some embodiments, the terminal 100 calculates an altitude by using a barometric pressure value measured by the barometric pressure sensor 180C, to assist in positioning and navigation.

The magnetic sensor 180D includes a Hall sensor. The terminal 100 may detect opening and closing of a flip cover by using the magnetic sensor 180D. In some embodiments, when the terminal 100 is a flip phone, the terminal 100 can detect opening and closing of a flip cover based on the magnetic sensor 180D. Further, a feature such as automatic unlocking upon opening of the flip cover is set based on a detected opening or closing state of the flip cover.

The acceleration sensor 180E may detect values of accelerations of the terminal 100 in various directions (usually on three axes). When the terminal 100 is still, a value and a direction of gravity may be detected. The acceleration sensor 180E may be further configured to identify a posture of the terminal, and is applied to applications such as screen switching between landscape and portrait modes and a pedometer.

The range sensor 180F is configured to measure a distance. The terminal 100 may measure a distance in an infrared manner or a laser manner. In some embodiments, the terminal 100 may use the range sensor 180F to measure a distance, to implement fast focusing in a photographing scenario.

The optical proximity sensor 180G may include, for example, a light-emitting diode (LED) and an optical detector such as a photodiode. The light-emitting diode may be an infrared light-emitting diode. The terminal 100 emits infrared light by using the light emitting diode. The terminal 100 detects infrared reflected light from a nearby object by using the photodiode. When sufficient reflected light is detected, the terminal 100 may determine that there is an object near the terminal. When insufficient reflected light is detected, the terminal 100 may determine that there is no object near the terminal 100. The terminal 100 may detect, by using the optical proximity sensor 180G, that the user holds the terminal 100 close to an ear for a call, to automatically perform screen-off to save power. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal 100 is in a pocket, to prevent a false touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 1803 exceeds a threshold, the terminal 100 lowers performance of a processor located near the temperature sensor 180J, to reduce power consumption to implement thermal protection. In some other embodiments, when the temperature is less than another threshold, the terminal 100 heats the battery 142 to prevent the terminal 100 from being shut down abnormally because of a low temperature. In some other embodiments, when the temperature is less than still another threshold, the terminal 100 boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. A visual output related to the touch operation may be provided through the display 194. In some other embodiments, the touch sensor 180K may also be disposed on a surface of the terminal 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a key input, and generate a key signal input related to a user setting and function control of the terminal 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type, or may be of different types. The SIM card interface 195 is also compatible with different types of SIM cards. The SIM card interface 195 is also compatible with the external storage card. The terminal 100 interacts with a network by using a SIM card, to implement functions such as calling and data communication. In some embodiments, the terminal 100 uses an eSIM, namely, an embedded SIM card. The eSIM card may be embedded in the terminal 100, and cannot be separated from the terminal 100.

A software system of the terminal 100 may use a layered architecture, an event-driven architecture, a microkernel architecture, a microservice architecture, or a cloud architecture. In this embodiment of the present invention, an Android system with a layered architecture is used as an example to illustrate a software structure of the terminal 100.

Figure 2B:
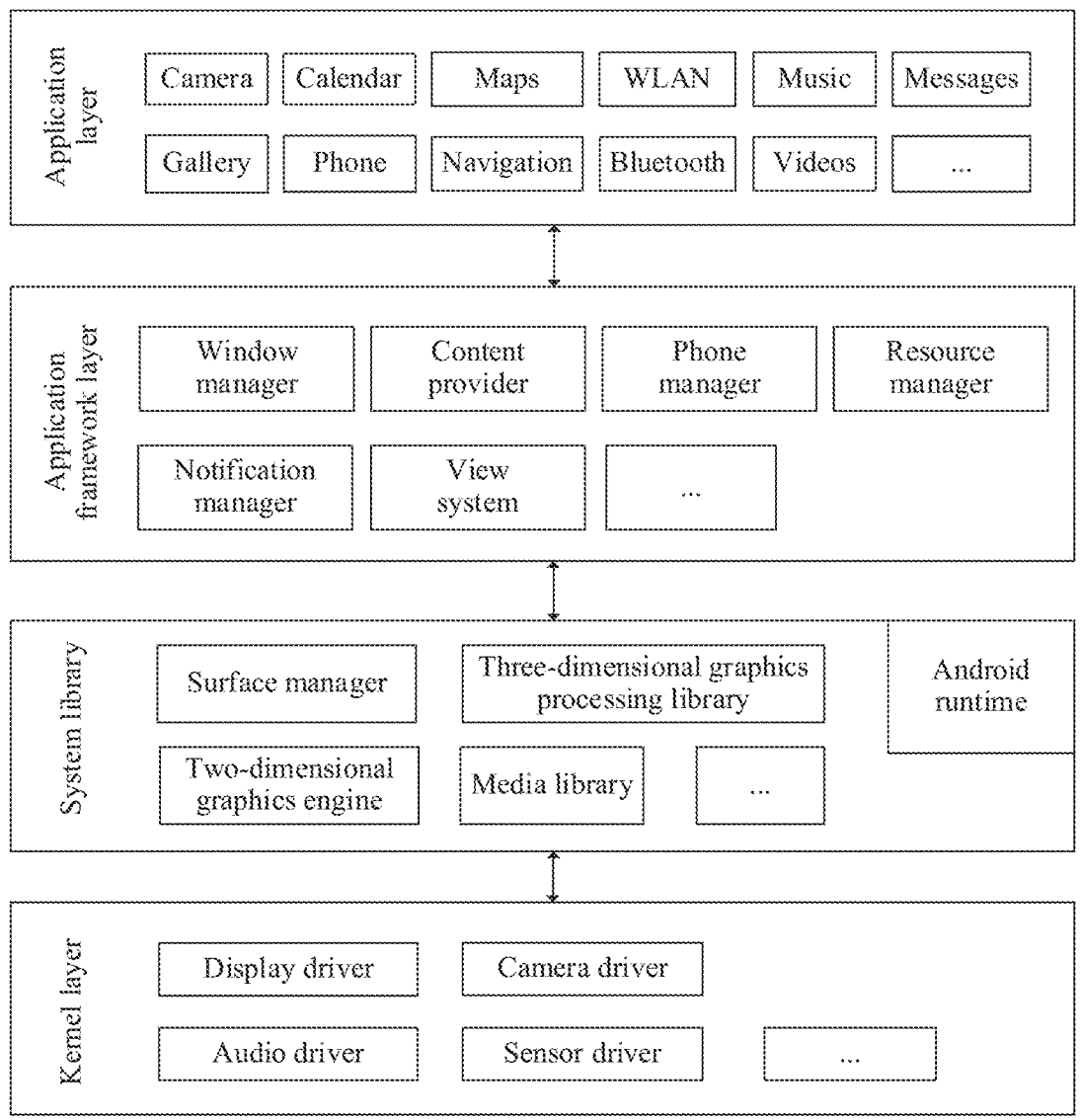
FIG. 2B is a schematic diagram of a software architecture of a terminal according to an embodiment of this application.

FIG. 2B is a block diagram of the software structure of the terminal 100 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2B, the application packages may include applications such as Camera. Gallery. Calendar. Phone, Maps, Navigation, WLAN, Bluetooth. Music, Videos, and Messages.

The application framework layer provides an application programming interface (application programming interface, API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to, store and obtain data, and enable the data to be accessed by an application. The data may include a video, an image, audio, calls that are made and received, a browsing history and bookmarks, an address book, and the like.

The view system includes visual controls, such as a control for displaying a text and a control for displaying an image. The view system may be configured to construct an application. A display interface may include one or more views. For example, a display interface including a message notification icon may include a text display view and an image display view.

The phone manager is configured to provide a communications function of the terminal 100, for example, management of a call status (including answering, declining, or the like).

The resource manager provides an application with various resources, such as a localized character string, an icon, an image, a layout file, and a video file.

The notification manager enables an application to display notification information in the status bar, and may be configured to convey a notification type message. The notification information may automatically disappear after a short pause without requiring user interaction. For example, the notification manager is configured to notify download completion, provide a message notification, and the like. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in the status bar, an alert sound is played, the terminal vibrates, or the indicator light blinks.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working procedure of software and hardware of the terminal 100 by using an example with reference to a photographing capture scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. A camera application invokes an interface at the application framework layer to enable the camera application, then enables a camera driver by invoking the kernel layer, and captures a static image or a video through the camera 193.

This application provides an image processing method. A terminal can be equipped with a photographing and imaging system by combining processing capabilities of the terminal and a cloud server and fully using high-quality image data and an image processing algorithm on the cloud server. The cloud server may obtain, through matching by using an image and environment information (for example, geographic location information, weather information, time information, a photographing parameter, or photographing posture information) of the image that are uploaded by the terminal, an image processing algorithm suitable for the image and high-quality image data that has same photographed content as the image and has a similar photographing environment to the image. Quality and an effect of the image uploaded by the terminal can be improved by using the image processing algorithm and the high-quality image data. In this way, images photographed in different environments can present different styles and effects. In addition, the terminal can break through an imaging quality limit of the terminal, so that a common camera on the terminal can also achieve an effect of a professional digital single-lens reflex device, thereby greatly improving photographing quality of the terminal and photographing experience of a user while reducing costs of the mobile phone.

With reference to application scenarios, the following describes an image processing method in embodiments of this application.

In some application scenarios, when performing photographing by using a terminal 100, a user may select different photographing modes in a Camera application of the terminal 100 for photographing. When the user photographs a scene in a scenic spot, a business district, or the like by using the terminal 100, the user may select "Cloud enhancement" in the Camera application for photographing. In "Cloud enhancement", the terminal 100 may enhance and optimize, by using a processing capability of a cloud server, an image photographed by the terminal 100. In this way, the terminal 100 can break through an imaging quality limit of the terminal, so that a common camera on the terminal can also achieve an effect of a professional digital single-lens reflex device. For example, when the terminal 100 photographs a distant view, details of the distant view photographed by the terminal 100 become blurred because of the imaging quality limit of the terminal 100 when zooming is performed to some extent. However, when the terminal 100 enables "Cloud enhancement" to photograph the distant view, the terminal 100 may optimize, by using the processing capability of the cloud server, the distant-view image photographed by the terminal 100, so that the terminal 100 can also photograph a clear image when photographing the distant view.

Figure 3A:
FIG. 3A to FIG. 3H are schematic diagrams of a group of user interfaces according to an embodiment of this application.

As shown in FIG. 3A, the terminal 100 may display an interface 310 of a home screen. The interface 310 displays a page on which application icons are placed. The page includes a plurality of application icons (for example, a Weather application icon, a Stocks application icon, a Calculator application icon, a Settings application icon, a Mail application icon, an Alipay application icon, a Facebook application icon, a Browser application icon, a Gallery application icon 312, a Music application icon, a Videos application icon, and a WeChat application icon). A page indicator is further displayed below the plurality of application icons, to indicate a location relationship between a currently displayed page and another page. There are a plurality of tray icons (for example, a Phone application icon, a Messages application icon, a Contacts application icon, and a Camera application icon 313) below the page indicator, and the tray icons are still displayed during page switching. In some embodiments, the page may alternatively include a plurality of application icons and a page indicator. The page indicator may not be a part of the page but exist independently, and the image icons are also optional. This is not limited in this embodiment of this application. A status bar 311 is displayed in an area of an upper part of the interface 310. The status bar 311 may include one or more signal strength indicators of a mobile communications signal (which may also be referred to as a cellular signal), a battery status indicator, a time indicator, a Wi-Fi signal indicator, and the like.

The terminal 100 may receive an input operation (for example, tapping) performed by the user on the Camera application icon 313. In response to the input operation, the terminal 100 may display a photographing interface 320 shown in FIG. 3B.

Figure 3B:
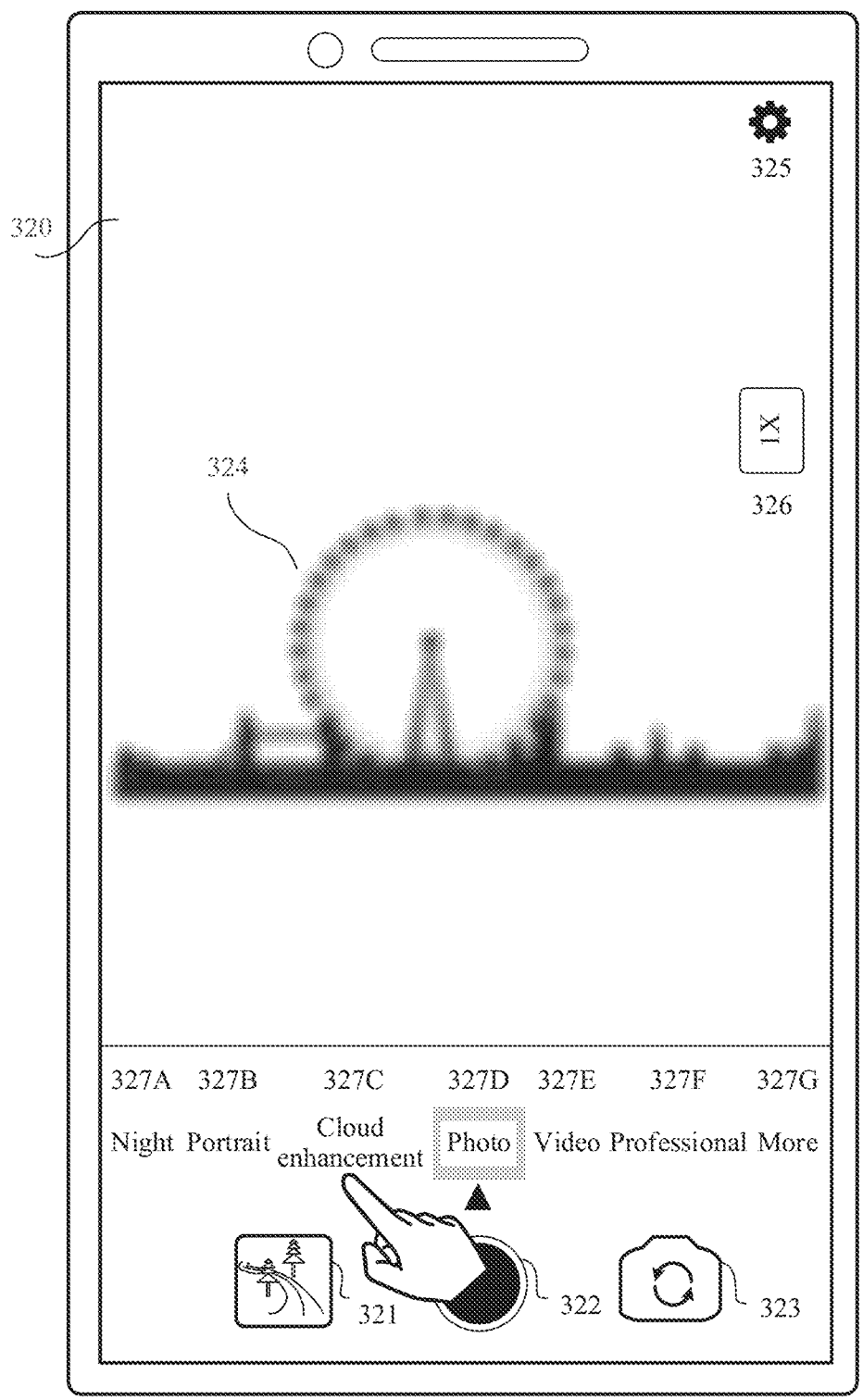

As shown in FIG. 3B, the photographing interface 320 may display and include a photographed image echo control 321, a photograph control 322, a camera conversion control 323, an image 324 captured by a camera, a settings control 325, a zoom ratio control 326, and one or more photographing mode controls (for example, a "Night" control 372A, a "Portrait" control 372B, a "Cloud enhancement" control 372C, a "Photo" control 372D, a "Video" control 372E, a "Professional" control 372F, and a "More" control 327G). The photographed image echo control 321 may be used to display a photographed image. The photograph control 322 is used to trigger an image photographed by the camera to be saved. The camera conversion control 323 may be used to switch the photographing camera. The settings control 325 may be used to set a photographing function. The zoom ratio control 326 may be used to set a zoom ratio of the camera. The "Photo" control may be used to trigger an image processing procedure corresponding to the photo mode to be enabled. For example, the "Night" control 372A may be used to trigger an increase in brightness, color richness, and the like in a photographed image. The "Portrait" control 372B may be used to trigger a person background in a photographed image to be blurred. The "Cloud enhancement" control 372C may be used to trigger an image effect of a photographed image to be improved by using the processing capability of the cloud server. As shown in FIG. 3B, a photo mode currently selected by the user is "Photo".

The terminal 100 may receive an input operation (for example, tapping) performed by the user on the "Cloud enhancement" control 327C. In response to the input operation, as shown in FIG. 3C, the terminal 100 may adjust the photo mode currently selected by the user to "Cloud enhancement", and display a mode detail control 328.

Figure 3C:
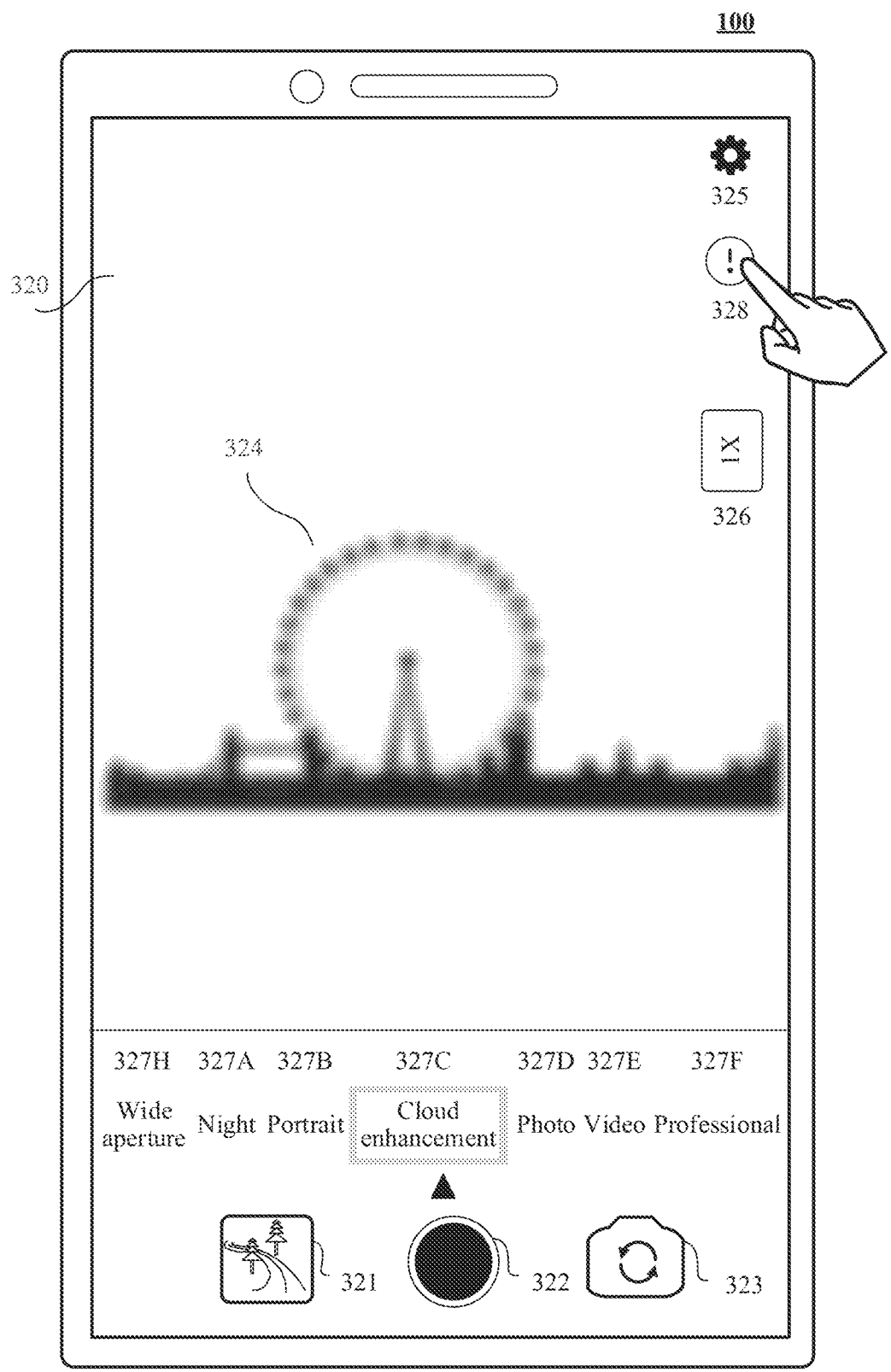

As shown in FIG. 3C, the terminal 100 may receive an input operation (for example, tapping) performed by the user on the mode detail control 328. In response to the input operation, the terminal 100 may display a "Cloud enhancement" detail page 330 shown in FIG. 3D.

Figure 3D:
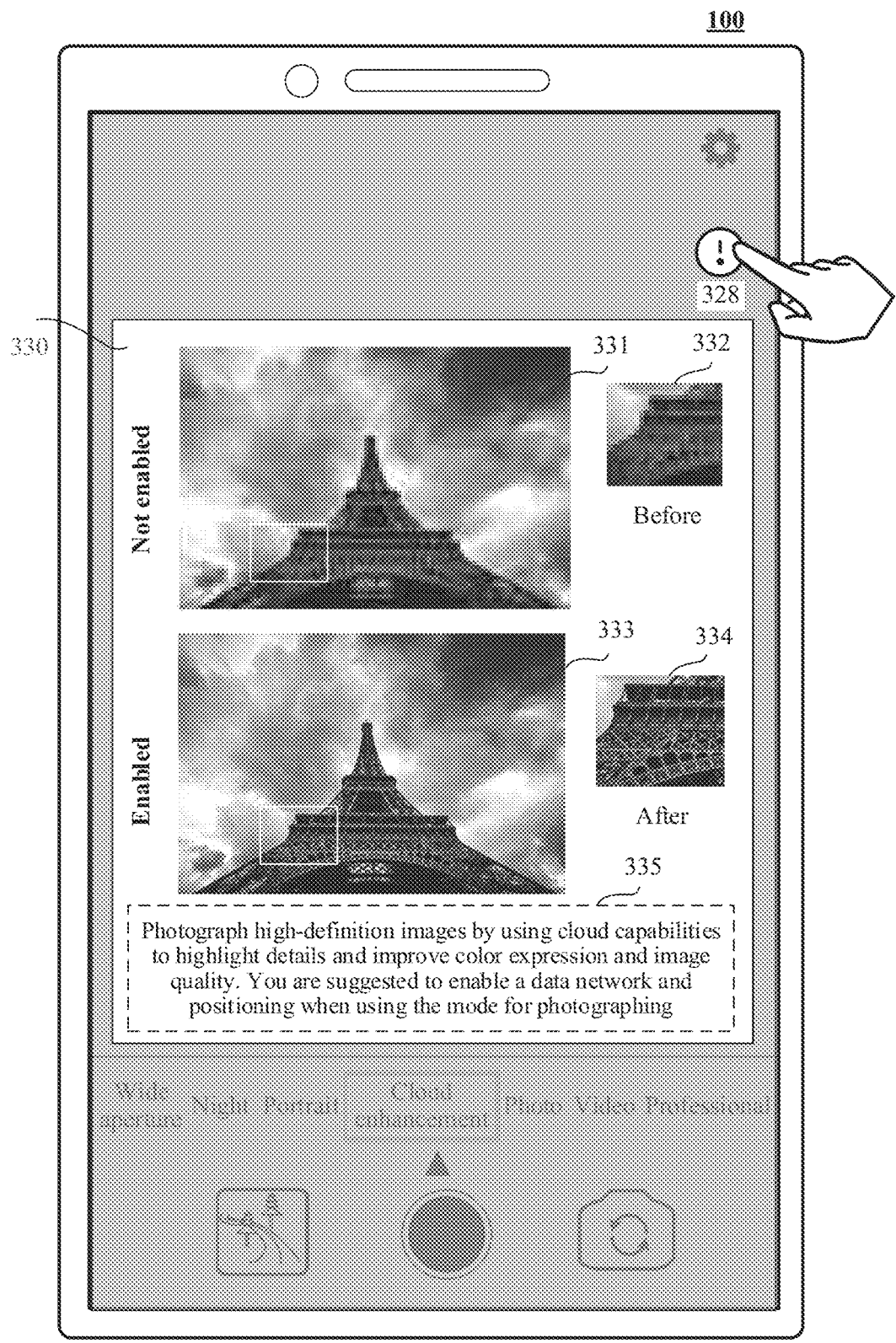

As shown in FIG. 3D, the "Cloud enhancement" detail page 330 may display and include effect comparison images when "Cloud enhancement" is enabled and not enabled. For example, the "Cloud enhancement" detail page 330 may display an image 331 photographed when "Cloud enhancement" is not enabled, a detail image 332 of the image 331, an image 333 photographed when "Cloud enhancement" is enabled, and a detail image 334 of the image 333. The "Cloud enhancement" detail page 330 may further display a text description 335 (for example, "Photograph high-definition images by using cloud capabilities to highlight details and improve color expression and image quality. You are suggested to enable a data network and positioning when using the mode for photographing") of "Cloud enhancement".

The terminal 100 may receive an input operation (for example, tapping) performed by the user on the mode detail control 328 again. In response to the input operation, as shown in FIG. 3E, the terminal 100 may close the "Cloud enhancement" detail page 330, and display the photographing interface 320 again.

Figure 3E:
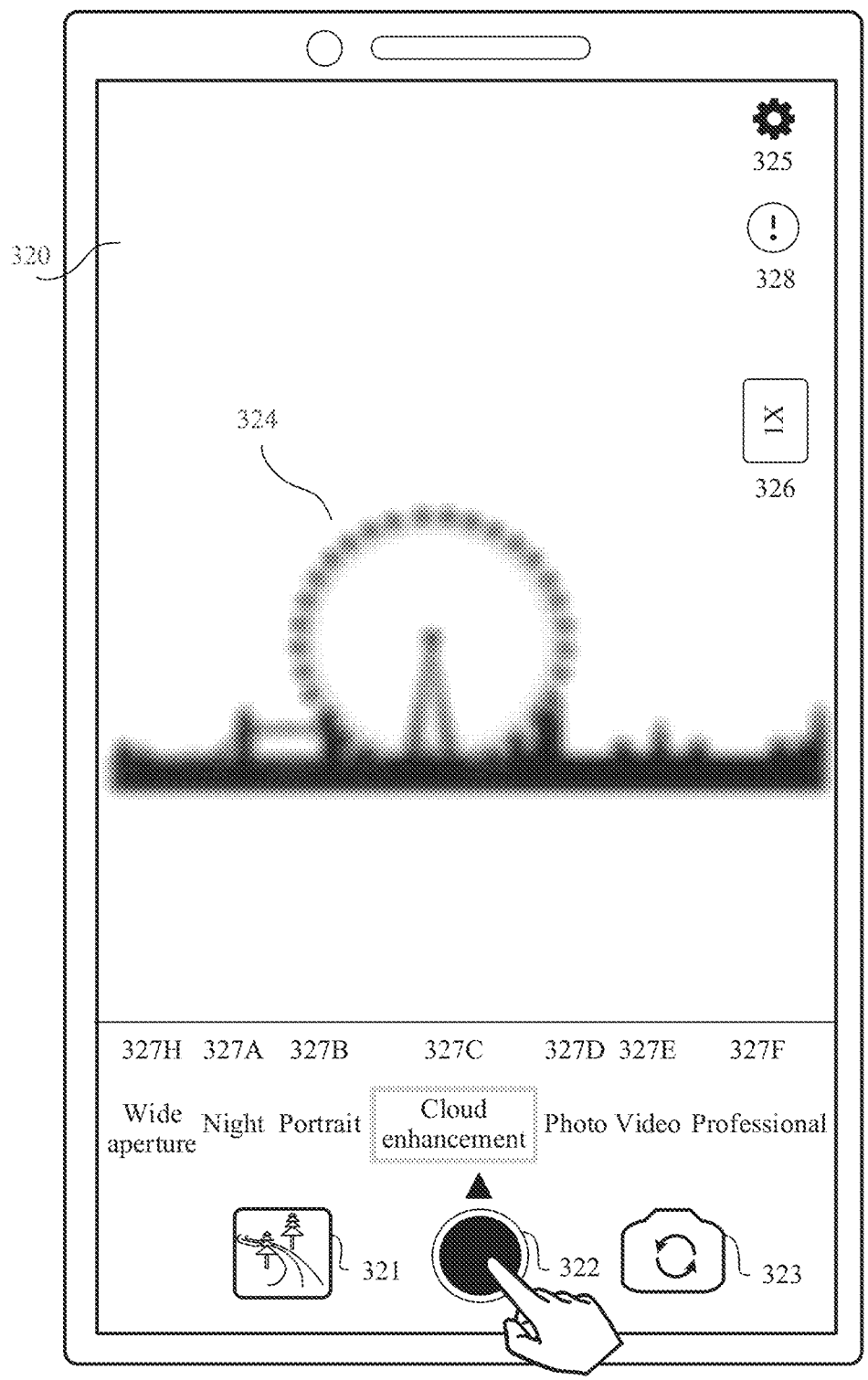

As shown in FIG. 3E, a photographing mode currently selected by the user is "Cloud enhancement". The terminal 100 may receive an input operation (for example, tapping) performed by the user on the photograph control 322. In response to the input operation, the terminal 100 may obtain an image photographed by the camera and environment information of the image. The environment information may include one or more of the following: geographic location information, weather information, time information, a photographing parameter, photographing posture information, and the like. The photographing parameter may include a zoom ratio or the like. The photographing posture information may include orientation information of a photographing lens of a photographing device when the photographing lens photographs an image, for example, a pitch angle and a direction angle of the photographing lens or a three-axis rotation angle in natural coordinates. The terminal 100 may send the photographed image and the environment information of the photographed image to the cloud server 200, and enhance the photographed image by using the processing capability of the cloud server 200. A process in which the terminal 100 enhances the photographed image by using the processing capability of the cloud server 200 is described in detail in a subsequent embodiment, and is not described in detail herein.

In some embodiments, in the process in which the terminal 100 enhances the photographed image by using the processing capability of the cloud server 200, the terminal 100 may display a processing progress prompt or a countdown, to notify the user of current progress of enhancing the photographed image by the terminal 100 by using the processing capability of the cloud server 200.

Figure 3F:
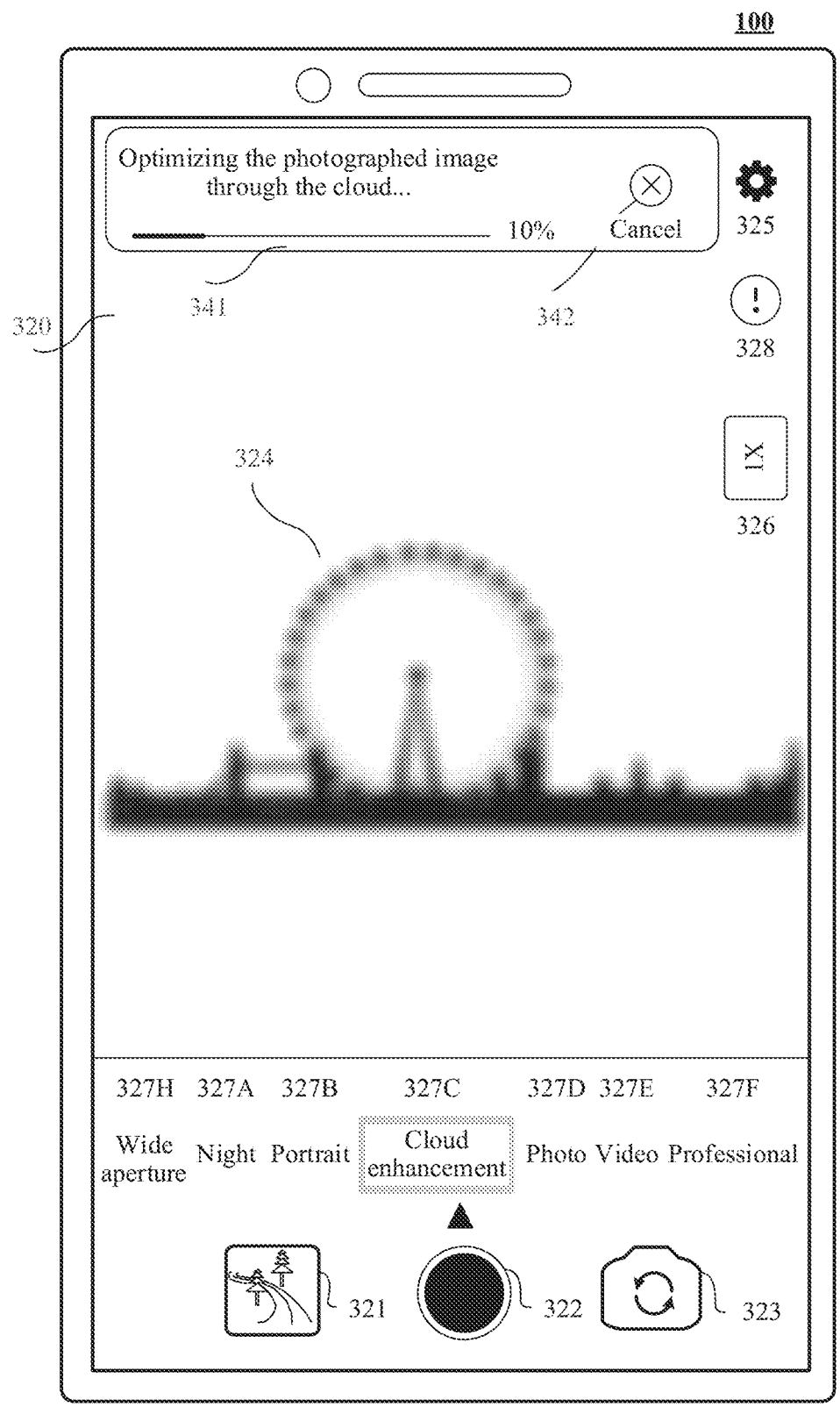

For example, as shown in FIG. 3F, the terminal 100 may display a progress prompt window 341 in the photographing interface 320, to indicate progress of enhancing the photographed image. For example, the progress prompt window 341 displays a text prompt "Optimizing the photographed image through the cloud. The progress is 10%". The progress prompt window 341 may further display a "Cancel" control 342, which may be used to trigger cancellation of enhancement of the photographed image. For example, when the terminal 100 receives an input operation (for example, tapping) performed by the user on the "Cancel" control 342, the terminal 100 may send a cancel instruction to the cloud server 200 to instruct the cloud service 200 to stop an enhancement process of the photographed image. In this way, when progress is relatively slow or the user temporarily does not want to enhance the photographed image, enhancement on the photographed image can be canceled in a timely manner.

In a possible implementation, the terminal 100 may display an enhancement effect in real time. When the user is satisfied with an intermediate enhancement effect, the terminal may end the enhancement in advance, and save the intermediate enhancement result at the end as a final result.

After the terminal 100 completes enhancing the photographed image by using the processing capability of the cloud server 200, the terminal 100 may display a complete prompt, and locally save an enhanced image. The complete prompt may be used to notify the user that enhancement on the photographed image currently has been completed.

Figure 3G:
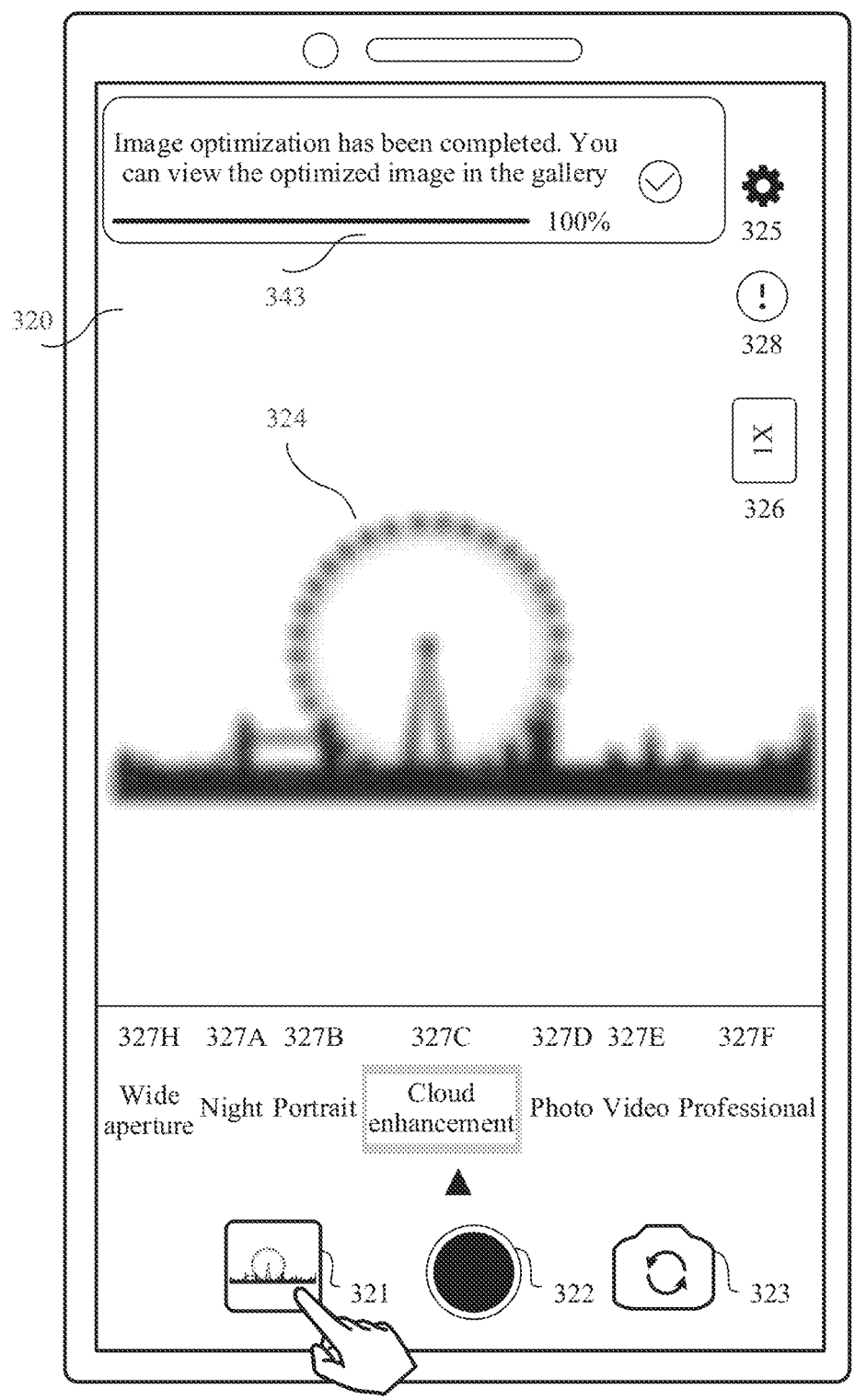

For example, as shown in FIG. 3G, the terminal 100 may display a complete prompt 343 after completing enhancing the photographed image by using the processing capability of the cloud server 200. For example, the complete prompt 343 may be a text prompt "Image enhancement has been completed. You can view the enhanced image in the gallery".

The terminal 100 may receive an input operation (for example, tapping) performed by the user on the photographed image echo control 321. In response to the input operation, the terminal 100 may display an image browsing interface 350 shown in FIG. 3H.

Figure 3H:
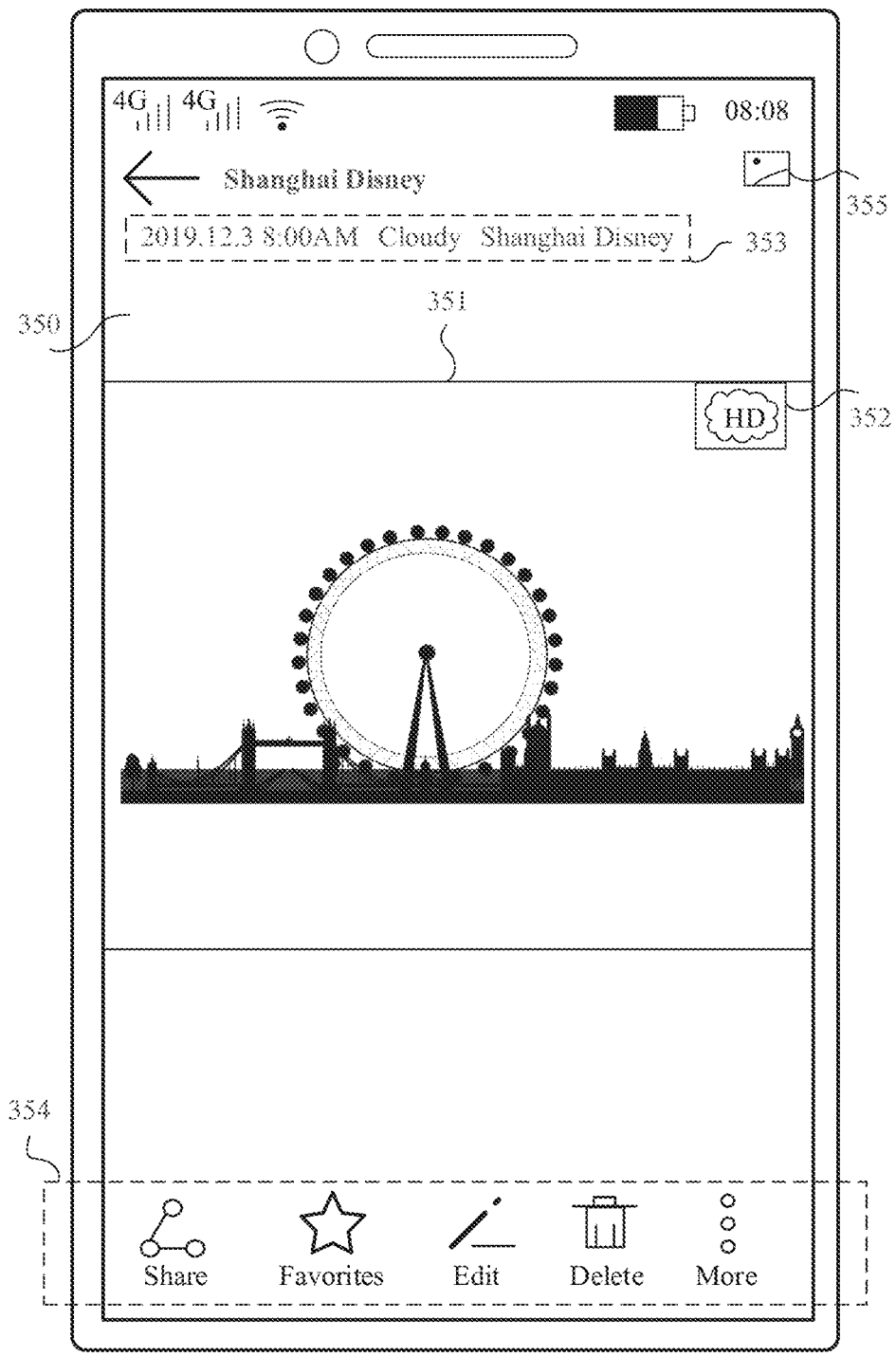

As shown in FIG. 3H, the image browsing interface 350 may display and include an enhanced image 351, a mark 352, image-related information 353, a menu 354, and a gallery control 355. The mark 352 is used to notify the user that the image 351 has been enhanced by using the processing capability of the cloud server 200. The image-related information 353 may include photographing time, photographing weather, geographic location information, and the like of the image 351. For example, the photographing time may be "8:00 a.m. on Dec. 3, 2019", the photographing weather may be "cloudy", and a photographing place may be "Shanghai Disney". The menu 354 may include a "Share" button, a "Favorites" button, an "Edit" button, a "Delete" button, and a "More" button. The "Share" button may be used to trigger the image 351 to be shared. The "Favorites" button may be used to trigger the image 351 to be collected in a favorite image folder. The "Edit" button may be used to trigger edit functions such as rotation, cropping, adding filters, and blurring of the image 351. The "Delete" button may be used to trigger the image 351 to be deleted. The "More" button may be used to trigger more functions related to the image 351 to be enabled. The gallery control 355 may be used to trigger the terminal 100 to open the gallery application.

In some embodiments, when enhancing an image by using the processing capability of the cloud server 200, the terminal 100 needs to first send the image and environment information of the image to the cloud server 200. Therefore, after the terminal 100 opens the Camera application and enables "Cloud enhancement", the terminal 100 may detect a current network status. If the terminal 100 is currently disconnected from a network and cannot be connected to the cloud server, the terminal 100 may output a network disconnection prompt. The network disconnection prompt may be used to indicate the user to perform photographing in the cloud enhancement mode after the terminal 100 is connected to the network.

Figure 4A:
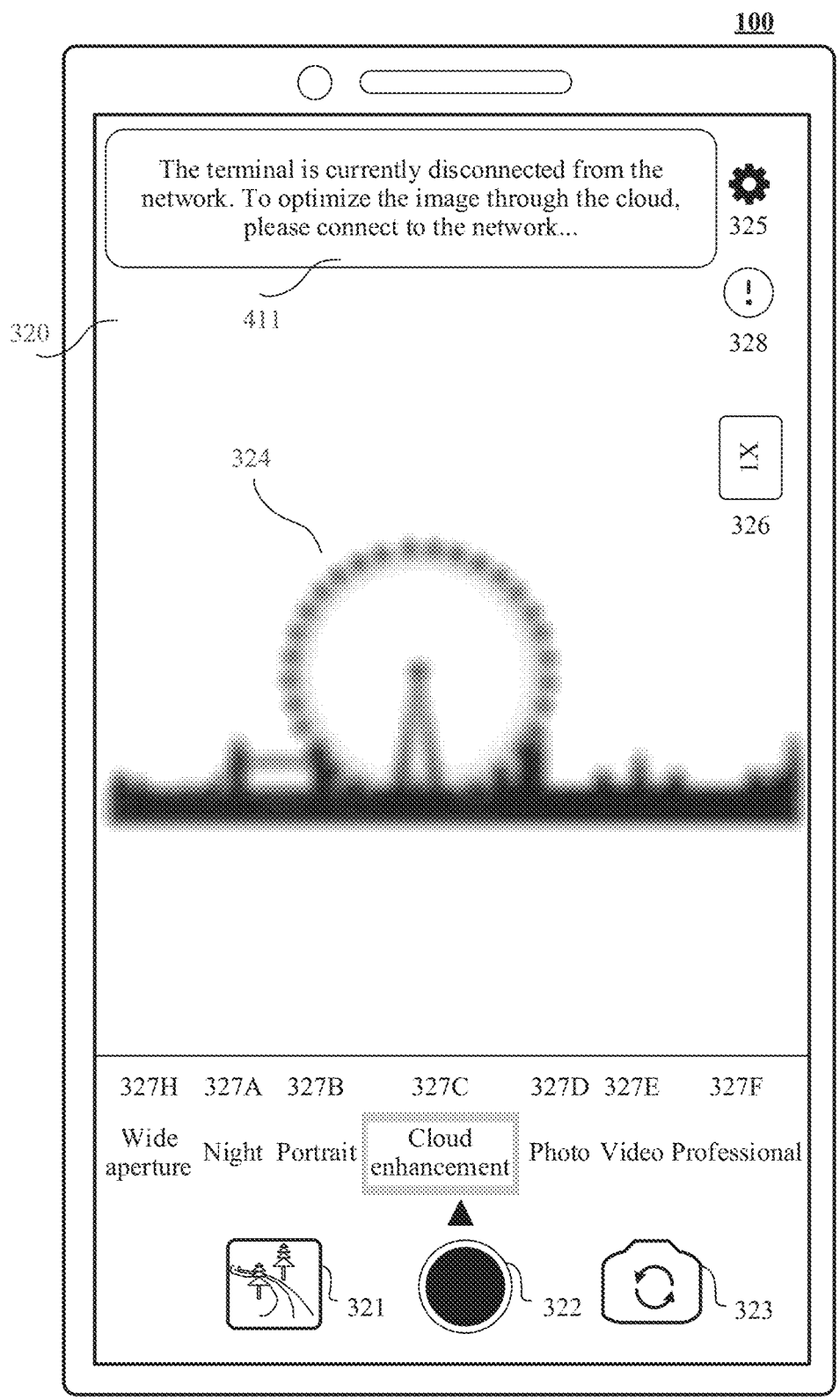
FIG. 4A to FIG. 4F are schematic diagrams of another group of user interfaces according to an embodiment of this application.

For example, as shown in FIG. 4A, the terminal 100 displays the photographing interface 320. For a text description of the photographing interface 320, refer to the foregoing embodiment. Details are not described herein again. When the terminal 100 detects that the terminal 100 is disconnected from the network and cannot establish a connection to the cloud server 200, the terminal 100 may display a prompt 411. The prompt 411 may be used to notify the user that the terminal 100 is currently disconnected from the network. For example, the prompt 411 may be a text prompt "The terminal is currently disconnected from the network. To optimize the image through the cloud, please connect to the network".

After the terminal 100 opens the Camera application and enables the cloud enhancement mode, when the network status of the terminal 100 is switched from "disconnected" to "reconnected", the terminal 100 may output a network reconnection prompt. The network reconnection prompt may be used to notify the user that the terminal 100 is currently reconnected to the network and the cloud enhancement mode can be normally used to photograph an image.

Figure 4B:
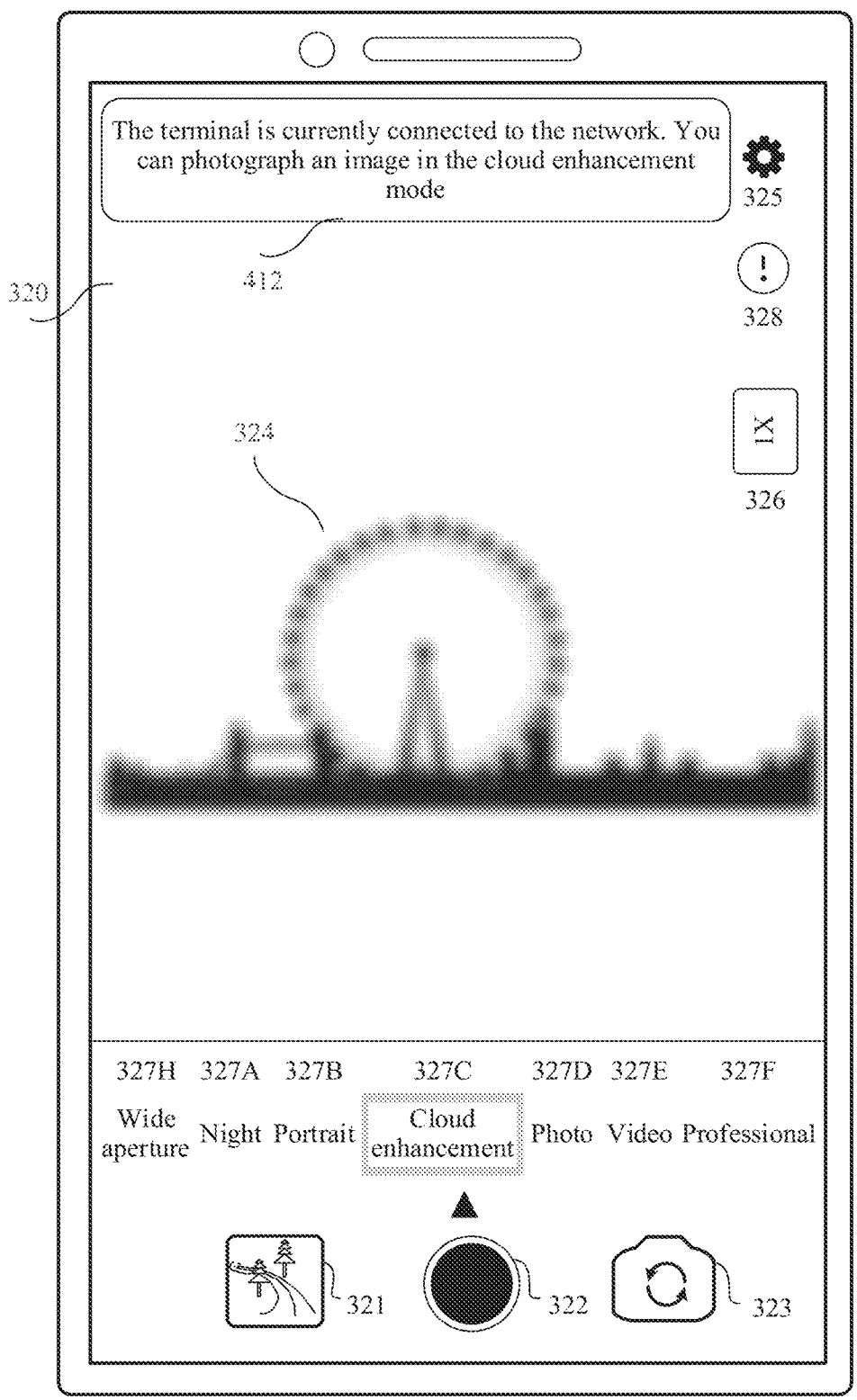

For example, as shown in FIG. 4B, the terminal 100 displays the photographing interface 320. For a text description of the photographing interface 320, refer to the foregoing embodiment. Details are not described herein again. When the terminal 100 detects that the network is switched from "disconnected" to "reconnected", the terminal 100 may display a prompt 412. The prompt 412 may be used to notify the user that the network of the terminal 100 is currently restored and the cloud enhancement mode can be normally used to perform photographing. For example, the prompt 412 may be a text prompt "The terminal is currently connected to the network. You can photograph an image in Cloud enhancement".

In some embodiments, because the cloud server 200 may enhance images uploaded by a plurality of terminals, when the cloud server 200 has excessive image enhancement tasks, the cloud server 200 queues these tasks. When an image enhancement task requested by the terminal 100 needs to queue, the terminal 100 may output a queuing prompt, keep communication with the cloud server 200 in the background, and monitor queuing progress. For the image enhancement task, the queuing prompt may be used to indicate that the current image enhancement task is queuing and waiting is required.

Figure 4C:
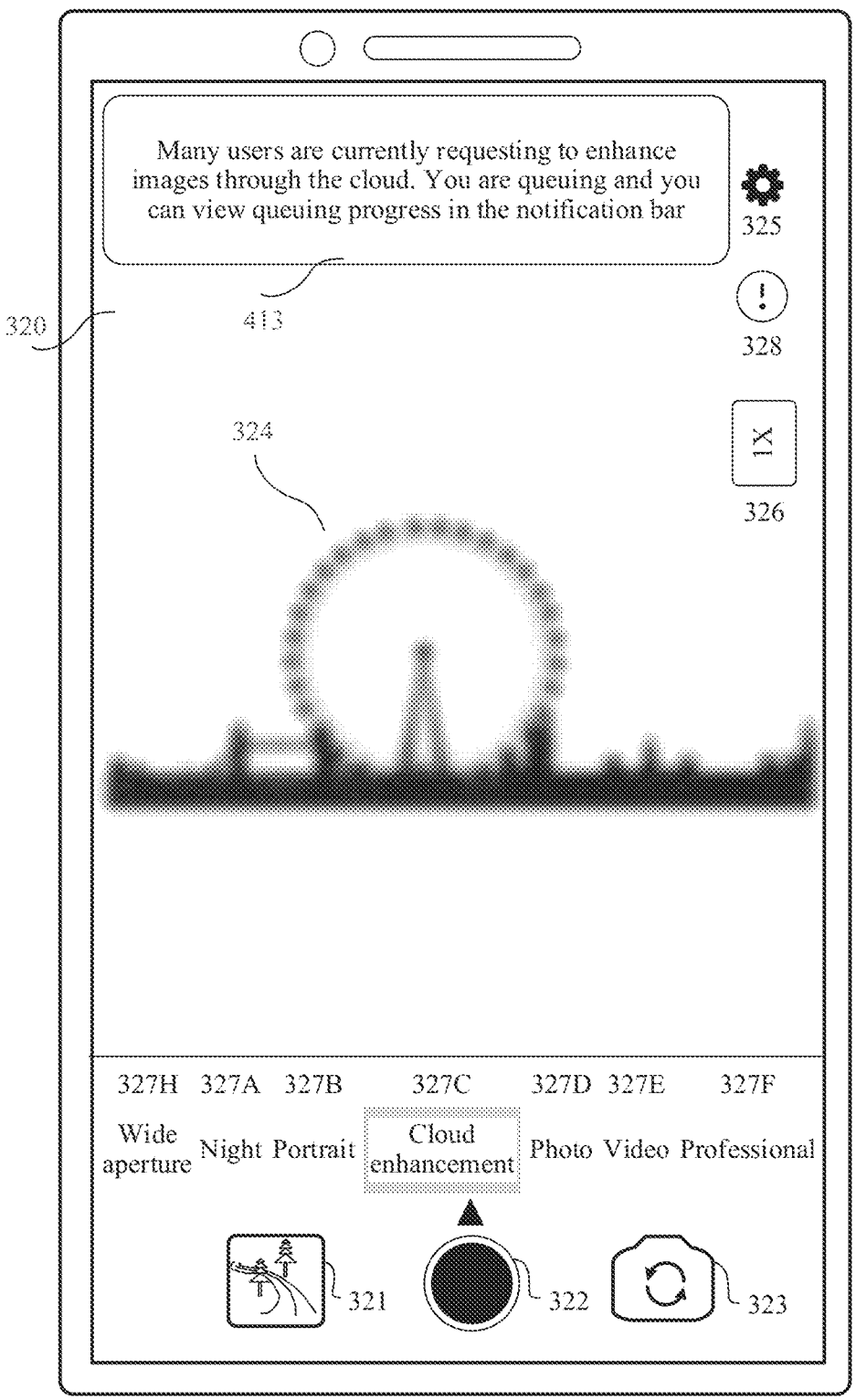

For example, as shown in FIG. 4C, the terminal 100 displays the photographing interface 320. For a text description of the photographing interface 320, refer to the foregoing embodiment. Details are not described herein again. After the terminal 100 sends a photographed image and environment information of the photographed image to the cloud server 200, the terminal 100 may periodically obtain processing progress of enhancing the photographed image from the cloud server 200. When a quantity of image enhancement tasks on the cloud server 200 reaches a specified quantity, the cloud server 200 may queue a task request coming from the terminal 100, and periodically send queuing progress to the terminal 100. The terminal 100 may output a prompt 413. The prompt 413 is used to notify the user that the task that is of enhancing the photographed image and that is currently requested by the terminal 100 is queuing. For example, the prompt 413 may be a text prompt "Many users are currently requesting to enhance images through the cloud. You are queuing and you can view queuing progress in the notification bar".

When the task that is of enhancing the photographed image and that is requested by the terminal 100 is queuing, the terminal 100 may keep communication with the cloud server 200, monitor queuing progress in the background, and display the queuing progress in the notification bar of the terminal 100.

Figure 4D:
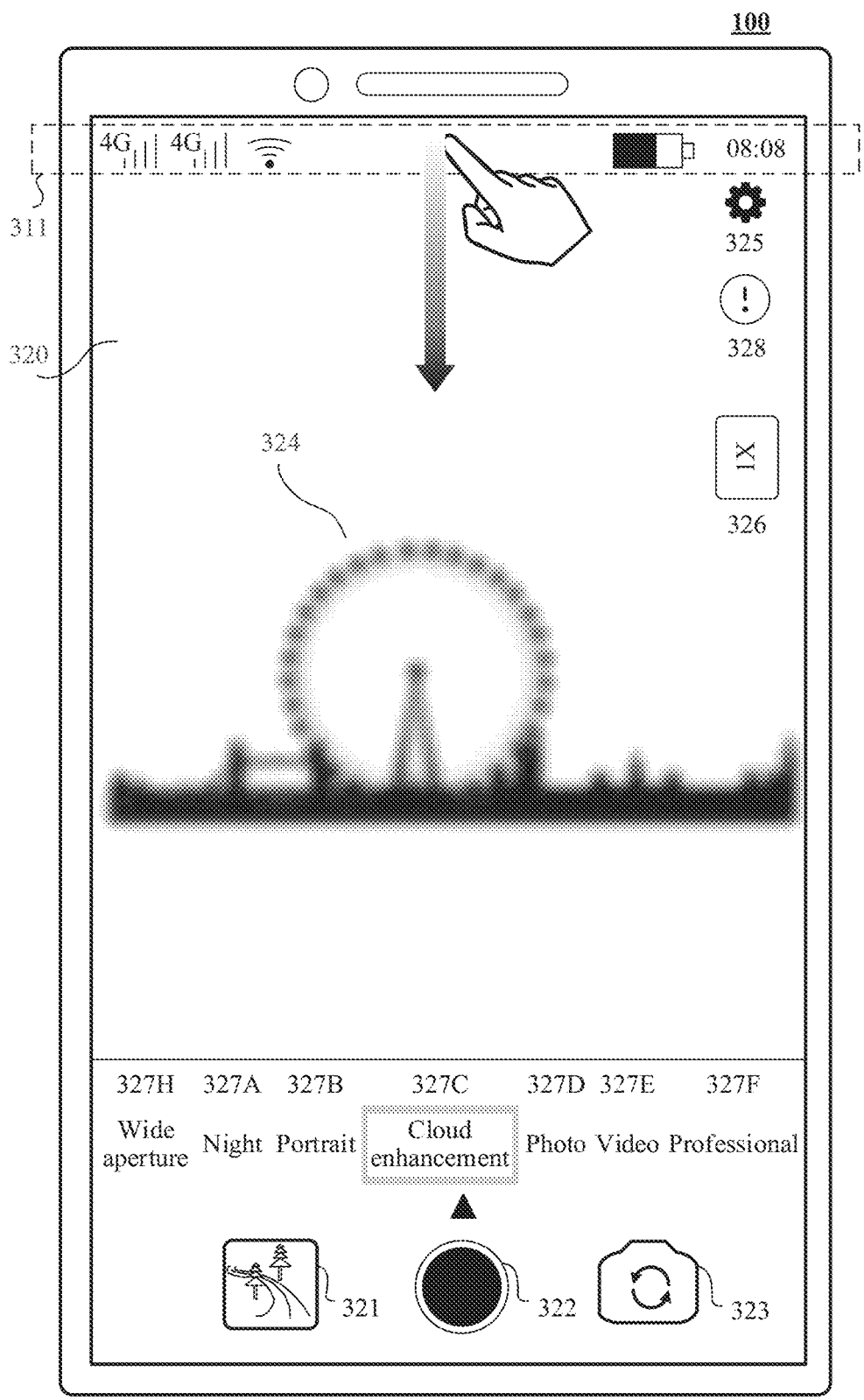

For example, as shown in FIG. 4D, the terminal 100 displays the photographing interface 320. The terminal 100 may receive an input operation of the user, and invoke the status bar 311 above the photographing interface 320. The terminal 100 may receive an input operation (for example, sliding down) performed by the user on the status bar 311. In response to the input operation, the terminal 100 may display a menu window 420 and a notification bar 430 shown in FIG. 4E.

Figure 4E:
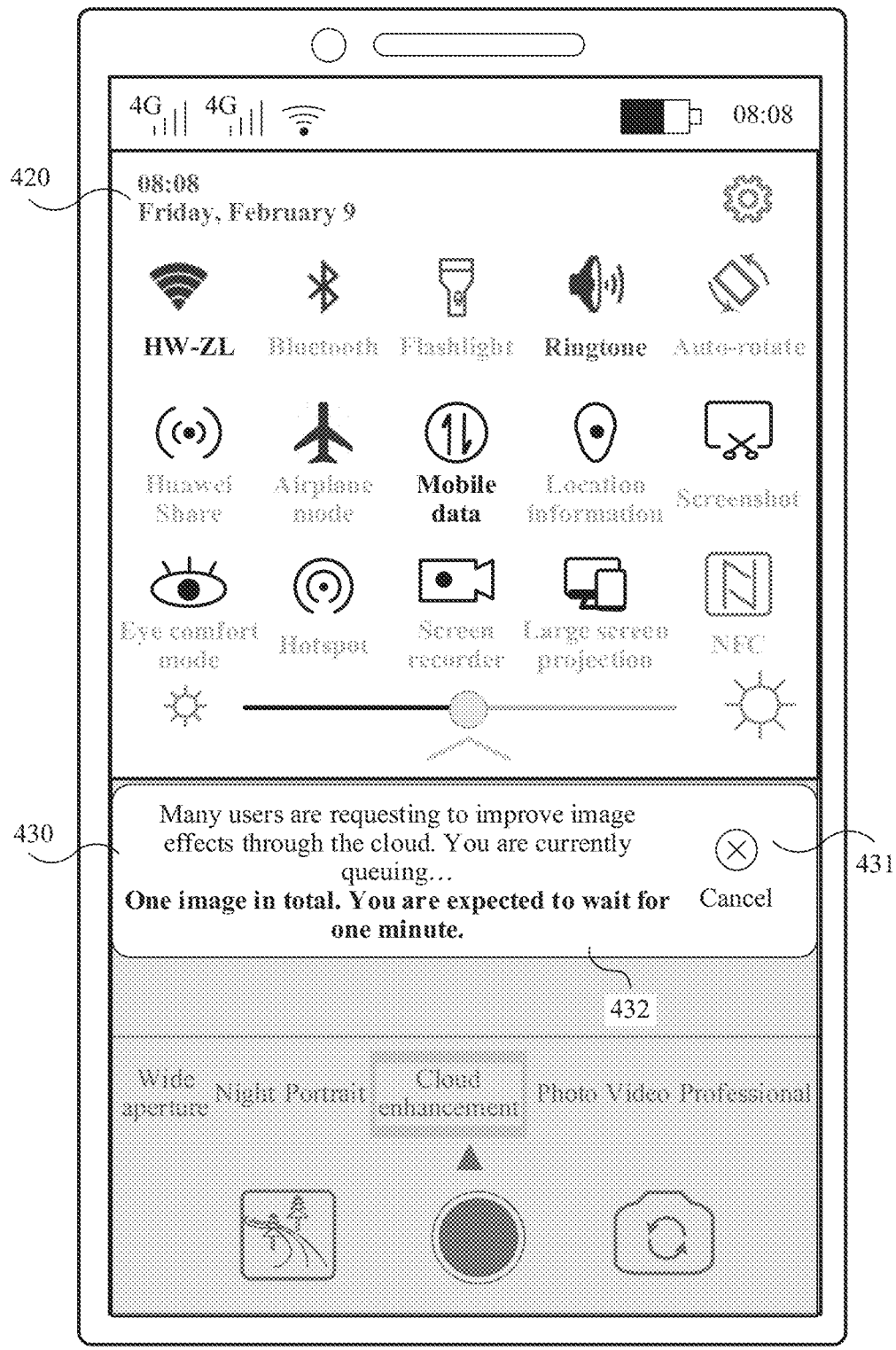

As shown in FIG. 4E, the menu window 420 may display some function controls (for example, a "Wireless local area network (WLAN)" control, a "Bluetooth" control, a "Flashlight" control, a "Ringtone" control, an "Auto-rotate" control, and a "Huawei Share (Huawei Share)" control). The notification bar 430 may display a queuing notification (for example, "Many users are requesting to improve image effects through the cloud. You are currently queuing"), a prompt 432 for queuing time of enhancing the photographed image (for example, "You are expected to wait for one minute"), and a "Cancel" control 431. The "Cancel" control 431 may be used to trigger the terminal 100 to send a cancellation request to the cloud server 200, and the cancellation request is used to request the cloud server 200 to cancel enhancement on the uploaded photographed image of the terminal 100.

Figure 4F:
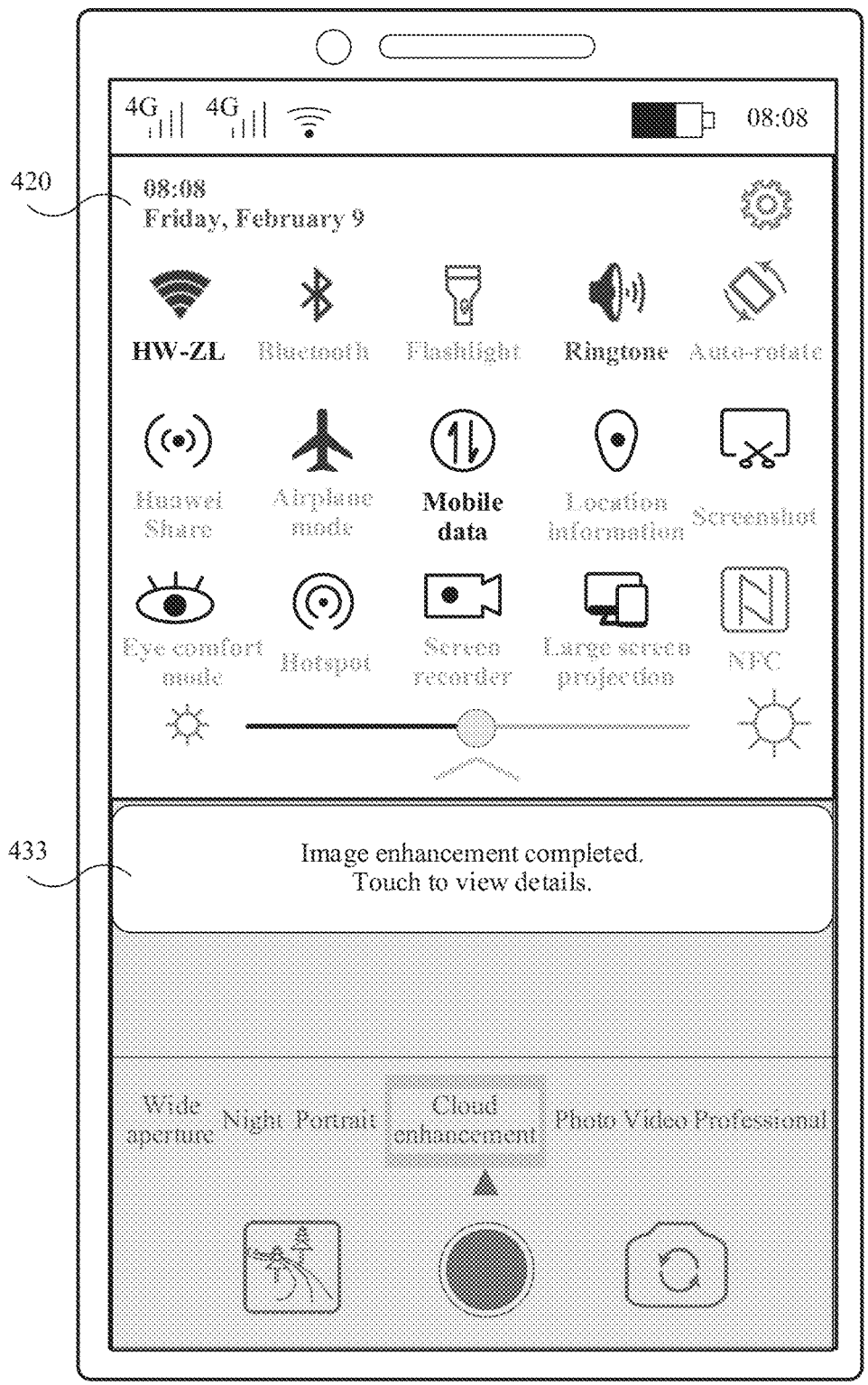

After the terminal 100 completes enhancing the photographed image by using the processing capability of the cloud server 200, the terminal 100 may display a complete prompt 433 shown in FIG. 4F. The prompt 433 may be used to notify the user that the terminal 100 has currently completed enhancing the photographed image. The terminal 100 may receive an input operation (for example, tapping) performed by the user on the prompt 433. In response to the input operation, the terminal 100 may display the image browsing interface 350 shown in FIG. 3H. For a text description of the image browsing interface 350, refer to the foregoing embodiment. Details are not described herein again.

According to the image processing method provided in this embodiment of this application, in "Cloud enhancement", the terminal 100 can enhance and optimize, by using the processing capability of the cloud server 200, the image photographed by the terminal 100. In this way, the terminal 100 can break through an imaging quality limit of the terminal, so that a common camera on the terminal can also achieve an effect of a professional digital single-lens reflex device.

Figure 4G:
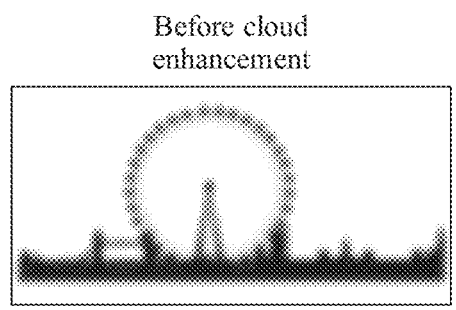
FIG. 4G(a) to FIG. 4G(d) are a schematic diagram of comparison of processing effects of a group of images according to an embodiment of this application.
Figure 4G:
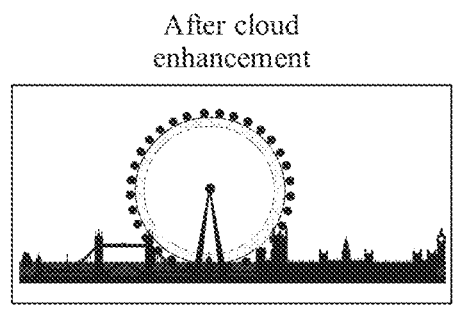
Figure 4G:
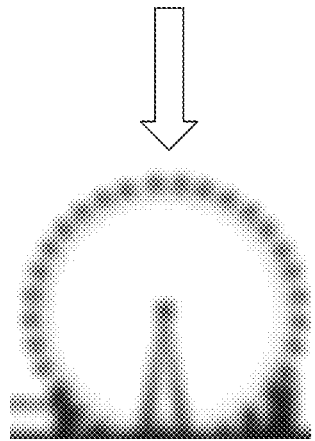
Figure 4G:
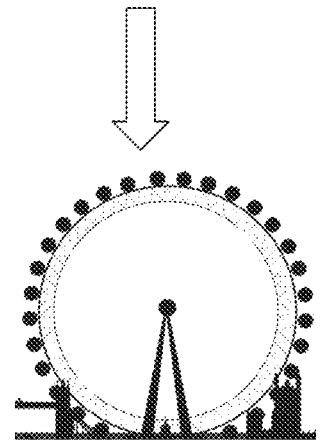

In FIG. 4G(a), FIG. 4G(b), FIG. 4G(c), and FIG. 4G(d), FIG. 4G(a) shows a photographed image before the terminal 100 performs enhancement by using the processing capability of the cloud server 200, FIG. 4G(b) shows an image obtained after the terminal 100 enhances the photographed image by using the processing capability of the cloud server 200, FIG. 4G(c) shows a local image of the photographed image in FIG. 4G(a), and FIG. 4G(d) shows a local image of the enhanced image in FIG. 4G(b). It can be learned by comparing FIG. 4G(a) and FIG. 4G(b) and comparing FIG. 4G(c) and FIG. 4G(d) that after the terminal 100 enhances the photographed image by using the processing capability of the cloud server 200, definition of the entire image and details are improved, and contrast, a dynamic range, a color, and the like of the image are also improved.

In some application scenarios, a terminal 100 may locally save many images. The images may be photographed by the terminal 100, sent by another device, or downloaded from a network. Because a photographing capability of a photographing device is limited, some images cannot present a high-quality image effect. Therefore, an embodiment of this application provides an image processing method. The terminal 100 enhances, by using a processing capability of a cloud server 200, an image stored in a gallery. In this way, an image effect of a photographed image can be improved, and it is also easy for a user to enhance, after the image is photographed, an effect of the photographed image by using the processing capability of the cloud server 200.

Figure 5A:
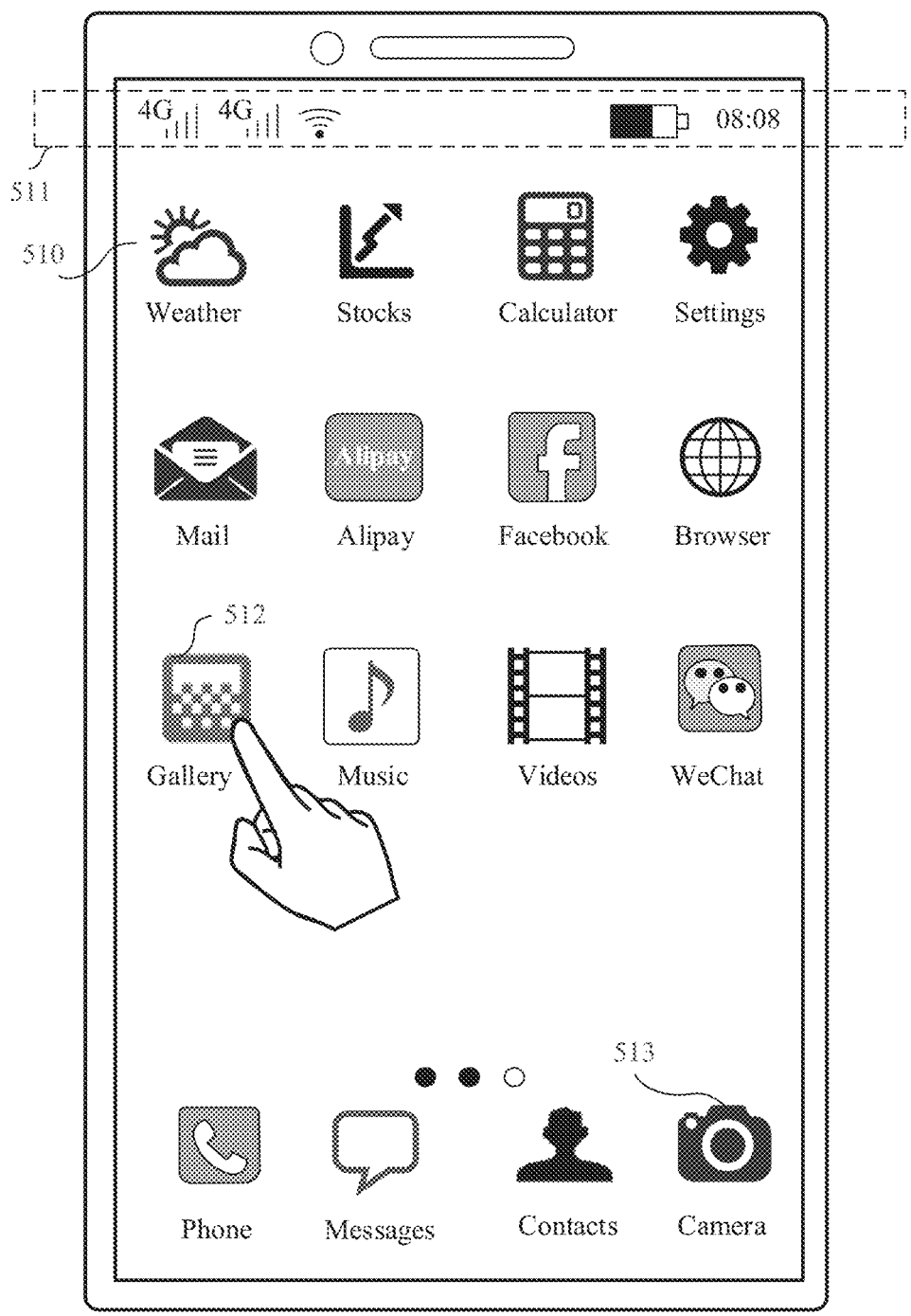
FIG. 5A to FIG. 5G are schematic diagrams of still another group of user interfaces according to an embodiment of this application.

As shown in FIG. 5A, the terminal 100 may display an interface 510 of a home screen. The interface 510 displays a page on which application icons are placed. The page includes a plurality of application icons (for example, a Weather application icon, a Stocks application icon, a Calculator application icon, a Settings application icon, a Mail application icon, an Alipay application icon, a Facebook application icon, a Browser application icon, a Gallery application icon 512, a Music application icon, a Videos application icon, and a WeChat application icon). A page indicator is further displayed below the plurality of application icons, to indicate a location relationship between a currently displayed page and another page. There are a plurality of tray icons (for example, a Phone application icon, a Messages application icon, a Contacts application icon, and a Camera application icon 513) below the page indicator. A status bar 511 is displayed in an area of an upper part of the interface 510. The interface 510 is the same as the interface 310 shown in FIG. 3A. Therefore, for a detailed text description of the interface 510, refer to the foregoing embodiment shown in FIG. 3A. Details are not described herein again.

The terminal 100 may receive an input operation performed by the user on the gallery application icon 512. In response to the input operation, the terminal 100 may display a gallery album interface 520 shown in FIG. 5B.

Figure 5B:
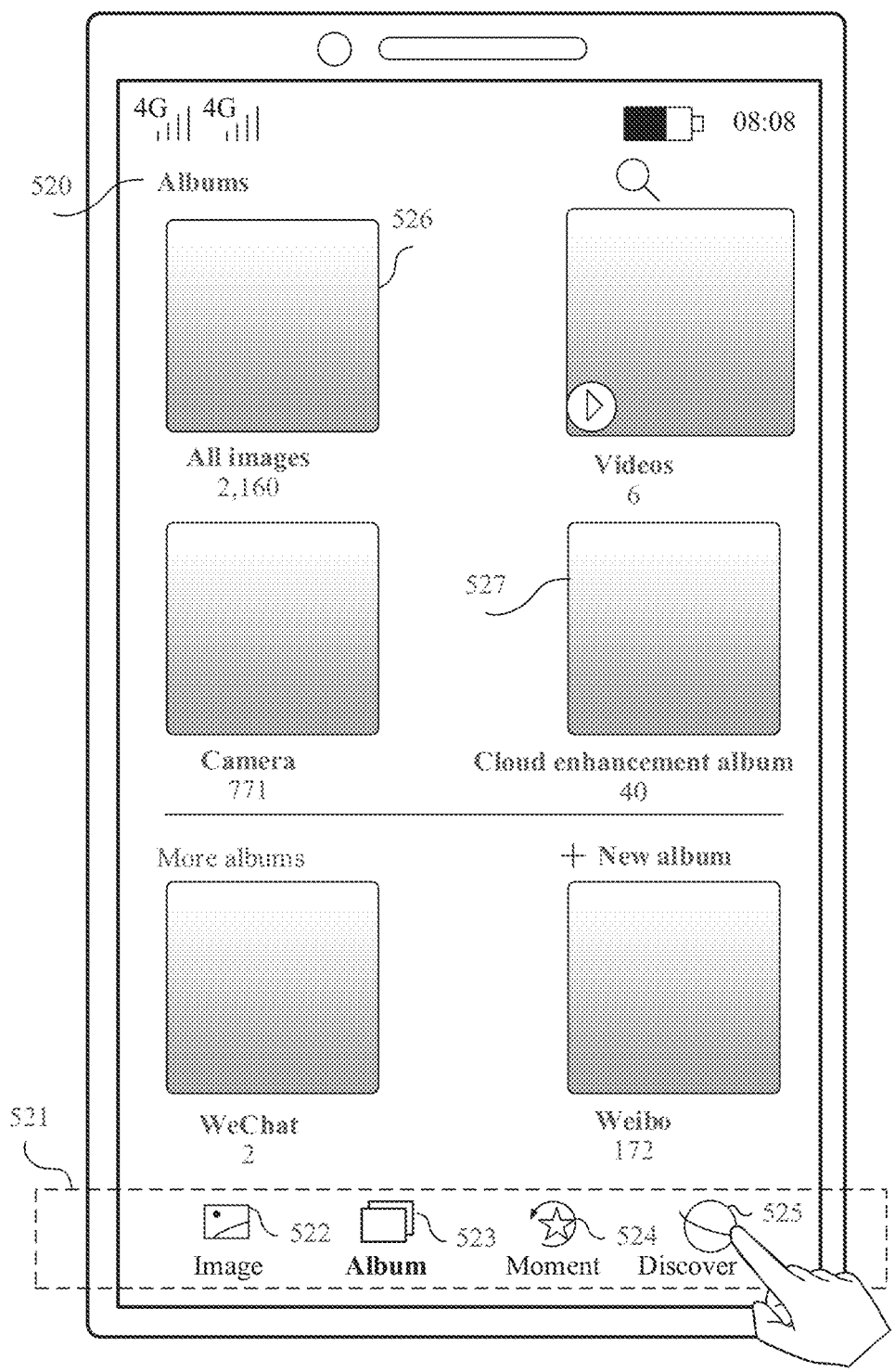

As shown in FIG. 5B, the gallery album interface 520 may display and include one or more albums (for example, an "all images" album 526, a video album, a camera album, a cloud enhancement album 527, a WeChat album, and a Weibo album). The terminal 100 may display a gallery menu 521 below the gallery album interface 520. The gallery menu 521 includes an "Image" control 522, an "Album" control 523, a "Moment" control 524, and a "Discover" control 525. The "Image" control 522 is used to trigger the terminal 100 to display all local images in a form of an image thumbnail. The "Album" control 523 is used to trigger the terminal 100 to display an album to which the local image belongs. As shown in FIG. 5B, the "Album" control 523 is currently selected, and the terminal 100 displays the gallery album interface 520. The "Moment" control 524 may be used to trigger the terminal 100 to display a locally stored featured image. The "Discover" control 525 may be used to trigger the terminal 100 to display image albums obtained after classification. For example, the terminal 100 may automatically classify images under portrait, place, scenic spot, and business district.

The terminal 100 may receive an input operation (for example, tapping) performed by the user on the "Discover" control 525. In response to the input operation, the terminal 100 may display a gallery discover interface 530 shown in FIG. 5C.

Figure 5C:
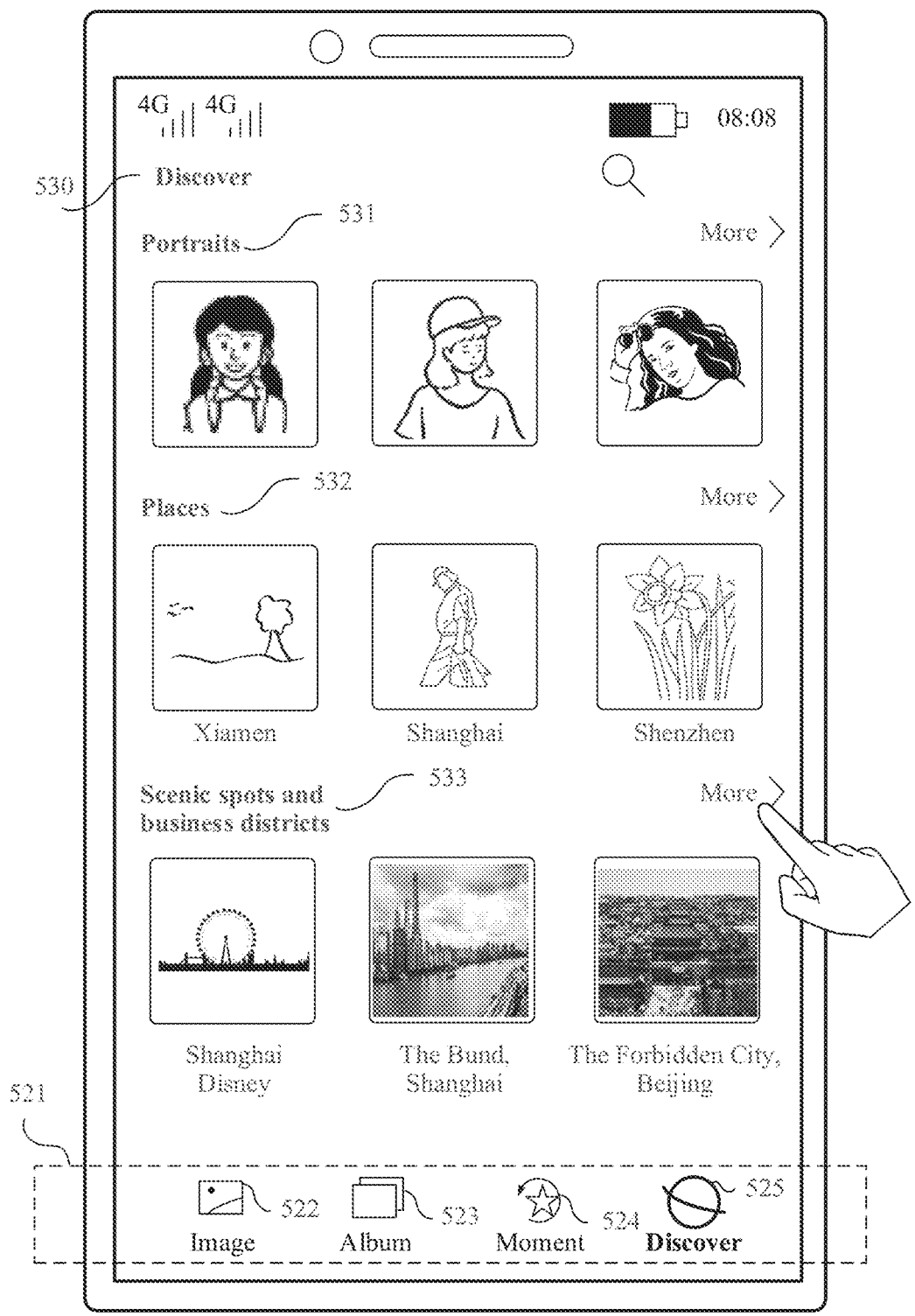

As shown in FIG. 5C, the gallery discover interface 530 displays a portrait type 531, a place type 532, a scenic spot and business district type 533. The portrait type 531 includes one or more images including portraits. The place type 532 includes one or more place albums (for example, a "Xiamen" album, a "Shanghai" album, and a "Shenzhen" album). The scenic spot and business district type 533 includes one or more scenic spot and business district albums (for example, a "Shanghai Disney" album, a "The Bund, Shanghai" album, and a "The Forbidden City, Beijing" album).

The terminal 100 may receive an input operation (for example, tapping) performed by the user on the scenic spot and business district type 533. In response to the input operation, the terminal 100 may display a scenic spot and business district type interface 540 shown in FIG. 5D.

Figure 5D:
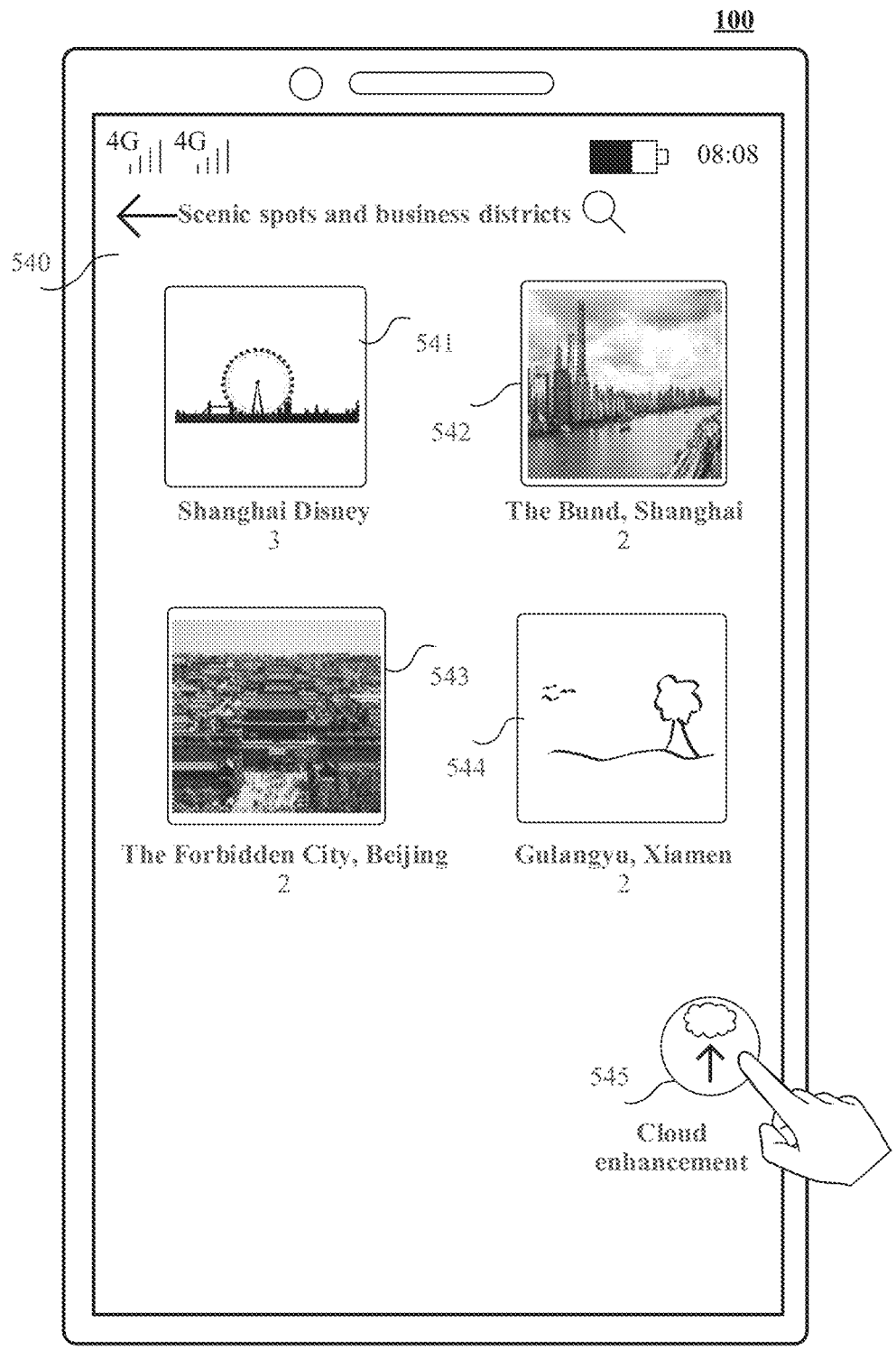

As shown in FIG. 5D, the scenic spot and business district type interface 540 displays and includes one or more albums (for example, an album 541, an album 542, an album 543, and an album 544) and a "Cloud enhancement" control 545. Below each album, there is a scenic spot or business district name corresponding to the album and a quantity of images in the album. For example, a scenic spot or business district name corresponding to the album 541 is "Shanghai Disney", and the album 541 includes three images. A scenic spot or business district name corresponding to the album 542 is "The Bund, Shanghai", and the album 542 includes two images. A scenic spot or business district name corresponding to the album 543 is "The Forbidden City, Beijing", and the album 543 includes two images. A scenic spot or business district name corresponding to the album 544 is "Gulangyu, Xiamen", and the album 544 includes two images. The foregoing example is merely used to explain this application, and should not constitute a limitation.

The terminal 100 may receive an input operation (for example, tapping) performed by the user on the "Cloud enhancement" control 545. In response to the input operation, the terminal 100 may display a cloud enhancement interface 550 shown in FIG. 5E.

Figure 5E:
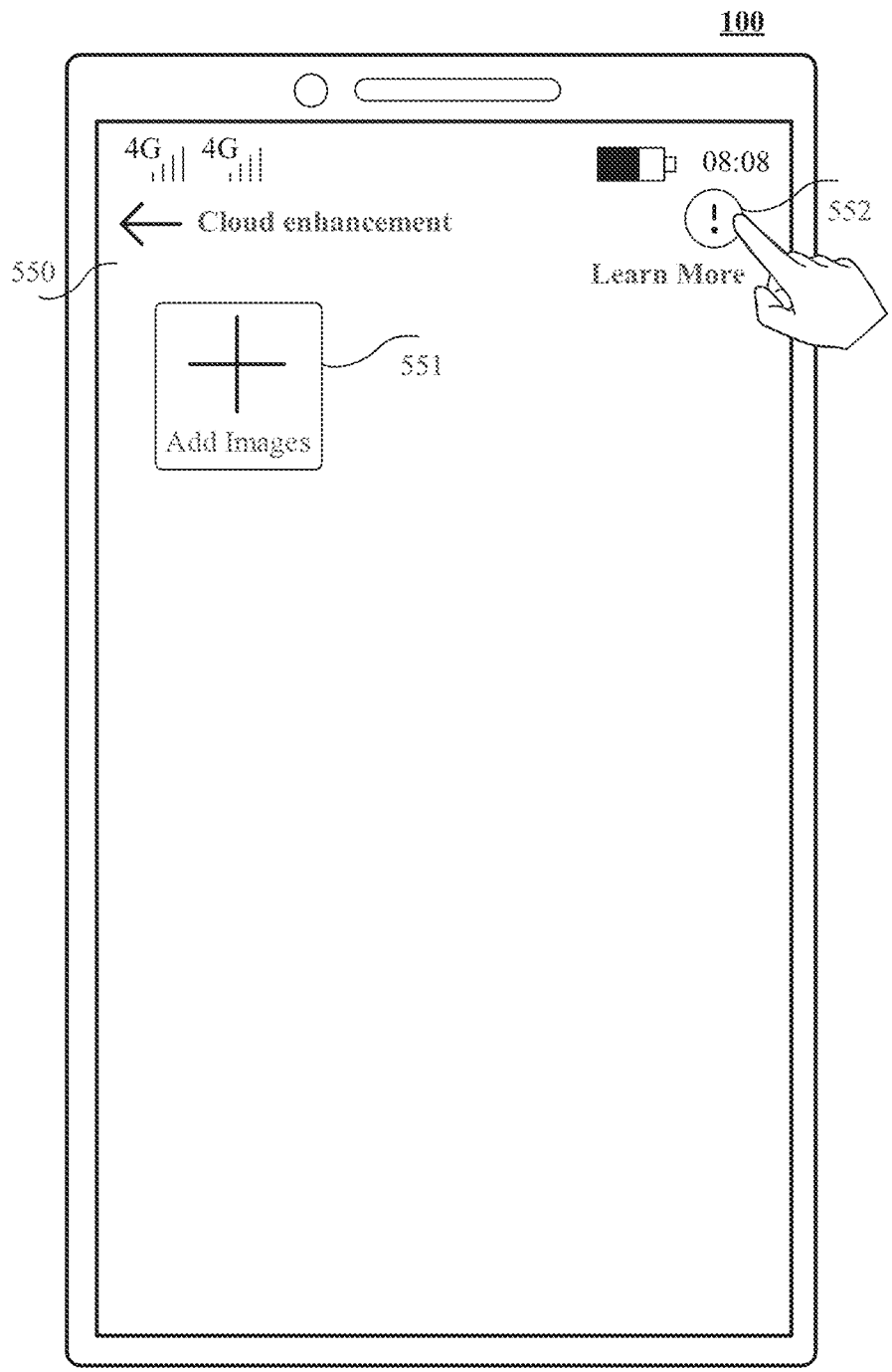

As shown in FIG. 5E, the cloud enhancement interface 550 displays and includes an "Add Images" control 551 and a "Learn More" control 552. The "Add Images" control 551 may be used to trigger the terminal 100 to select an image to be enhanced by using the processing capability of the cloud server 200. The "Learn More" control 552 may be used to trigger the terminal 100 to display an effect of a cloud enhancement function and related information.

The terminal 100 may receive an input operation (for example, tapping) performed by the user on the "Learn More" control 552. In response to the input operation, the terminal 100 may display a cloud enhancement detail page 56) shown in FIG. 5F.

Figure 5F:
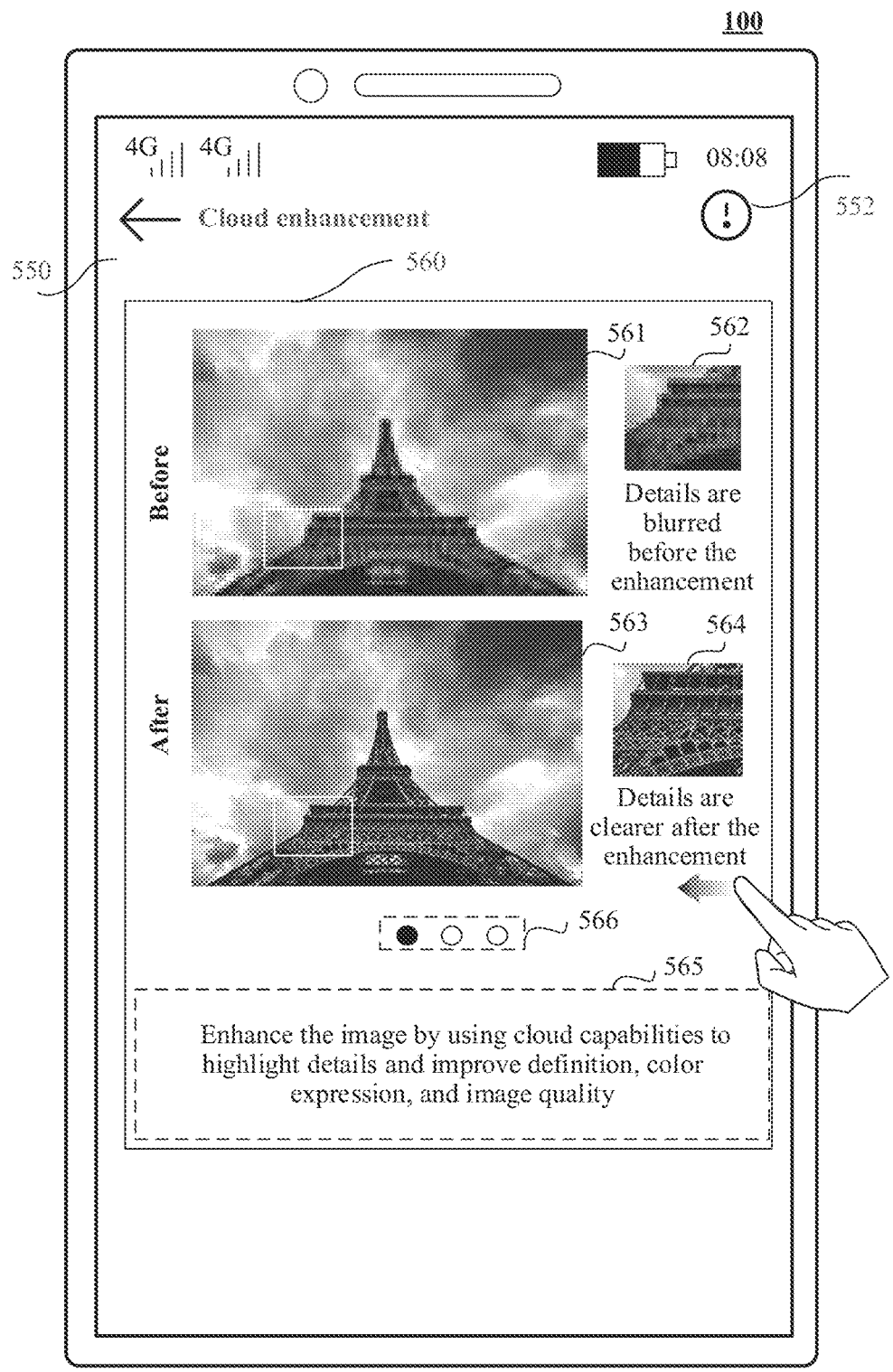

As shown in FIG. 5F, the cloud enhancement detail page 560 displays effect comparison images of the cloud enhancement function. For example, the cloud enhancement detail page 560 may display an image 561 before cloud enhancement processing, a detail image 562 of the image 561, an image 563 after the cloud enhancement processing, a detail image 564 of the image 563, and a comparison result (for example, "Details are blurred before the enhancement, and details are clearer after the enhancement"). The cloud enhancement detail page 560 may further display a text description 565 (for example, "Enhance the image by using cloud capabilities to highlight details and improve definition, color expression, and image quality") of the cloud enhancement function. The cloud enhancement detail page 560 may further display a page indicator 566, and the page indicator 566 may be used to indicate a location relationship between a page on which current effect comparison images are located and a page on which other effect comparison images are located.

The terminal 100 may receive an input operation (for example, sliding left) performed by the user on the cloud enhancement detail page 560. In response to the input operation, as shown in FIG. 5G, the terminal 100 may switch to another group of effect comparison images on the cloud enhancement detail page 560 for display.

Figure 5G:
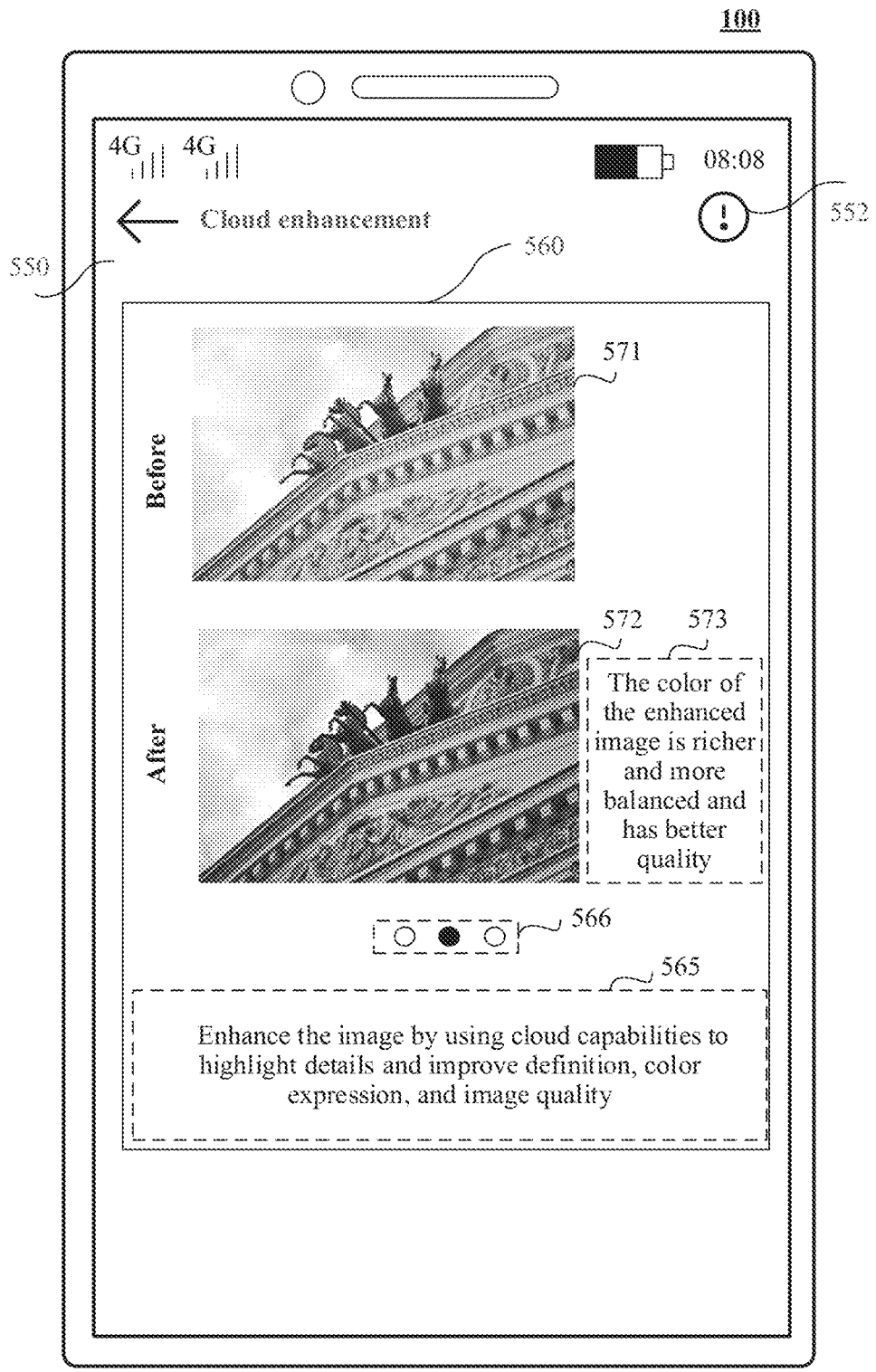

As shown in FIG. 5G, the terminal 100 may display an image 571 before cloud enhancement processing, an image 572 after the cloud enhancement processing, and a comparison result 573 (for example, "The color of the enhanced image is richer and more balanced and has better quality") on the cloud enhancement page 560.

After enabling the enhancement function, the terminal 100 may receive an operation of the user, and select an image from the gallery application. The terminal 100 may obtain the image and environment information (for example, geographic location information, weather information, time information, a photographing parameter, or photographing posture information) of the image, upload the image and the environment information to the cloud server 200, and enhance, by using the processing capability of the cloud server 200, the image selected by the user.

Figure 6A:
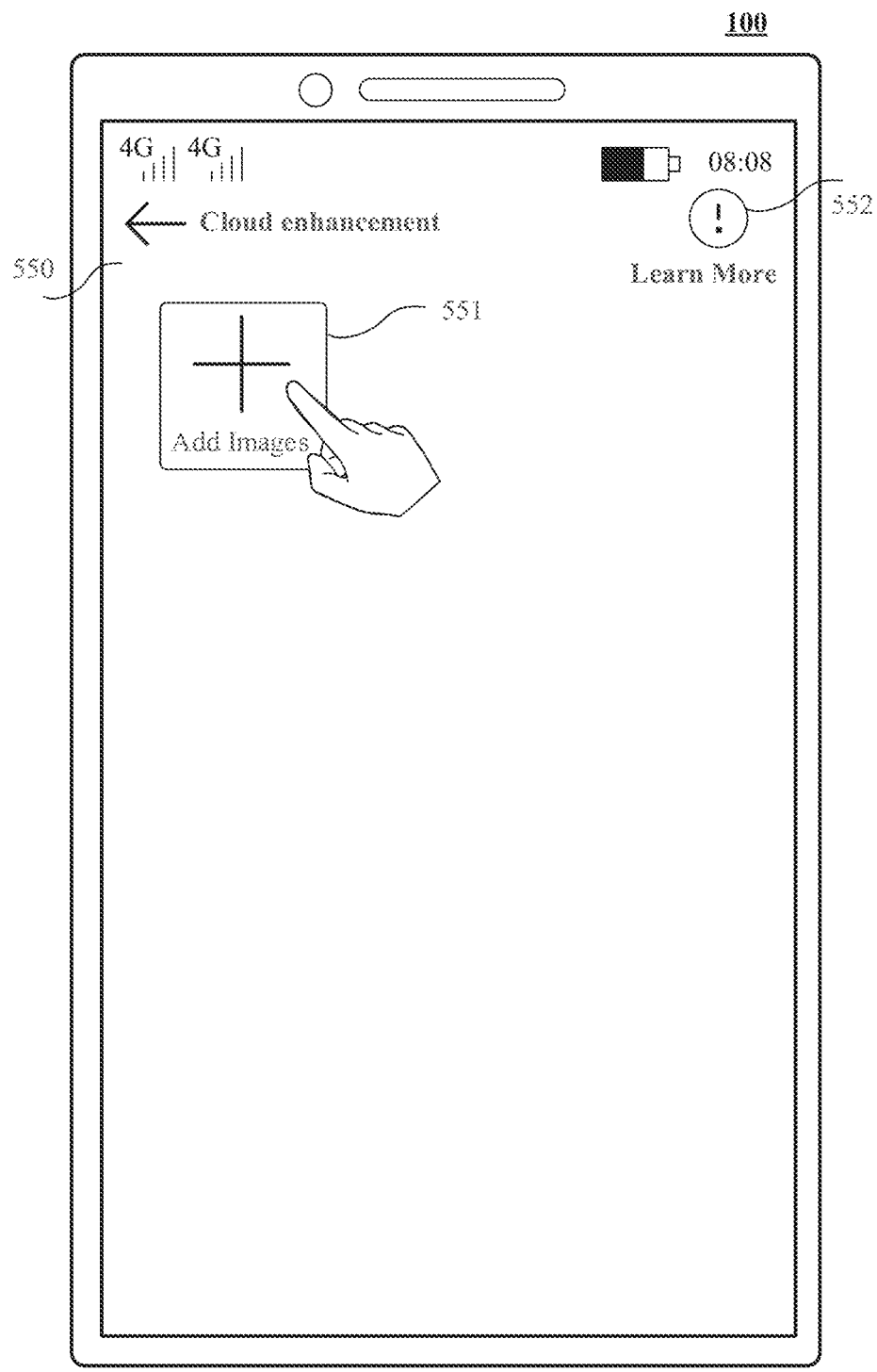
FIG. 6A to FIG. 6P are schematic diagrams of still another group of user interfaces according to an embodiment of this application.

As shown in FIG. 6A, the terminal 100 displays the cloud enhancement interface 550. The cloud enhancement interface 550 displays and includes the "Add Images" control 551 and the "Learn More" control 552. For a text description of the cloud enhancement interface 550, refer to the foregoing embodiment shown in FIG. 5E. Details are not described herein again. The terminal 100 may receive an input operation (for example, tapping) performed by the user on the "Add Images" control 551. In response to the input operation, the terminal 100 may display an image selection interface 610 shown in FIG. 6B.

Figure 6B:
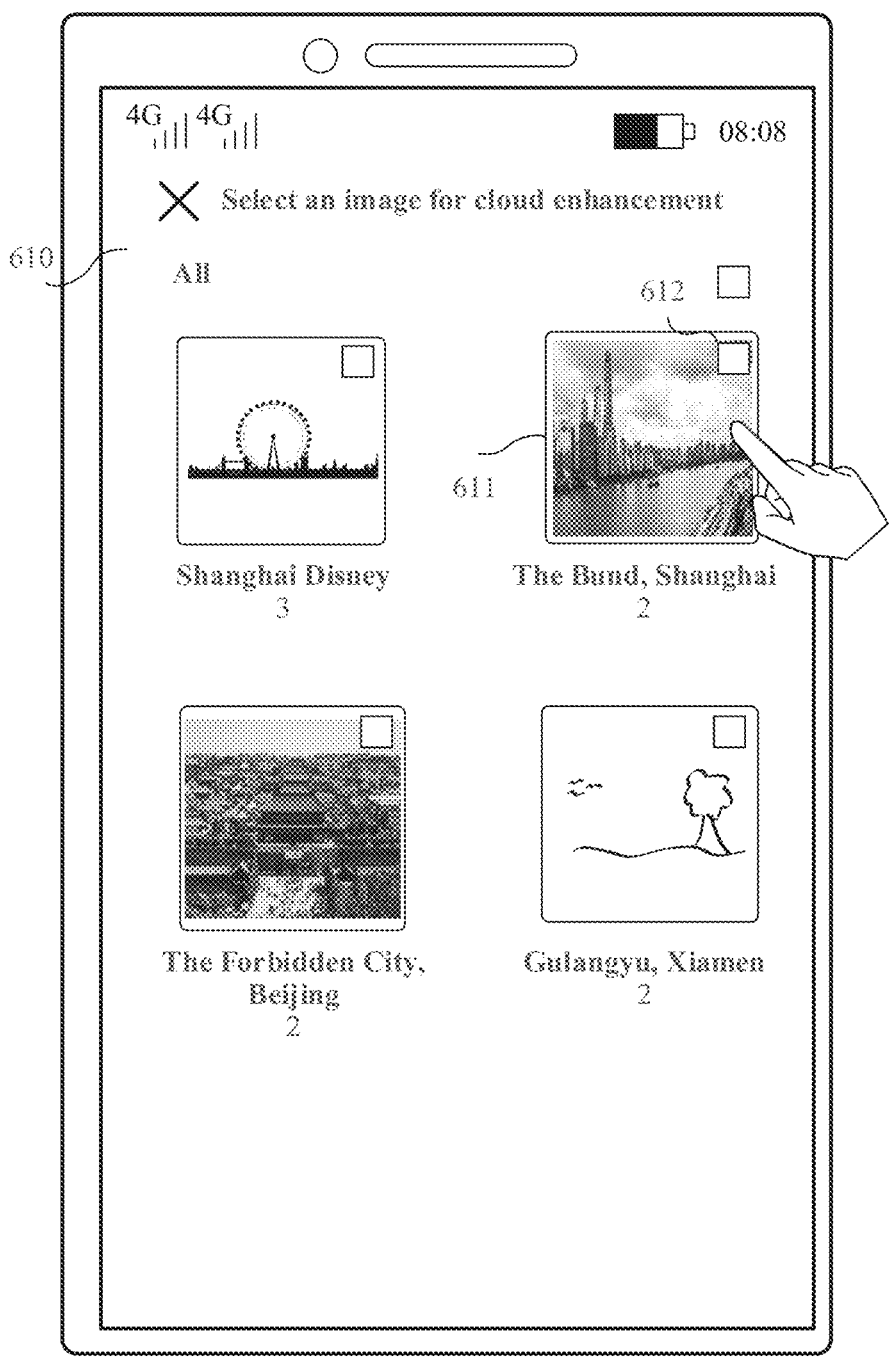

As shown in FIG. 6B, the image selection interface 610 displays and includes one or more albums (for example, a "Shanghai Disney" album, a "The Bund, Shanghai" album 611, a "The Forbidden City, Beijing" album, and a "Gulangyu, Xiamen" album) on which cloud enhancement can be performed. Environment information of images in these albums is complete, and the images can be enhanced by using the processing capability of the cloud server 200. Each album in the image selection interface 610 may further display a selection box (for example, a selection box 612 displayed on the "The Bund, Shanghai" album 611), and the selection box may be used to select all images in the album. A quantity of images in each album is displayed below the album.

The terminal 100 may receive an input operation (for example, tapping) performed by the user on the "The Bund, Shanghai" album 611. In response to the input operation, the terminal 100 may display an album interface 620 shown in FIG. 6C.

Figure 6C:
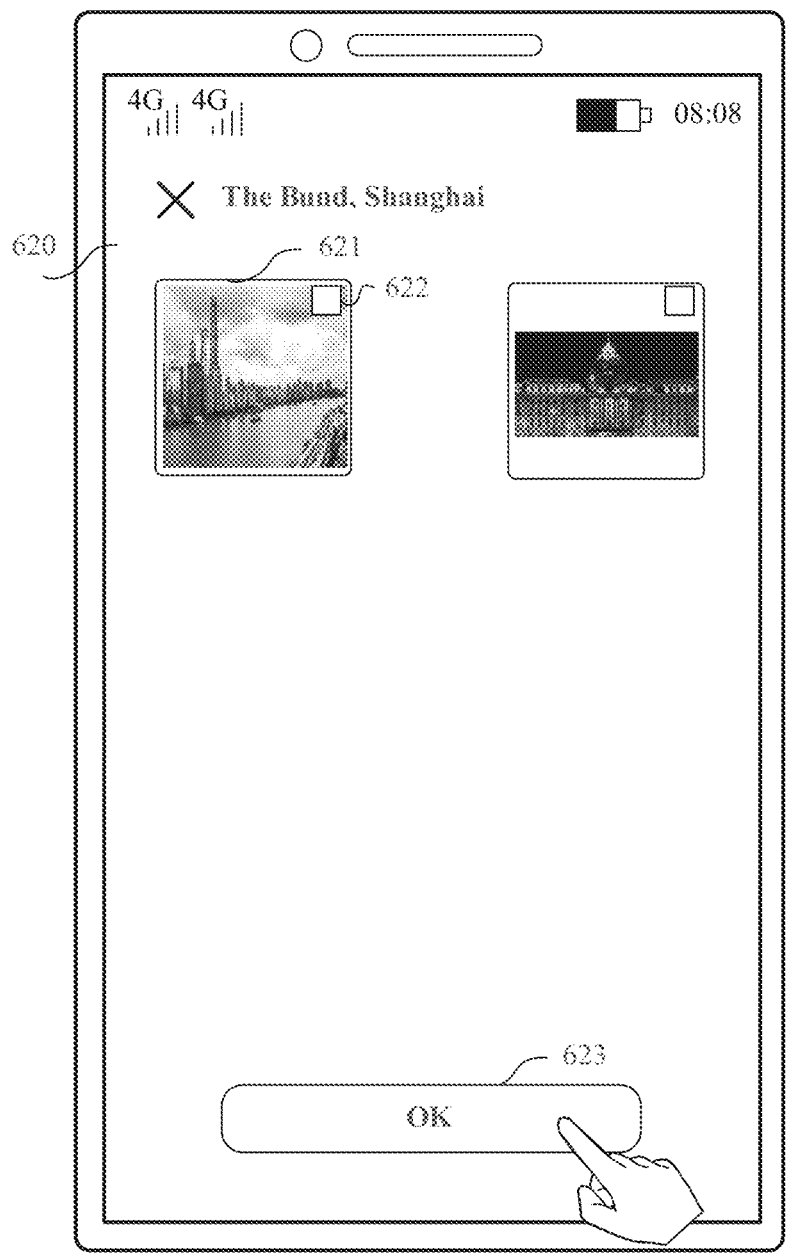

As shown in FIG. 6C, a name of the album interface 620 is "The Bund, Shanghai". The album interface 620 displays and includes thumbnails (for example, a thumbnail 621) of one or more images with complete environment information and an "OK" control 623. A selection box is displayed on a thumbnail of each image in the album interface 620, and the selection box may be used to select the image. As shown in FIG. 6C, the user has selected an image corresponding to the thumbnail 621.

After the user selects the image, the terminal 100 may receive an input operation (for example, tapping) performed by the user on the "OK" control 623. In response to the input operation, the terminal 100 may display the image selection interface 610 shown in FIG. 6D again, and display a quantity of selected images in the image selection interface 610 and an "OK" control 613.

Figure 6D:
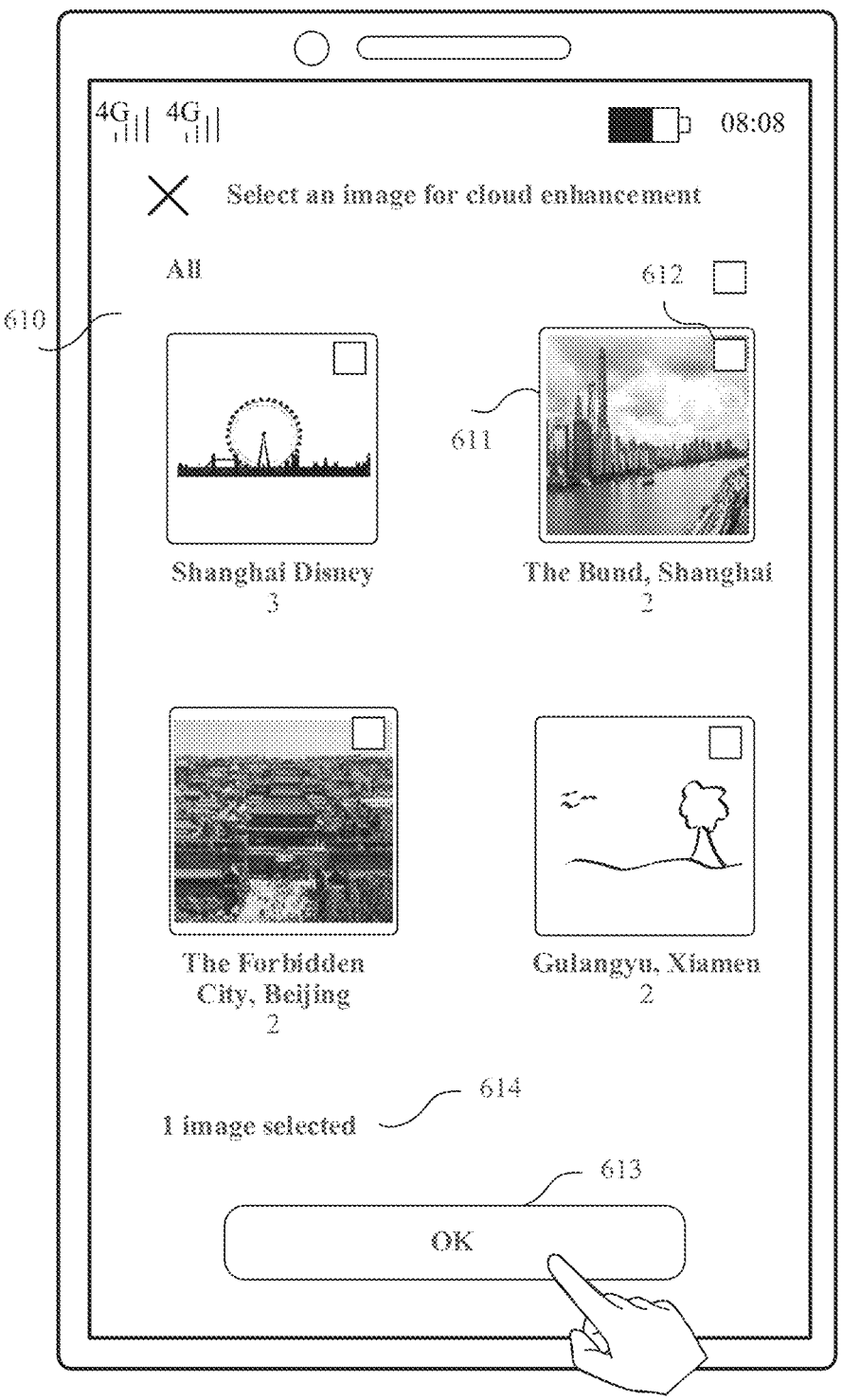

As shown in FIG. 6D, the terminal 100 displays a quantity 614 of selected images (for example, "One image is selected") and the "OK" control 613 in the image selection interface 610.

The terminal 100 may receive an input operation (for example, tapping) performed by the user on the "OK" control 613. In response to the input operation, the terminal 100 may display a thumbnail (for example, a thumbnail 631) of the selected image and an upload control 633 in the cloud enhancement interface 550 shown in FIG. 6E. A "Delete" control 632 is displayed below the thumbnail of the selected image, and the "Delete" control 632 may be used to trigger the terminal 100 to delete the image selected by the user. A text description (for example, "Upload the image to the cloud for effect enhancement") may be displayed on the upload control 633. The upload control 633 may be used by the terminal 100 to upload the image selected by the user and environment information of the image to the cloud server 200, to enhance, by using the processing capability of the cloud server 200, an effect of the image selected by the user.

In some embodiments, when enhancing, by using the processing capability of the cloud server 200, the image selected by the user, the terminal 100 needs to first send the image selected by the user and the environment information of the image to the cloud server 200. Therefore, when the user triggers the terminal 100 to start to upload the selected image and the environment information of the image, the terminal 100 may detect a current network status. If the network status is "disconnected" and the terminal 100 cannot be connected to the cloud server 200, the terminal 100 may output an upload failure prompt. The upload failure prompt may be used to indicate the user to perform uploading after the terminal 100 is connected to the network.

Figure 6E:
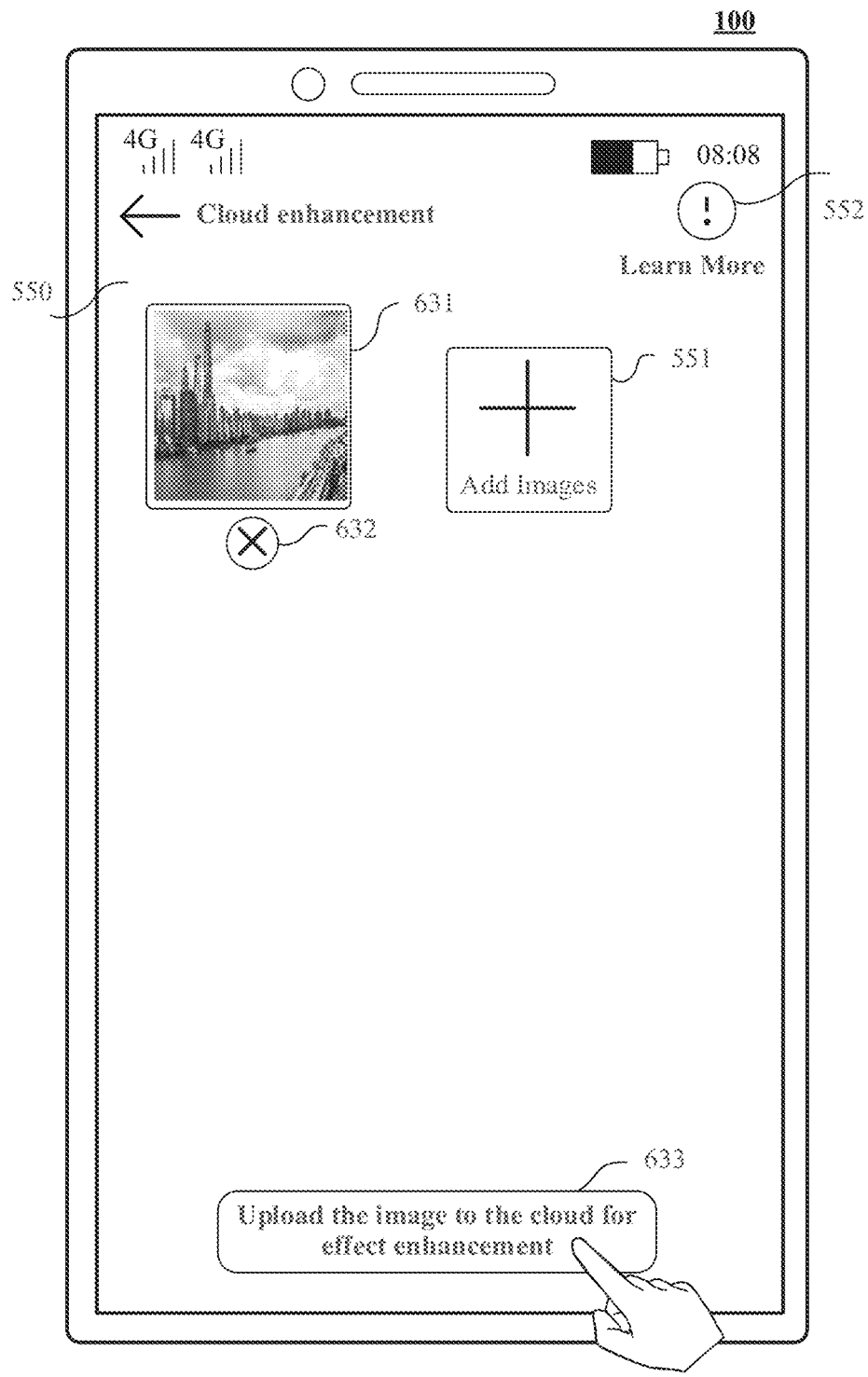

For example, as shown in FIG. 6E, the terminal 100 receives an input operation (for example, tapping) performed by the user on the upload control 633. In response to the input operation, the terminal 100 may first detect the current network status. If the terminal 100 is currently disconnected from the network and cannot be connected to the cloud server 200, the terminal 100 displays an upload failure prompt 634 shown in FIG. 6F.

Figure 6F:
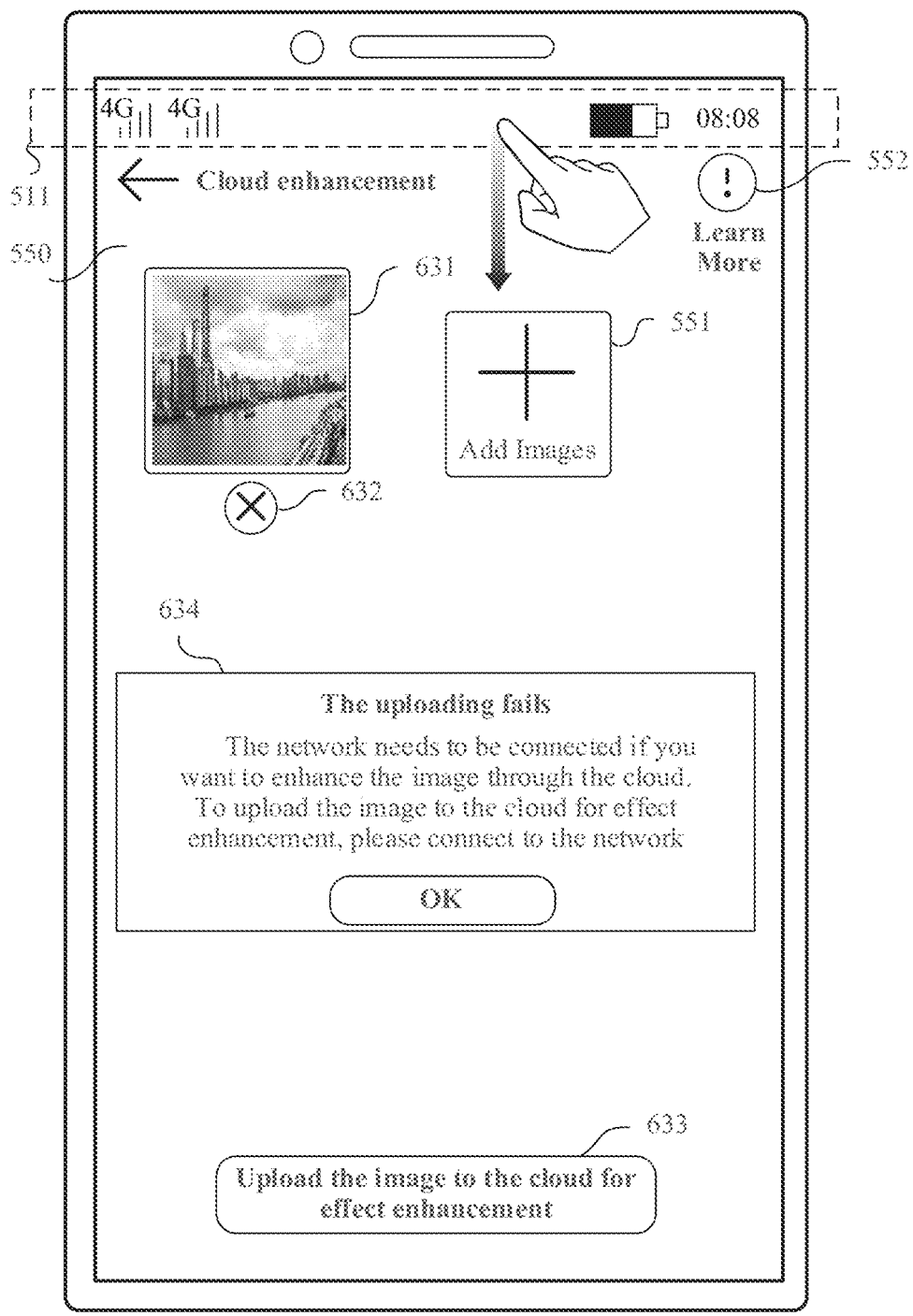

As shown in FIG. 6F, the upload failure prompt 634 displays a text prompt "The uploading fails, and the network needs to be connected if you want to enhance the image through the cloud. To upload the image to the cloud for effect enhancement, please connect to the network".

After displaying the upload failure prompt, the terminal 100 may receive an input of the user, connect to the network, and communicate with the cloud server 200. After the terminal 100 is connected to the network, the terminal 100 may receive an input operation performed by the user on the upload control 633 again, and send the image selected by the user and the environment information of the image to the cloud server 200.

For example, as shown in FIG. 6F, the terminal 100 may receive an input operation (for example, sliding down) performed by the user on the status bar 511. In response to the input operation, the terminal 100 may display a menu window 640 shown in FIG. 6G.

Figure 6G:
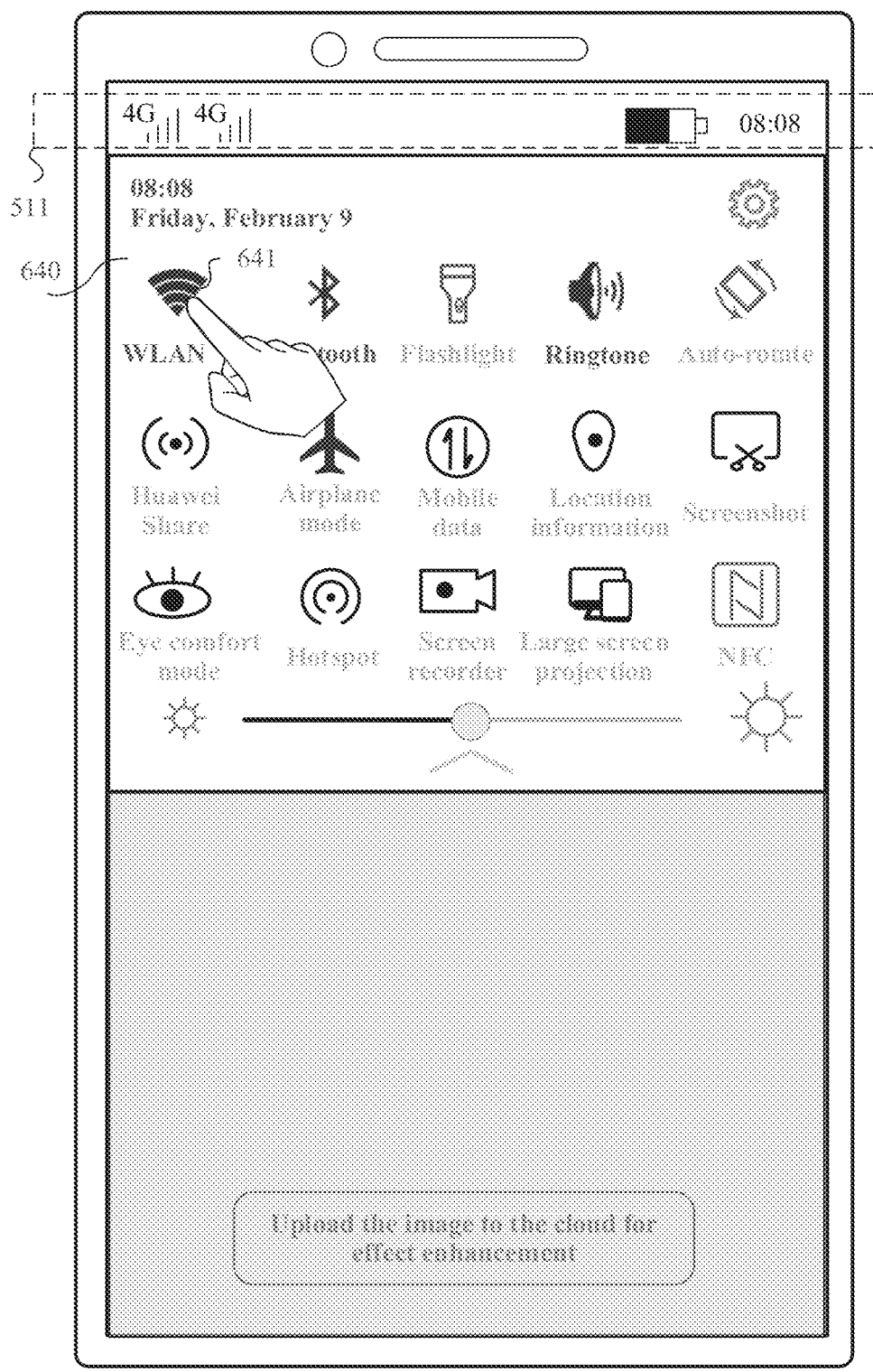

As shown in FIG. 6G, the menu window 420 may display some function controls (for example, a "Wireless local area network (WLAN)" control 641, a "Bluetooth" control, a "Flashlight" control, a "Ringtone" control, an "Auto-rotate" control, and a "Huawei Share (Huawei Share)" control). The "Wireless local area network" control 641 is currently in a disabled state.

Figure 6H:
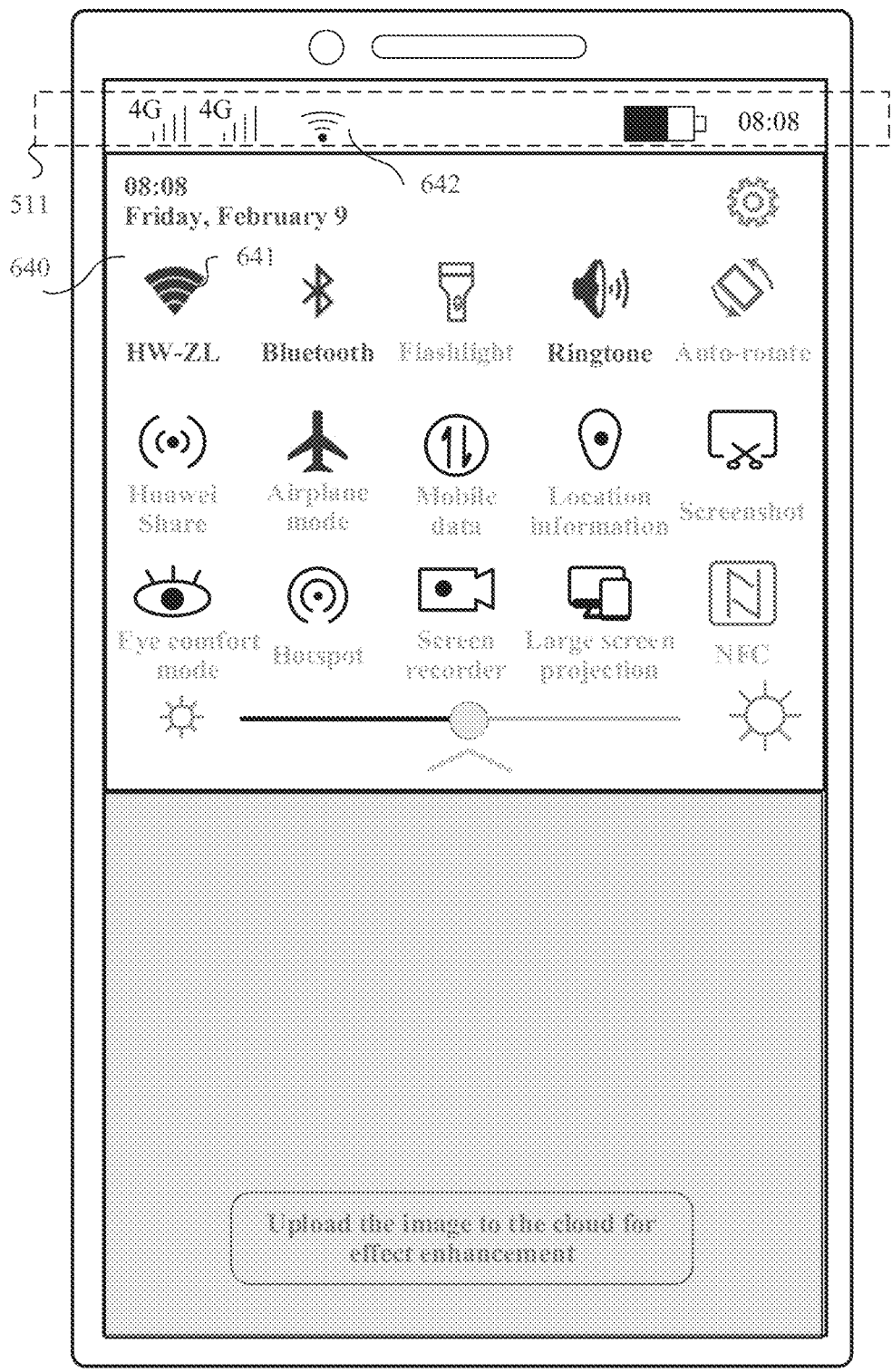

The terminal 100 may receive an input operation (for example, tapping) performed by the user on the "Wireless local area network" control 641. In response to the input operation, the terminal 100 may enable a wireless local area network option and connect to a connectable Wi-Fi network. As shown in FIG. 6H, after enabling the wireless local area network option, the terminal 100 is connected to the Wi-Fi network, displays a name (for example. "HW-ZL") of the connected Wi-Fi network below the "Wireless local area network" control 641, and displays a Wi-Fi signal indicator 642 in the status bar 511. The Wi-Fi signal indicator 642 is used to indicate that the current network status of the terminal 100 is normal and the terminal 100 can be connected to the cloud server 200.

Figure 6I:
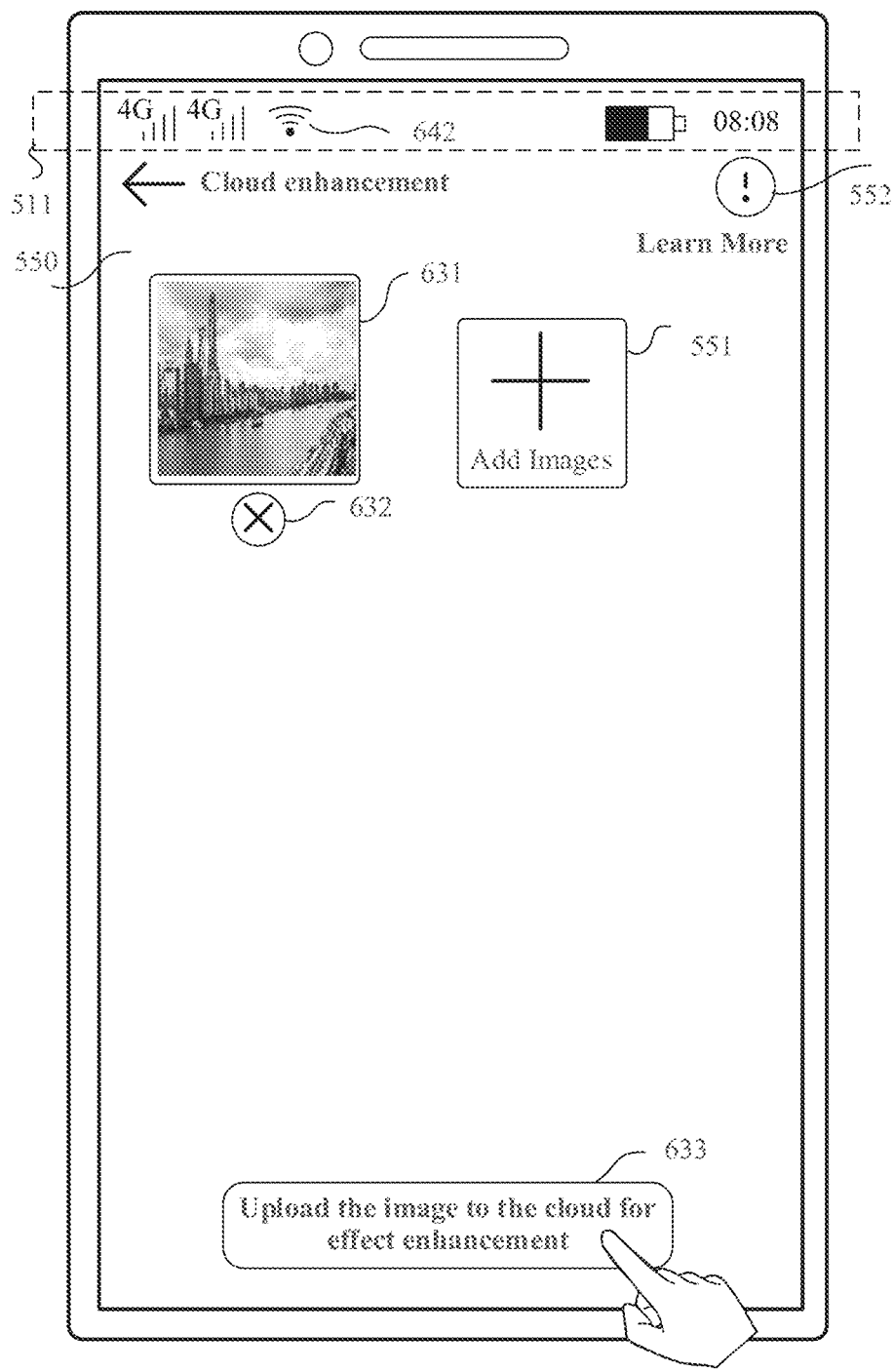

As shown in FIG. 6I, after being connected to the network, the terminal 100 may receive an input operation (for example, tapping) performed by the user on the upload control 633 in the cloud enhancement interface 550. In response to the input operation, the terminal 100 may upload the image selected by the user and the environment information of the image to the cloud server 200.

In some embodiments, because the cloud server 200 may enhance images uploaded by a plurality of terminals, when the cloud server 200 has excessive image enhancement tasks, the cloud server 200 queues these tasks. When an image enhancement task requested by the terminal 100 needs to queue, the terminal 100 may output a queuing prompt, keep communication with the cloud server 200 in the background, and monitor queuing progress. For the image enhancement task, the queuing prompt may be used to indicate that the current image enhancement task is queuing and waiting is required.

Figure 6J:
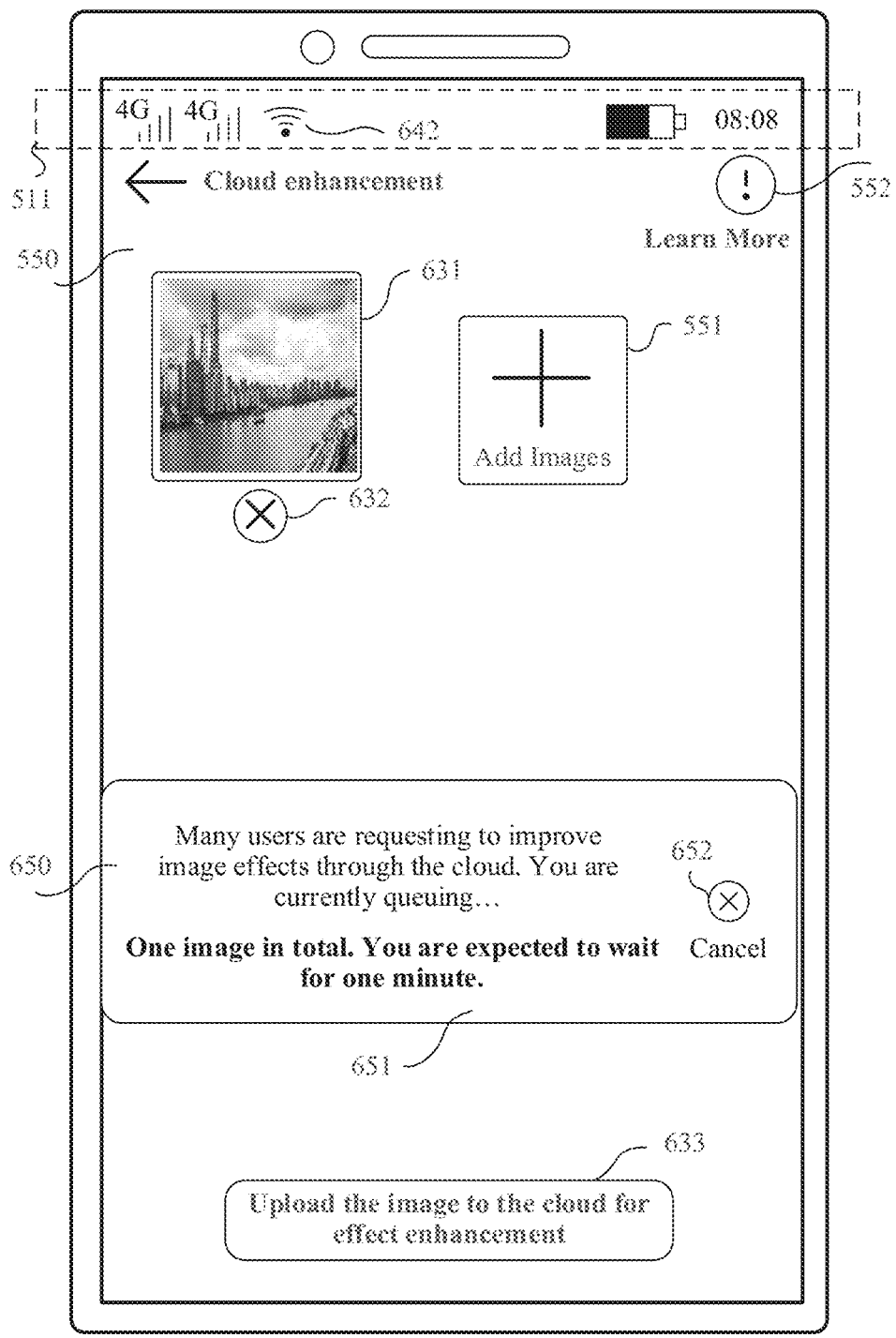

For example, as shown in FIG. 6J, after the terminal 100 sends the selected image and the environment information of the image to the cloud server 200, the terminal 100 may periodically obtain processing progress of enhancing the selected image from the cloud server 200. When a quantity of image enhancement tasks on the cloud server 200 reaches a specified quantity, the cloud server 200 may queue a task request coming from the terminal 100, and periodically send queuing progress to the terminal 100. The terminal 100 may output a progress prompt window 650. The progress prompt window 650 displays a reason for slow progress of the current task (for example, "Many users are requesting to improve image effects through the cloud. You are currently queuing""), waiting time 651 (for example, "There is one image. You are expected to wait for one minute"), and a "Cancel" control 652. The "Cancel" control 652 may be used to trigger the terminal 100 to send a cancellation request to the cloud server 200, and the cancellation request is used to request the cloud server 200 to cancel enhancement on the uploaded image of the terminal 100.

When the cloud server 200 starts to process the image enhancement task of the terminal 100, the cloud server 200 may send a start-to-process response to the terminal 100. After receiving the start-to-process response, the terminal 100 may display a processing prompt. The processing prompt may be used to notify the user that the cloud server 200 is currently processing the image enhancement task.

Figure 6K:
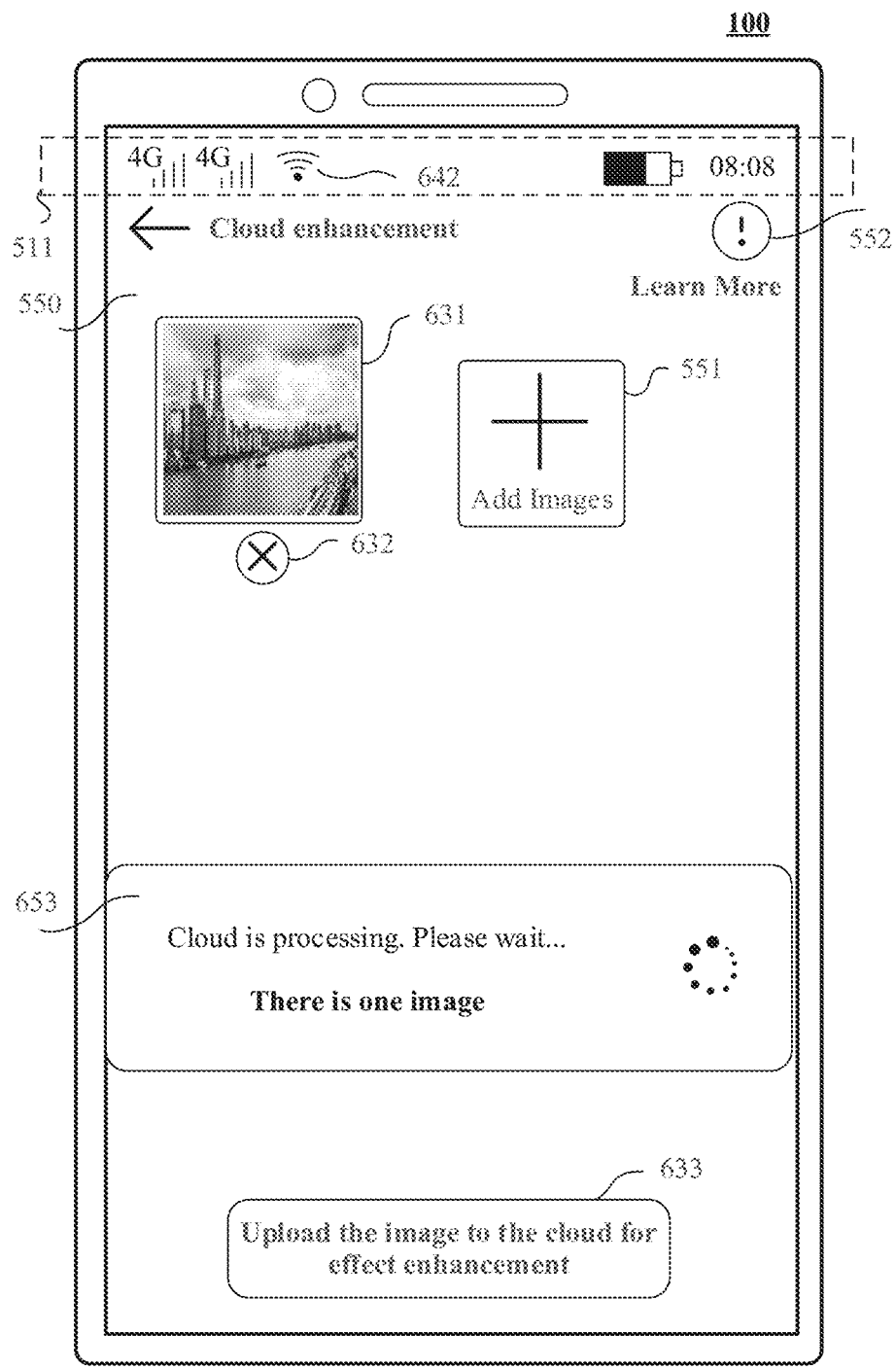

For example, as shown in FIG. 6K, the terminal 100 may display a processing prompt 653 when the cloud server 200 is processing the image enhancement task of the terminal 100. For example, the processing prompt 653 may be a text prompt "Cloud is processing. Please wait. There is one image". The foregoing example is merely used to explain this application, and should not constitute a limitation.

In some embodiments, if the terminal 100 is disconnected from the cloud server 200 after the terminal 100 uploads the selected image and the environment information of the image to the cloud server 200, the terminal 100 may output a network disconnection prompt. The network disconnection prompt may be used to notify the user that the terminal 100 is currently disconnected from the network and needs to be connected to the network to obtain an image enhancement result.

Figure 6L:
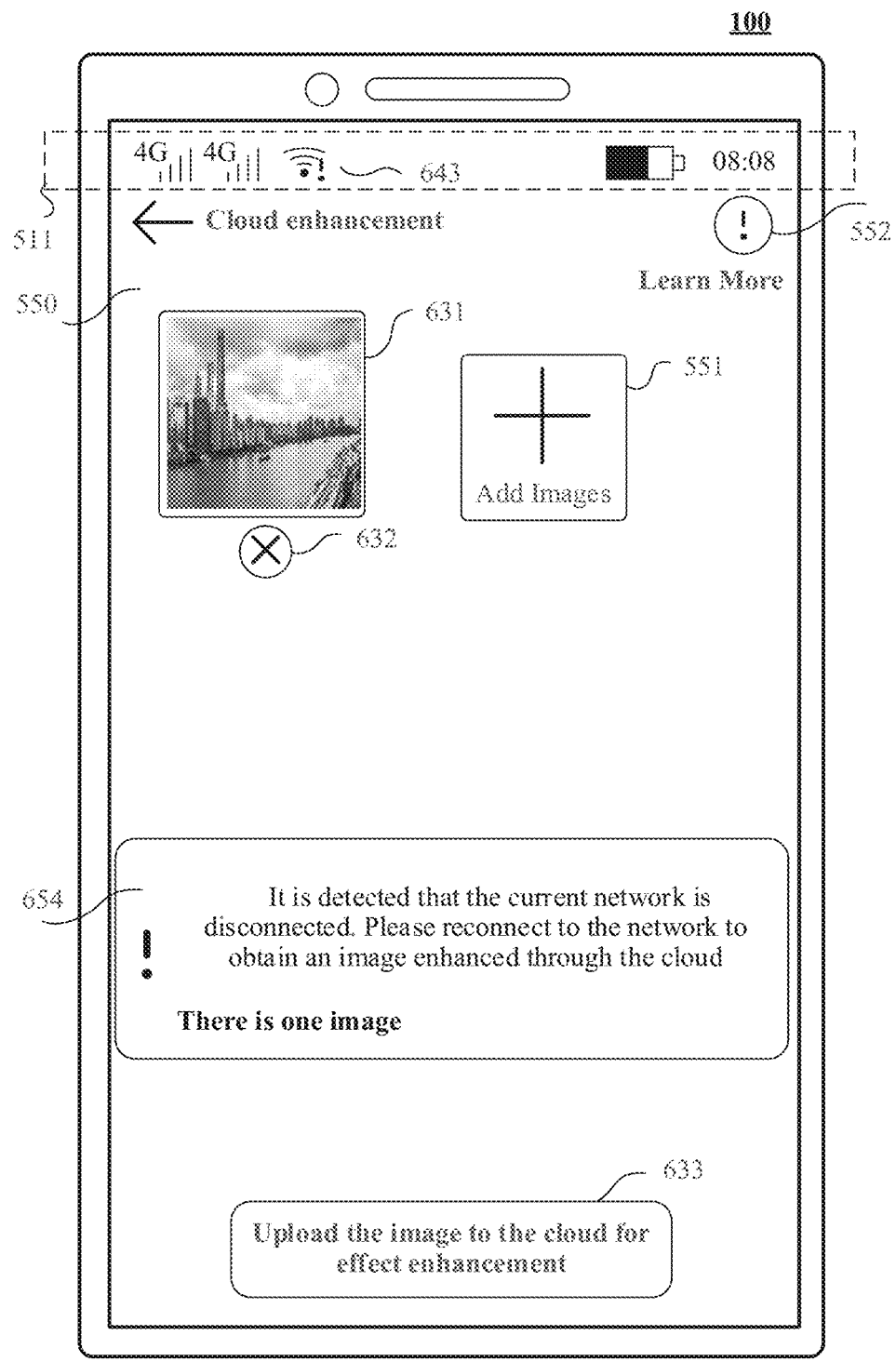

For example, as shown in FIG. 6L, after the terminal 100 uploads the selected image and the environment information of the image to the cloud server 200, the terminal 100 is disconnected from the network and cannot be connected to the cloud server 200. The terminal 100 may display a network disconnection identifier 643 in the status bar 511 to notify the user that the terminal 100 is currently disconnected from the network. The terminal 100 may further display a network disconnection prompt 654. For example, the network disconnection prompt 654 may be a text prompt "it is detected that the current network is disconnected. Please reconnect to the network to obtain an image enhanced through the cloud". The foregoing example is merely used to explain this application, and should not constitute a limitation.

Figure 6M:
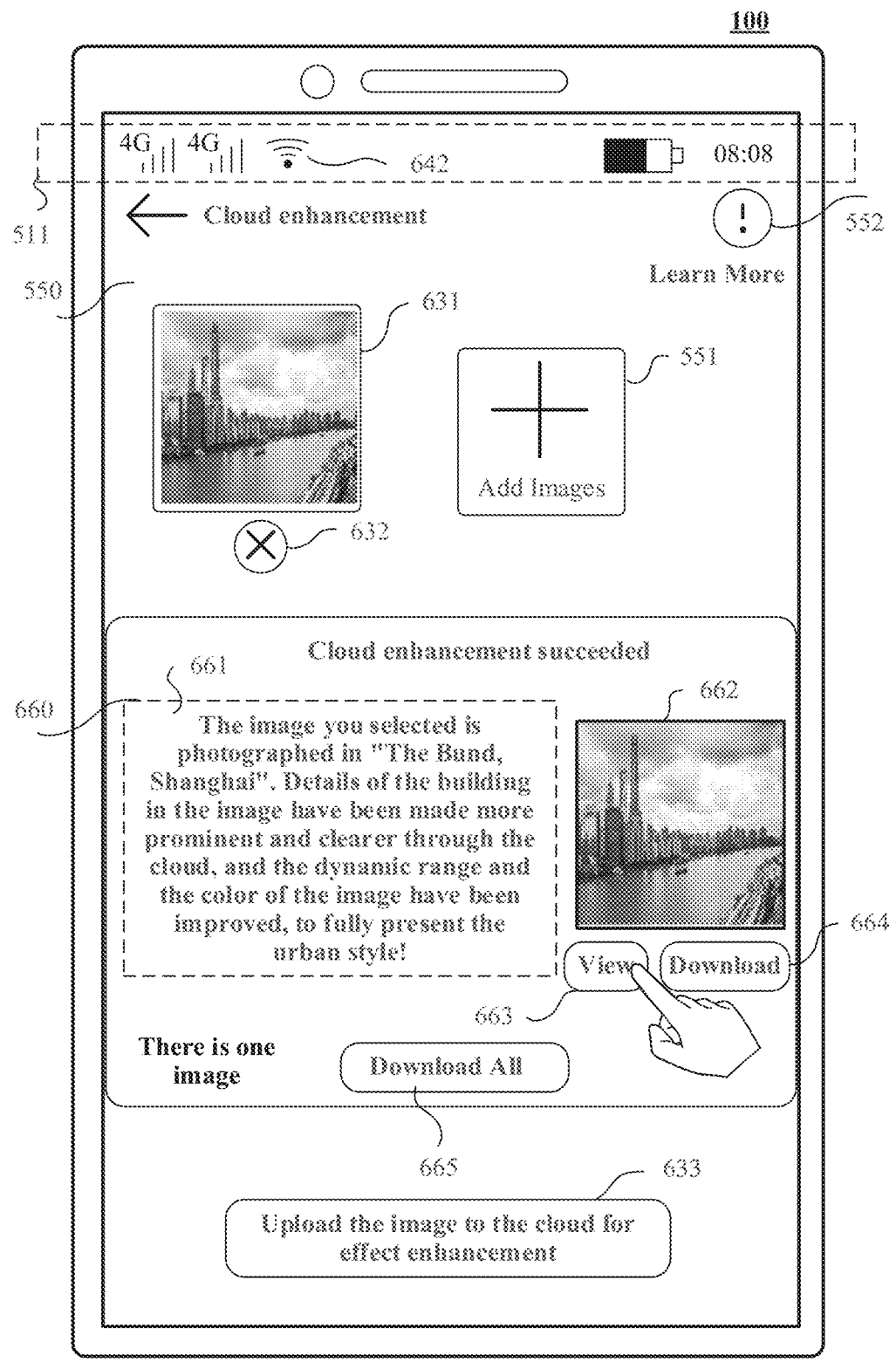

As shown in FIG. 6M, after the terminal 100 completes, by using the processing capability of the cloud server 200, enhancing the image selected by the user, the terminal 100 may display an enhancement success prompt window 660 in the cloud enhancement interface 550. The enhancement success prompt window 660 may display and include an effect description 661 of enhancement on the selected image. For example, text content corresponding to the effect description 661 may be "The image you selected is photographed in "The Bund, Shanghai". Details of the building in the image have been made more prominent and clearer through the cloud, and the dynamic range and the color of the image have been improved, to fully present the urban style". The enhancement success prompt window 660 displays and includes a thumbnail 662 corresponding to an enhanced image, a "View" control 663, a "Download" control 664, and a "Download All" control 665. The "View" control 663 may be used to view the enhanced image. The "Download" control 664 may be used to save the enhanced image in a locally specified storage path of the terminal 100. The "Download All" control 665 may be used to save, when there are a plurality of enhanced images, the plurality of enhanced images in the locally specified storage path of the terminal 100.

The terminal 100 may receive an input operation (for example, tapping) performed by the user on the "View" control 663. In response to the input operation, the terminal 100 may display an image browsing interface 670 shown in FIG. 6N.

Figure 6N:
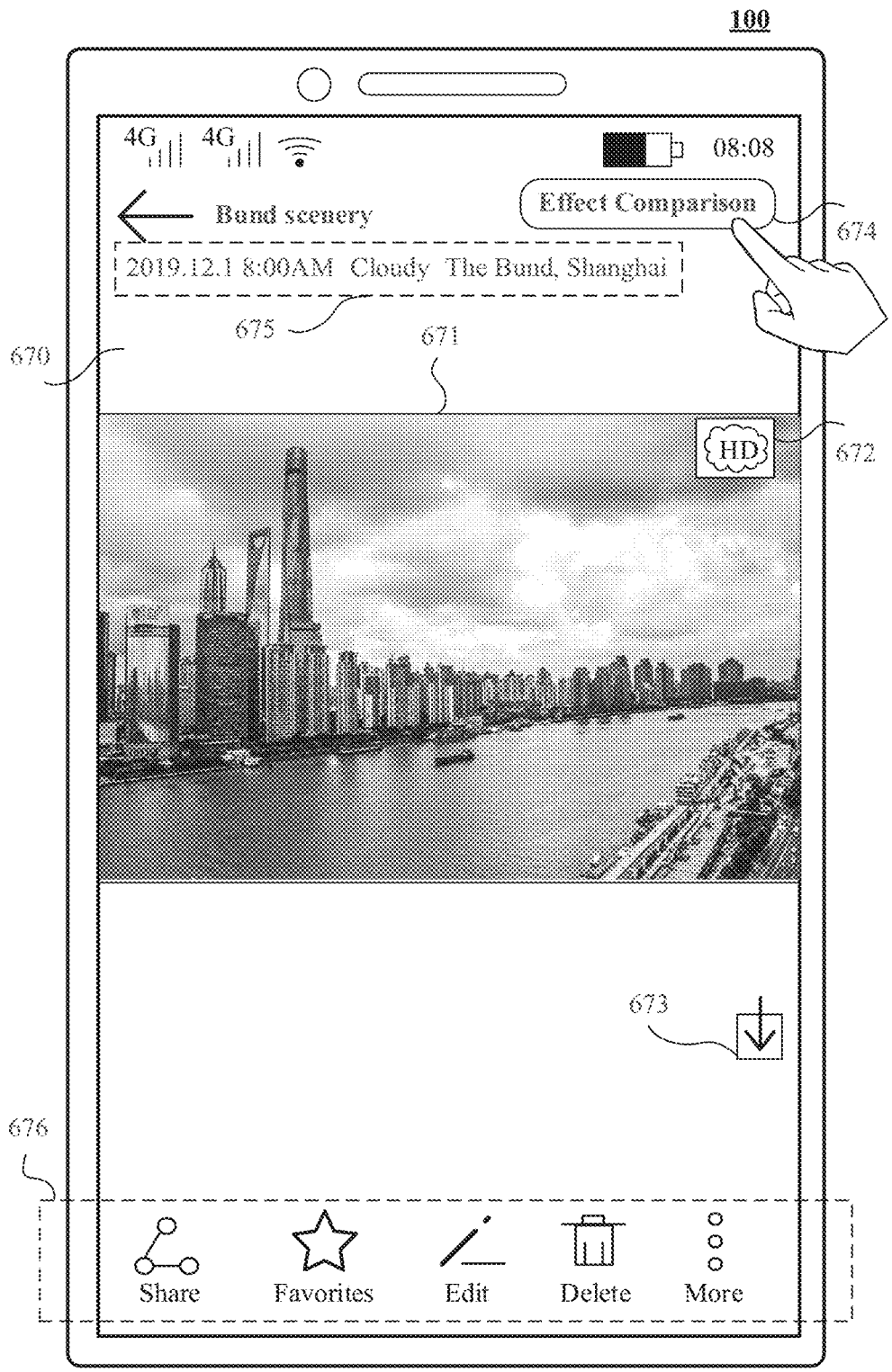

As shown in FIG. 6N, the image browsing interface 670 displays and includes an enhanced image 671, a mark 672, a "Download" control 673, an "Effect Comparison" control 674, image-related information 675, and a menu 676. The mark 672 is used to notify the user that the image 671 has been enhanced by using the processing capability of the cloud server 200. The image-related information 675 may include photographing time, photographing weather, geographic location information, and the like of the image 671. For example, the photographing time may be "8:00 a.m. on Dec. 1, 2019", the photographing weather may be "cloudy", and a photographing place may be "The Bund, Shanghai". The menu 676 may include a "Share" button, a "Favorites" button, an "Edit" button, a "Delete" button, and a "More" button. The "Share" button may be used to trigger the image 671 to be shared. The "Favorites" button may be used to trigger the image 671 to be collected in a favorite image folder. The "Edit" button may be used to trigger edit functions such as rotation, cropping, adding filters, and blurring of the image 671. The "Delete" button may be used to trigger the image 671 to be deleted. The "More" button may be used to trigger more functions related to the image 671 to be enabled. The "Effect Comparison" control 674 may be used to trigger an image before the image 671 is enhanced (namely, an image selected by the user) to be displayed at a location of the image 671.

Figure 6O:
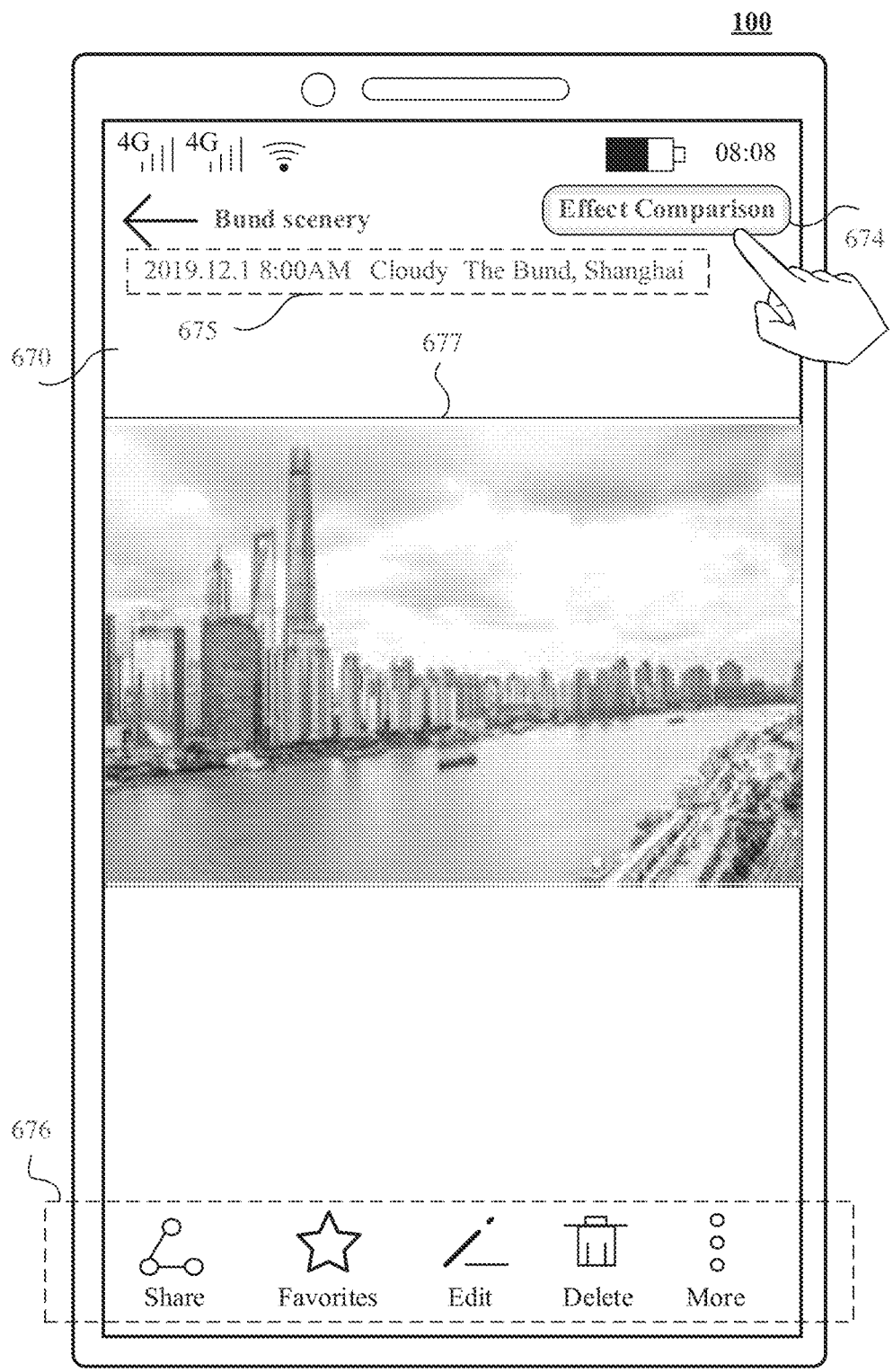

The terminal 100 may receive an input operation (for example, tapping) performed by the user on the "Effect Comparison" control 674. In response to the input operation, as shown in FIG. 6O, the terminal 100 may display an image 677 selected by the user at a display location area of the image 671.

The terminal 100 may receive an input operation (for example, tapping) performed by the user on the "Effect Comparison" control 674 again. In response to the input operation, as shown in FIG. 6P, the terminal 100 may display the enhanced image 671.

Figure 6P:
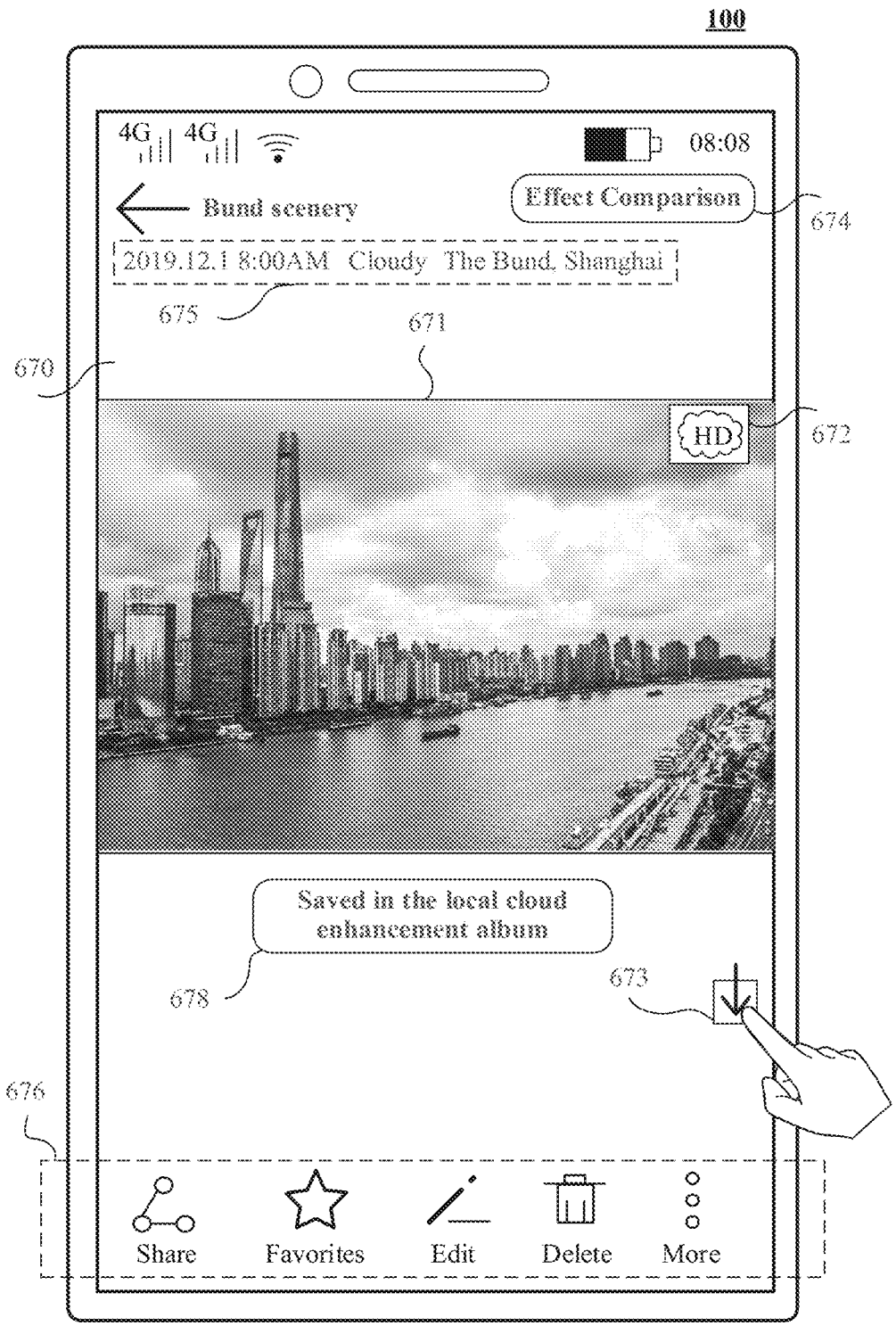

As shown in FIG. 6P, the terminal 100 may receive an input operation (for example, tapping) performed by the user on the "Download" control 673. In response to the input operation, the terminal 100 may save the enhanced image 671 in the locally specified storage path of the terminal 100, and display a saving complete prompt 678 after the saving is completed. The saving complete prompt 678 is used to notify the user that the enhanced image 671 has been saved.

In some embodiments, the terminal 100 may locally save a photographed image after photographing. The user may view, in the gallery application of the terminal 100, the image photographed by the terminal 100 and an image obtained from another device or the network. The terminal 100 may mark a to-be-enhanced image, an image on which enhancement has been performed, and an enhanced image in the gallery application. When environment information (for example, geographic location information, weather information, time information, a photographing parameter, and photographing posture information) of an image is complete, and the image is not enhanced by using the cloud server 200, the image may be classified as the to-be-enhanced image. In this way, it is convenient for the user to quickly select an image that needs to be enhanced by using the processing capability of the cloud server 200, to save time of the user.

Figure 7A:
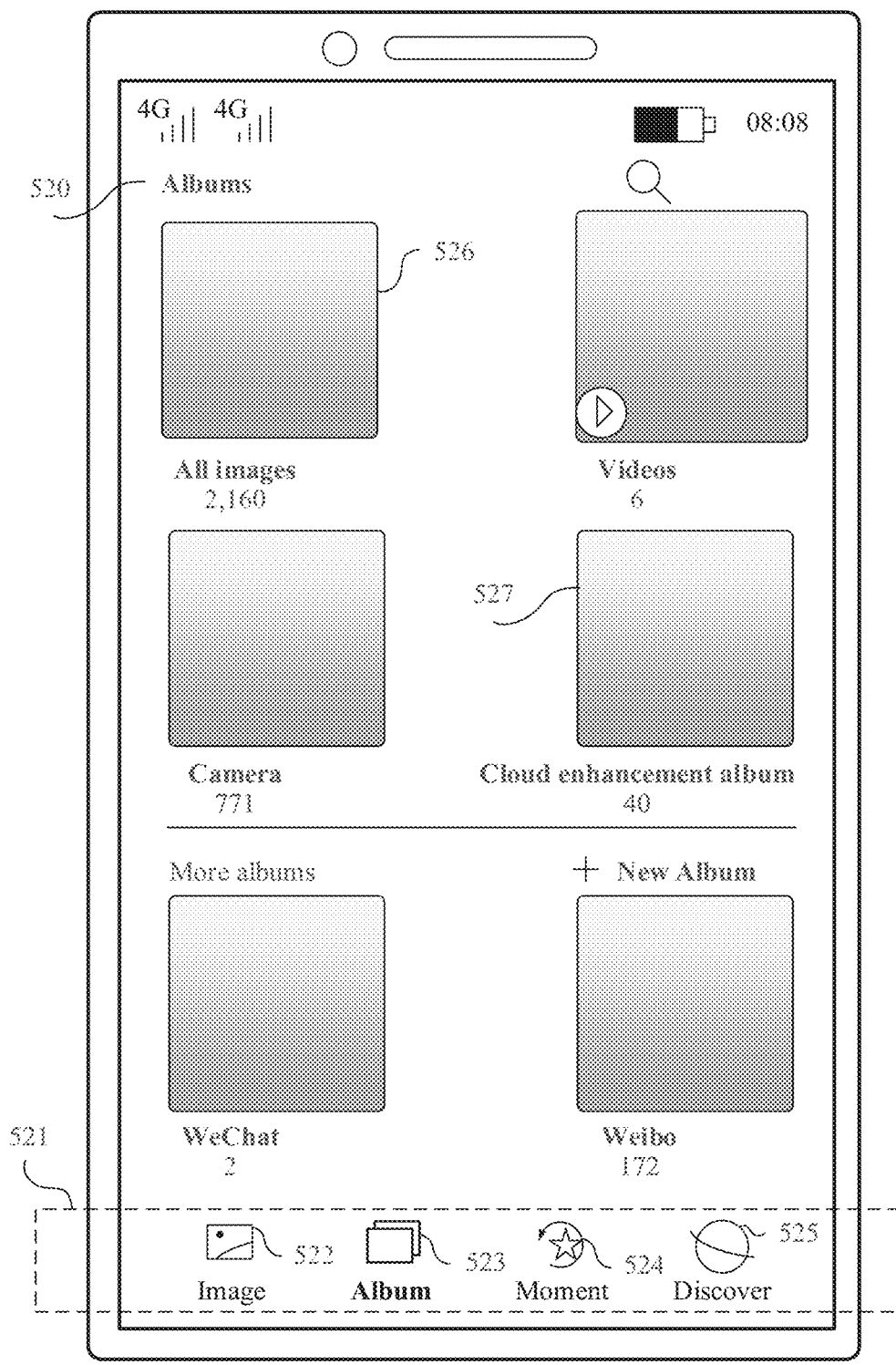
FIG. 7A to FIG. 7D are schematic diagrams of still another group of user interfaces according to an embodiment of this application.

For example, as shown in FIG. 7A, the terminal 100 may display the gallery album interface 520. The gallery album interface 520 may display and include one or more albums (for example, the "all images" album 526, the video album, the camera album, the cloud enhancement album 527, the WeChat album, and the Weibo album). For a detailed text description of the gallery album interface 520, refer to the foregoing embodiment shown in FIG. 5B. Details are not described herein again.

The terminal 100 may receive an input operation (for example, tapping) performed by the user on the "all images" album 526. In response to the input operation, the terminal 100 may display an "all images" interface 710 shown in FIG. 7B.

Figure 7B:
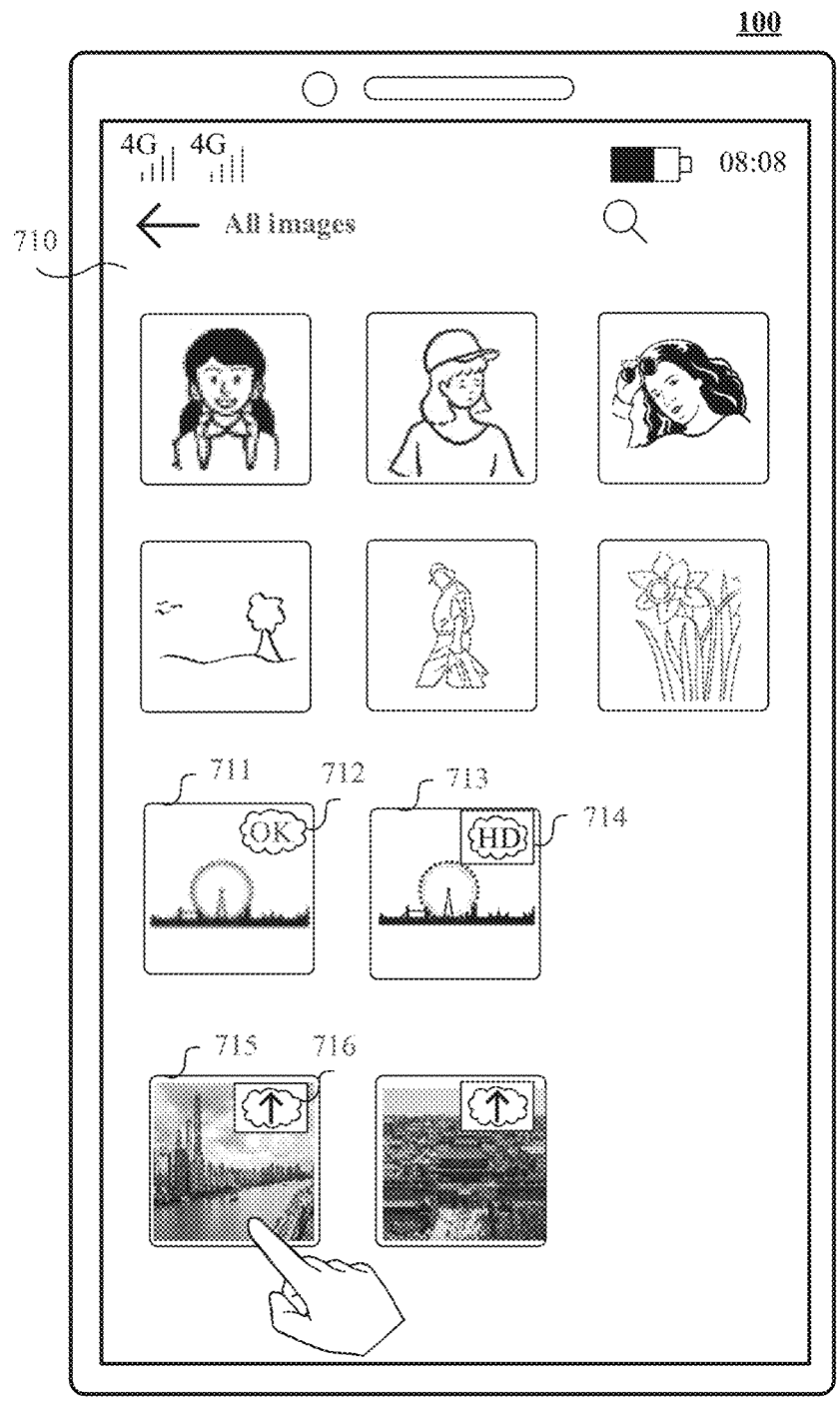

As shown in FIG. 7B, the "all images" interface 710 displays and includes thumbnails of one or more images. The terminal 100 may mark a to-be-enhanced image, an image on which enhancement has been performed, and an enhanced image in the one or more images. For example, an image corresponding to a thumbnail 711 has been enhanced, and the terminal 100 enhances, by using the processing capability of the cloud server 200, the image corresponding to the thumbnail 711 to obtain an image corresponding to a thumbnail 713. An image corresponding to a thumbnail 715 is a to-be-enhanced image. The terminal 100 may display a mark 712 on the thumbnail 711. The mark 712 is used to notify the user that the image corresponding to the thumbnail 711 has been enhanced by using the processing capability of the cloud server 200. The terminal 100 may display a mark 714 on the thumbnail 713. The mark 714 is used to notify the user that the image corresponding to the thumbnail 713 is an image obtained through enhancement by using the processing capability of the cloud server 200. The terminal 100 may display a mark 716 on the thumbnail 715. The mark 716 is used to notify the user that the image corresponding to the thumbnail 715 is waiting to be enhanced by using the processing capability of the cloud server 200. The foregoing example is merely used to explain this application, and should not constitute a limitation.

The terminal 100 may receive an input operation (for example, tapping) performed by the user on the thumbnail 715. In response to the input operation, the terminal 100 may display an image browsing interface 720 shown in FIG. 7C. Because the image corresponding to the thumbnail 715 is waiting to be enhanced by using the processing capability of the cloud server 200, the terminal 100 may display the image corresponding to the thumbnail 715 and a "Cloud enhancement" control in the image browsing interface 720. The "Cloud enhancement" control is used to trigger the terminal 100 to enhance, by using the processing capability of the cloud server 200, the image corresponding to the thumbnail 715.

Figure 7C:
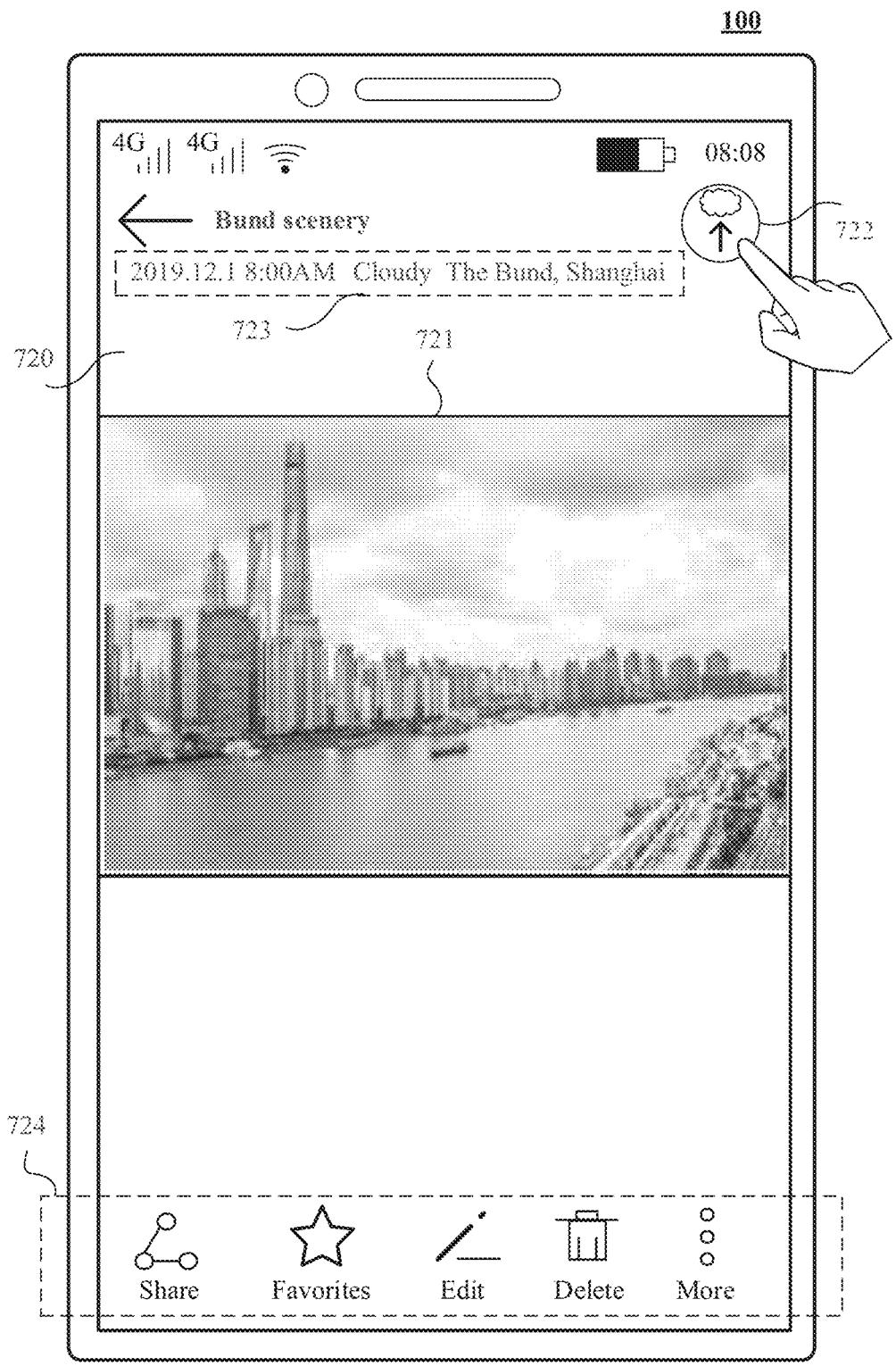

As shown in FIG. 7C, because the image corresponding to the thumbnail 715 is waiting to be enhanced by using the processing capability of the cloud server 200, the image browsing interface 720 may display and include an image 721 corresponding to the thumbnail 715, a "Cloud enhancement" control 722, image-related information 723, and a menu 724. The image-related information 723 may include photographing time, photographing weather, geographic location information, and the like of the image 721. For example, the photographing time may be "8:00 a.m. on Dec. 1, 2019", the photographing weather may be "cloudy", and a photographing place may be "The Bund, Shanghai". The menu 724 may include a "Share" button, a "Favorites" button, an "Edit" button, a "Delete" button, and a "More" button. The "Share" button may be used to trigger the image 721 to be shared. The "Favorites" button may be used to trigger the image 721 to be collected in a favorite image folder. The "Edit" button may be used to trigger edit functions such as rotation, cropping, adding filters, and blurring of the image 721. The "Delete" button may be used to trigger the image 721 to be deleted. The "More" button may be used to trigger more functions related to the image 721 to be enabled. The "Effect Comparison" control 722 may be used to trigger the terminal 100 to enhance the image 721 by using the processing capability of the cloud server 200.

The terminal 100 may receive an input operation (for example, tapping) performed by the user on the "Cloud enhancement" control 722. In response to the input operation, the terminal 100 may display a cloud enhancement interface 730 shown in FIG. 7D.

Figure 7D:
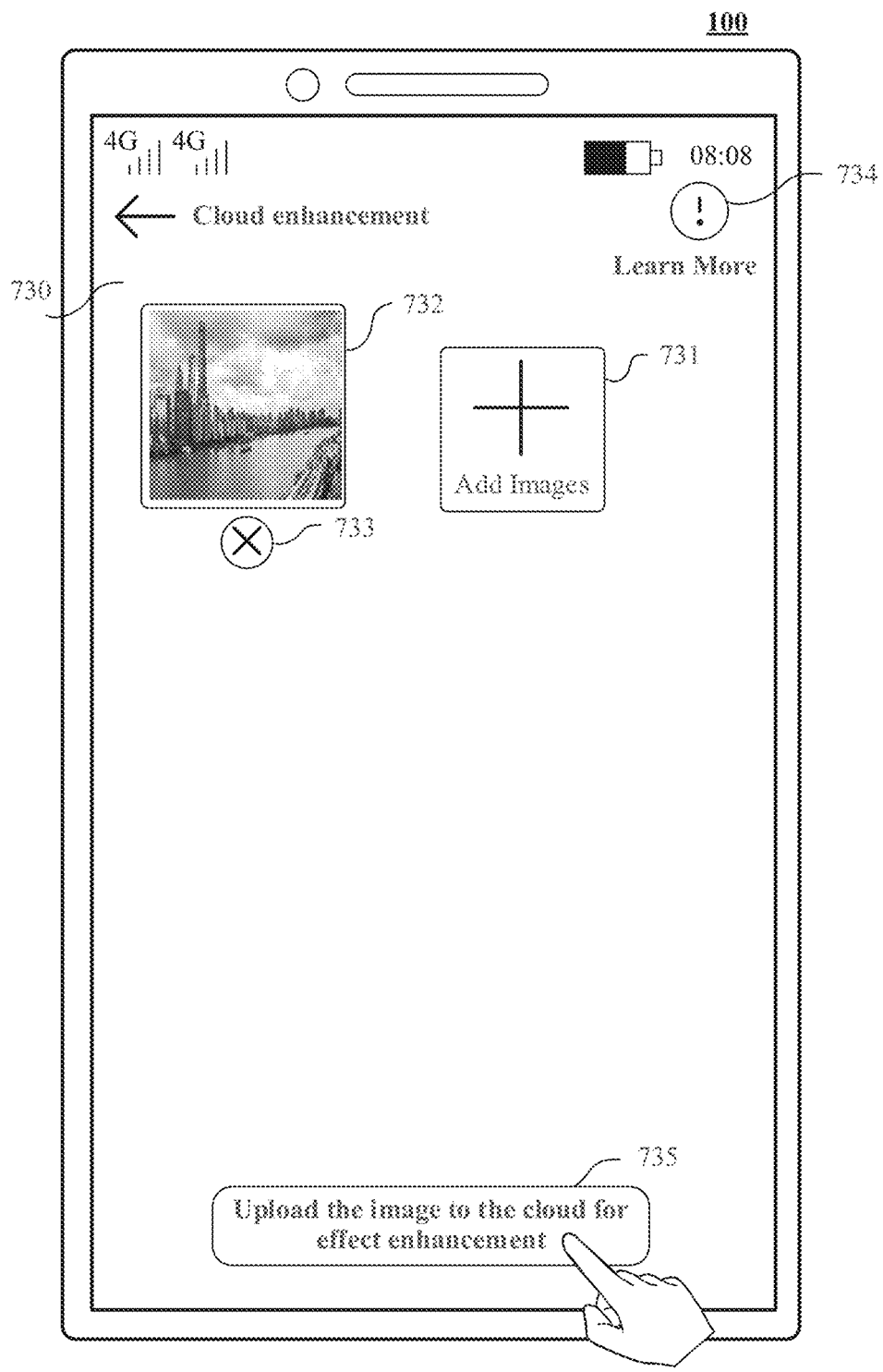

As shown in FIG. 7D, the cloud enhancement interface 730 may display an "Add Images" control 731, a thumbnail (for example, a thumbnail 732) of a selected image, a "Delete" control 733, a "Learn More" control 734, and an upload control 735. The cloud enhancement interface 730 is the same as the cloud enhancement interface 550 shown in FIG. 6E. Therefore, for a detailed text description of the cloud enhancement interface 730, refer to the foregoing embodiment shown in FIG. 6E. Details are not described herein again.

The terminal 100 may receive an input operation performed by the user on the upload control 735. In response to the operation, the terminal 100 may upload the image selected by the user and the environment information of the image to the cloud server 200, to enhance, by using the processing capability of the cloud server 200, an effect of the image (namely, the image 721 shown in FIG. 7C) selected by the user.

The following describes how the terminal 100 enhances an image by using a processing capability of the cloud server 200 in embodiments of this application.

Figure 8:
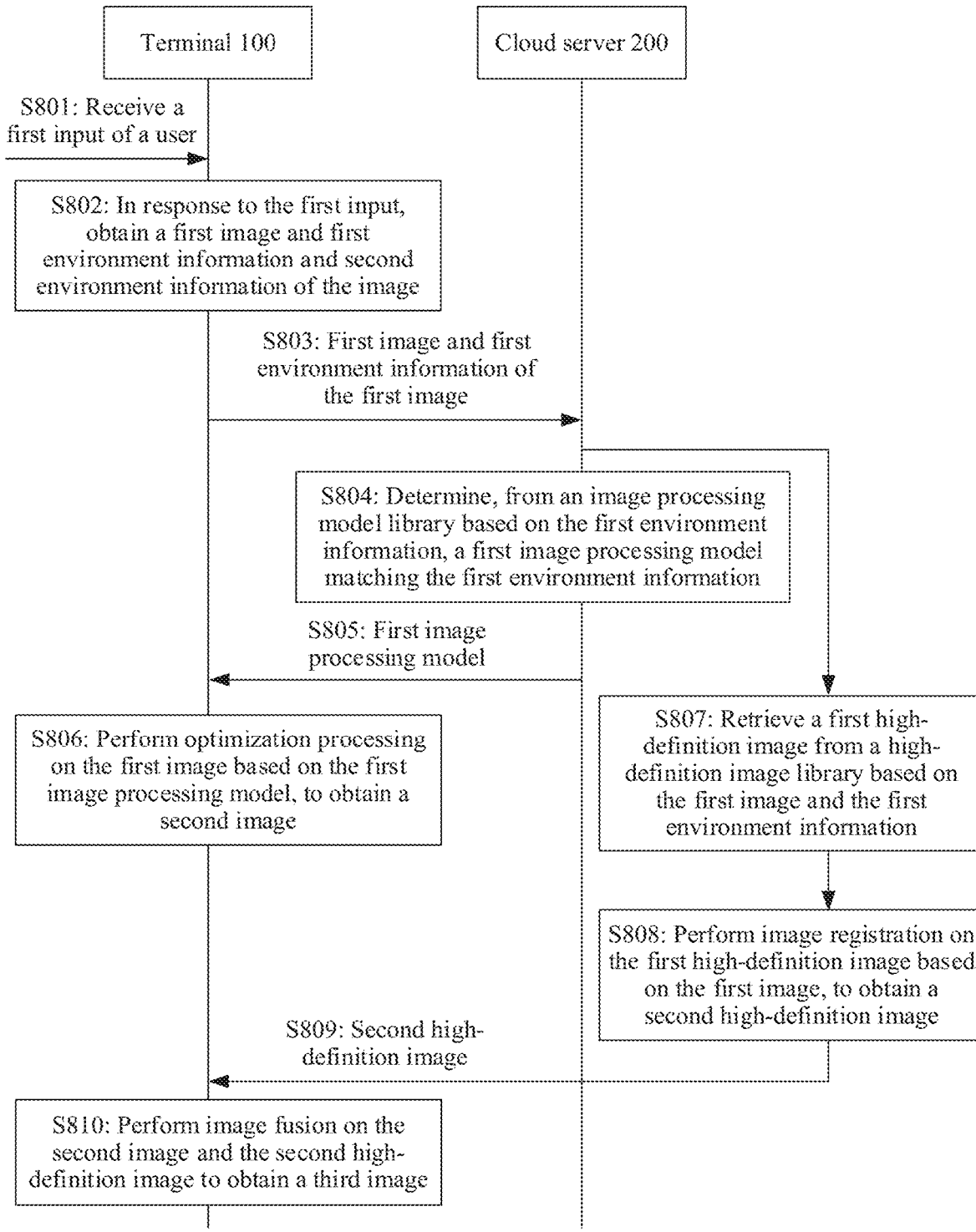
FIG. 8 is a schematic flowchart of an image processing method according to an embodiment of this application.

FIG. 8 is a schematic flowchart of an image processing method according to an embodiment of this application. As shown in FIG. 8, the method includes the following steps.

S801: A terminal 100 receives a first input of a user.

S802: In response to the first input, the terminal 100 obtains a first image and first environment information of the first image.

The first environment information may include one or more of geographic location information, weather information, season information, time information, a photographing parameter, photographing posture information, and the like. The photographing parameter may include a zoom ratio or the like. The photographing posture information may include orientation information of a photographing lens of a photographing device when the photographing lens photographs an image, for example, a pitch angle and a direction angle of the photographing lens or a three-axis rotation angle in natural coordinates.

In a scenario in which the user opens a Camera application of the terminal 100 to perform photographing in a cloud enhancement mode, the first input may be an input operation (for example, tapping) performed by the user on the photograph control 322 after the user enables the cloud enhancement mode in the photographing interface 320 in the embodiment shown in FIG. 3E. The first image may be the image 324 (namely, a photographed image) that is captured by a camera and that is shown in FIG. 3E. The terminal 100 may obtain the first environment information of the first image from one or more sensors and a network.

For example, when the geographic location information is GPS location information, the terminal 100 may obtain GPS location information of the photographed image by using a GPS positioning module. When the geographic location information is a geographic name, the terminal 100 may obtain GPS location information of the photographed image by using a GPS positioning module, and then query, by using an offline map or an online map, a geographic name corresponding to the GPS location information. The terminal 100 may further obtain the weather information, the season information, and the like of the photographed image from the network with reference to photographing time and the geographic location information. The terminal 100 may further obtain the photographing posture information of the photographed image by using a sensor such as a gyroscope or an acceleration sensor. The photographing parameter may include the zoom ratio or the like. The terminal 100 may obtain, by using the Camera application, the photographing parameter or the like set by the user.

In a scenario in which the user opens a gallery application of the terminal 100 to select an image for enhancement, the first input may be an input operation performed by the user on the upload control 633 after the user selects an image corresponding to the thumbnail 631 in the cloud enhancement interface 550 in the embodiment shown in FIG. 6I. Alternatively, the first input may be an input operation performed by the user on the upload control 735 after the user selects an image corresponding to the thumbnail 732 in the cloud enhancement interface 730 in the embodiment shown in FIG. 7D. The first image may be the image corresponding to the thumbnail 631 in the embodiment shown in FIG. 6I or the image corresponding to the thumbnail 732 in the embodiment shown in FIG. 7D.

When the photographing device (the terminal 100 or another device) completes photographing an image and is saving the image, the photographing device may save first environment information (for example, geographic location information, weather information, time information, season information, a photographing parameter, or photographing posture information) of the image in exchange image file format (exchange image file format, Exif) data of the image. Therefore, when the first image is an image that is selected by the user and that is saved on the terminal 100, the terminal 100 may obtain, from Exif data corresponding to the image selected by the user, the first environment information of the image selected by the user.

In a possible implementation, the terminal 100 may mark a to-be-enhanced image, an image on which enhancement has been performed, and an enhanced image in the gallery application. When first environment information of an image is complete, and the image is not enhanced by using a cloud server 200, the image may be classified as the to-be-enhanced image. When an image has been selected by the user and optimized by using a processing capability of the cloud server 200, and a corresponding high-quality image is generated, the image is classified as the image on which enhancement has been performed. The enhanced image may be a high-quality image generated by optimizing, by using the processing capability of the cloud server 200, an image selected by the user. In this way, it is convenient for the user to quickly select an image that needs to be enhanced by using the processing capability of the cloud server 200, to save time of the user.

S803: The terminal 100 sends the first image and the first environment information of the first image to the cloud server 200.

When the terminal 100 obtains the first image and the first environment information, the terminal 100 may detect a current network status. If the network status is "disconnected", and the terminal 100 cannot be connected to the cloud server 200, the terminal 100 may output a prompt to notify the user that the first image can be enhanced by using the cloud server 200 only after the terminal 100 is connected to the network. For detailed content, refer to the foregoing embodiment shown in FIG. 4A or the foregoing embodiment shown in FIG. 6F. Details are not described herein again.

S804: The terminal 100 determines, from an image processing model library based on the first environment information, a first image processing model matching the first environment information.

Because imaging effects and styles of the image are different in different photographing environments, different image processing models may be trained for different photographing environments. In this way, the image can be optimized by using a specific image processing model for a specific photographing environment, so that image quality is improved.

The image processing model library stores trained image processing models corresponding to a plurality of photographing environments. The photographing environments may be distinguished from each other by using one or more of geographic location information, weather information, season information, time information, and the like.

For example, in the image processing model library, a plurality of image processing models are obtained through classification based on photographing places and photographing weather. The image processing models that correspond to the plurality of photographing environments and that are stored in the image processing model library may be shown in the following Table 1:

TABLE 1

| Photographing environment | | |
|---|---|---|
| Photographing place | Photographing weather | Image processing model |
| The Bund, Shanghai | Sunny | Image processing model 1 |
|  | Cloudy | Image processing model 2 |
|  | Other weather | Image processing model 3 |
| The Forbidden City, Beijing | Sunny | Image processing model 4 |
|  | Snowy | Image processing model 5 |
|  | Other weather | Image processing model 6 |
| ... | ... | ... |

It can be learned from Table 1 that the photographing environment in which the photographing place is "The Bund, Shanghai" and the photographing weather is "sunny" corresponds to the image processing model 1. The photographing environment in which the photographing place is "The Bund, Shanghai" and the photographing weather is "cloudy" corresponds to the image processing model 2. The photographing environment in which the photographing place is "The Bund, Shanghai" and the photographing weather is "other weather" corresponds to the image processing model 3. The photographing environment in which the photographing place is "The Forbidden City, Beijing" and the photographing weather is "sunny" corresponds to the image processing model 4. The photographing environment in which the photographing place is "The Forbidden City, Beijing" and the photographing weather is "snowy" corresponds to the image processing model 5. The photographing environment in which the photographing place is "The Forbidden City, Beijing" and the photographing weather is "other weather" corresponds to the image processing model 6. The foregoing example shown in Table 1 is merely used to explain this application, and should not constitute a limitation.

For example, with reference to the image processing models that are included in the image processing model library, that correspond to the plurality of photographing environments, and that are shown in Table 1, when the geographic location information in the first environment information of the first image is "The Bund, Shanghai", and the weather information in the first environment information of the first image is "cloudy", the cloud server 200 determines, from the image processing model library, that the first image processing model matching the first environment information may be the "image processing model 2". The foregoing example is merely used to explain this application, and should not constitute a limitation.

S805: The cloud server 200 sends the first image processing model to the terminal 100.

After determining the first image processing model matching the first environment information, the cloud server 200 may send the first image processing model to the terminal 100.

S806: The terminal 100 performs optimization processing on the first image based on the first image processing model, to obtain a second image.

After the terminal 100 receives the first image processing model sent by the cloud server 200, the terminal 100 may input the first image into the first image processing model. The first image is processed by using the first image processing model, to obtain the second image. In comparison with the first image, detail definition, a dynamic range/contrast, noise, a color, and the like of the second image are improved.

S807: The cloud server 200 retrieves a first high-definition image from a high-definition image library based on the first image and the first environment information. A similarity between second environment information of the first high-definition image and the first environment information of the first image falls within a first preset range, and a similarity between photographed content of the first high-definition image and photographed content of the first image falls within a second preset range.

The high-definition image library stores a plurality of high-definition images and second environment information of the high-definition images. After the cloud server 200 receives the first image and the first environment information that are sent by the terminal 100, the cloud server 200 may first select, from the high-definition image library based on the first environment information, high-definition images for which similarities between second environment information and the first environment information fall within the first preset range. Then the cloud server 200 may compare the first image with the high-definition images whose photographing environments are similar to the photographing environment of the first image, and select the first high-definition image from the high-definition images whose photographing environments are similar to the photographing environment of the first image. The similarity between the photographed content of the first high-definition image and the photographed content of the first image falls within the second preset range.

For example, the high-definition images and the second environment information of the high-definition images that are stored in the high-definition image library may be shown in the following Table 2:

TABLE 2

| High-definition image | Environment information |
|---|---|
| High-definition image 1 | Place: The Bund, Shanghai; weather: sunny; photographing time: afternoon |
| High-definition image 2 | Place: The Bund, Shanghai; weather: cloudy; photographing time: morning |
| High-definition image 3 | Place: The Bund, Shanghai; weather: cloudy; photographing time: morning |
| High-definition image 4 | Place: The Bund, Shanghai; weather: cloudy; photographing time: evening |
| High-definition image 5 | Place: The Forbidden City, Beijing; weather: sunny; photographing time: morning |
| High-definition image 6 | Place: The Forbidden City, Beijing; weather: rainy; photographing time: afternoon |
| . . . | . . . |

It can be learned from Table 2 that for the high-definition image 1 in the high-definition image library, the photographing place is "The Bund, Shanghai", the weather is "sunny", and the photographing time is "afternoon". For the high-definition image 2, the photographing place is "The Bund, Shanghai", the weather is "cloudy", and the photographing time is "morning". For the high-definition image 3, the photographing place is "The Bund, Shanghai", the weather is "cloudy", and the photographing time is "morning". For the high-definition image 4, the photographing place is "The Bund, Shanghai", the weather is "cloudy", and the photographing time is "evening". For the high-definition image 5, the photographing place is "The Forbidden City, Beijing", the weather is "sunny", and the photographing time is "morning". For the high-definition image 6, the photographing place is "The Forbidden City, Beijing", the weather is "rainy", and the photographing time is "afternoon". The foregoing example shown in Table 2 is merely used to explain this application, and should not constitute a limitation.

For example, in the first environment information of the first image, the photographing place may be "The Bund, Shanghai", the weather may be "cloudy", and the photographing time may be "morning". Because as shown in Table 2, for the high-definition image 2, the photographing place is "The Bund, Shanghai", the weather is "cloudy", and the photographing time is "morning", and for the high-definition image 3, the photographing place is "The Bund, Shanghai", the weather is "cloudy", and the photographing time is "morning", the cloud server 200 may determine that high-definition images whose photographing environments are the same as the photographing environment of the first image include the high-definition image 2 and the high-definition image 3. Then the cloud server 200 may select a first high-definition image from the high-definition image 2 and the high-definition image 3. A similarity between photographed content of the first high-definition image and the photographed content of the first image falls within a preset range. For example, if a similarity between photographed content of the high-definition image 2 and the photographed content of the first image is 90%, a similarity between photographed content of the high-definition image 3 and the photographed content of the first image is 40%, and the preset range is 80%, the cloud server 200 may determine the high-definition image 3 as the first high-definition image. The foregoing example is merely used to explain this application, and should not constitute a limitation.

S808: The cloud server 200 performs image registration on the first high-definition image based on the first image, to obtain a second high-definition image.

The cloud server 200 may extract matched feature points in the first image and the first high-definition image, and then obtain an image spatial coordinate transformation parameter by using matched feature point pairs. Then the cloud server 200 may perform image registration based on the image spatial coordinate transformation parameter.

S809: The cloud server 200 may send the second high-definition image to the terminal 100.

S810: The terminal 100 may perform image fusion on the second image and the second high-definition image to obtain a third image.

After receiving the second high-definition image sent by the cloud server 200, the terminal 100 may compare feature information in the second image and the second high-definition image by using an image fusion algorithm, and fuse feature information with a specific advantage in the second high-definition image into the second image to obtain the third image (namely, an enhanced image of the first image). For example, a high-definition detail, a color-rich feature point, and the like in the second high-definition image may be fused into the second image to obtain the third image. In this way, detail definition, a color, white balance, and the like of the image can be improved.

In a possible implementation, the cloud server 200 may include a 3D world model and a rendering engine. After receiving the first image and the first environment information that are sent by the terminal 100, the cloud server 200 may determine the photographing environment of the first image from the 3D world model based on the first environment information, render, from the 3D world model by using the rendering engine, a high-definition image whose photographing environment is the same as the photographing environment of the first image, and use the rendered high-definition image as the first high-definition image for subsequent image registration and image fusion after the image registration. In another possible implementation, the cloud server 200 may further pre-render a high-definition image of each photographing angle in each geographical area in the 3D world model. After the cloud server 200 receives the first image and the first environment information that are sent by the terminal 100, the cloud server 200 may find, from a plurality of rendered high-definition images based on the first environment information, a high-definition image whose photographing angle is consistent with a photographing angle of the first image, and determine the high-definition image as the first high-definition image for subsequent image registration and image fusion after the image registration.

In some embodiments, after the cloud server 200 determines the first image processing model from the image processing model library based on the first environment information of the first image, the cloud server 200 may not send the first image processing model to the terminal 100, but directly perform optimization processing on the high-definition image based on the first image processing model, to obtain the second image. After retrieving the first high-definition image from the high-definition image library based on the first image and the first environment information and performing image registration on the first high-definition image to obtain the second high-definition image, the cloud server 200 does not need to send the second high-definition image to the terminal 100. The cloud server 200 may perform image fusion on the second image and the second high-definition image to obtain the third image (namely, the enhanced image of the first image), and then send the third image to the terminal 100. In this way, computing resources of the terminal 100 can be greatly reduced, and the terminal 100 can break through an imaging quality limit of the terminal, so that a common camera on the terminal can also achieve an effect of a professional digital single-lens reflex device.

In some embodiments, after responding to the first input of the user, the terminal 100 may send only the first environment information of the first image to the cloud server 200. After receiving the first environment information sent by the terminal 100, the cloud server 200 may determine, from the image processing model library, the first image processing model matching the first environment information, and send the first image processing model to the terminal 100. After receiving the first image processing model, the terminal 100 may perform optimization processing on the first image by using the first image processing model, to obtain the second image, and locally save the second image as the enhanced image.

In some embodiments, in response to the first input of the user, the terminal 100 may send the first image and the first environment information of the first image to the cloud server 200. After receiving the first image and the first environment information that are sent by the terminal 100, the cloud server 200 may determine, from the image processing model library, the first image processing model matching the first environment information, and perform optimization processing on the first image by using the first image processing model, to obtain the second image. The cloud server 200 may send the second image to the terminal 100, and save the second image on the terminal 100 as the enhanced image.

In some embodiments, after responding to the first input of the user, the terminal 100 may send the first image and the first environment information of the first image to the cloud server 200. The cloud server 200 may retrieve the first high-definition image from the high-definition image library based on the first environment information, and perform image registration on the first high-definition image based on the first image, to obtain the second high-definition image. The cloud server 200 may send the second high-definition image to the terminal 100, and the terminal 100 performs image fusion on the second high-definition image and the first image to obtain the enhanced image and save the enhanced image on the terminal 100. In a possible implementation, after obtaining the second high-definition image, the cloud server 200 may directly perform image fusion on the first image and the second high-definition image, and send an image obtained after the image fusion to the terminal 100.

According to the image processing method provided in this embodiment of this application, the terminal can be equipped with a photographing and imaging system by combining processing capabilities of the terminal and the cloud server and fully using high-quality image data and an image processing algorithm. The cloud server may obtain, through matching by using an image and environment information (for example, geographic location information, weather information, season information, time information, a photographing parameter, or photographing posture information) of the image that are uploaded by the terminal, an image processing algorithm suitable for the image and high-quality image data that has same photographed content as the image and has a similar photographing environment to the image. Quality and an effect of the image uploaded by the terminal can be improved by using the image processing algorithm and the high-quality image data. In this way, images photographed in different environments can present different styles and effects. In addition, the terminal can break through an imaging quality limit of the terminal, so that a common camera on the terminal can also achieve an effect of a professional digital single-lens reflex device, thereby greatly improving photographing quality of the terminal and photographing experience of the user while reducing costs of the mobile phone.

The following describes an image processing system 900 in this application.

Figure 9:
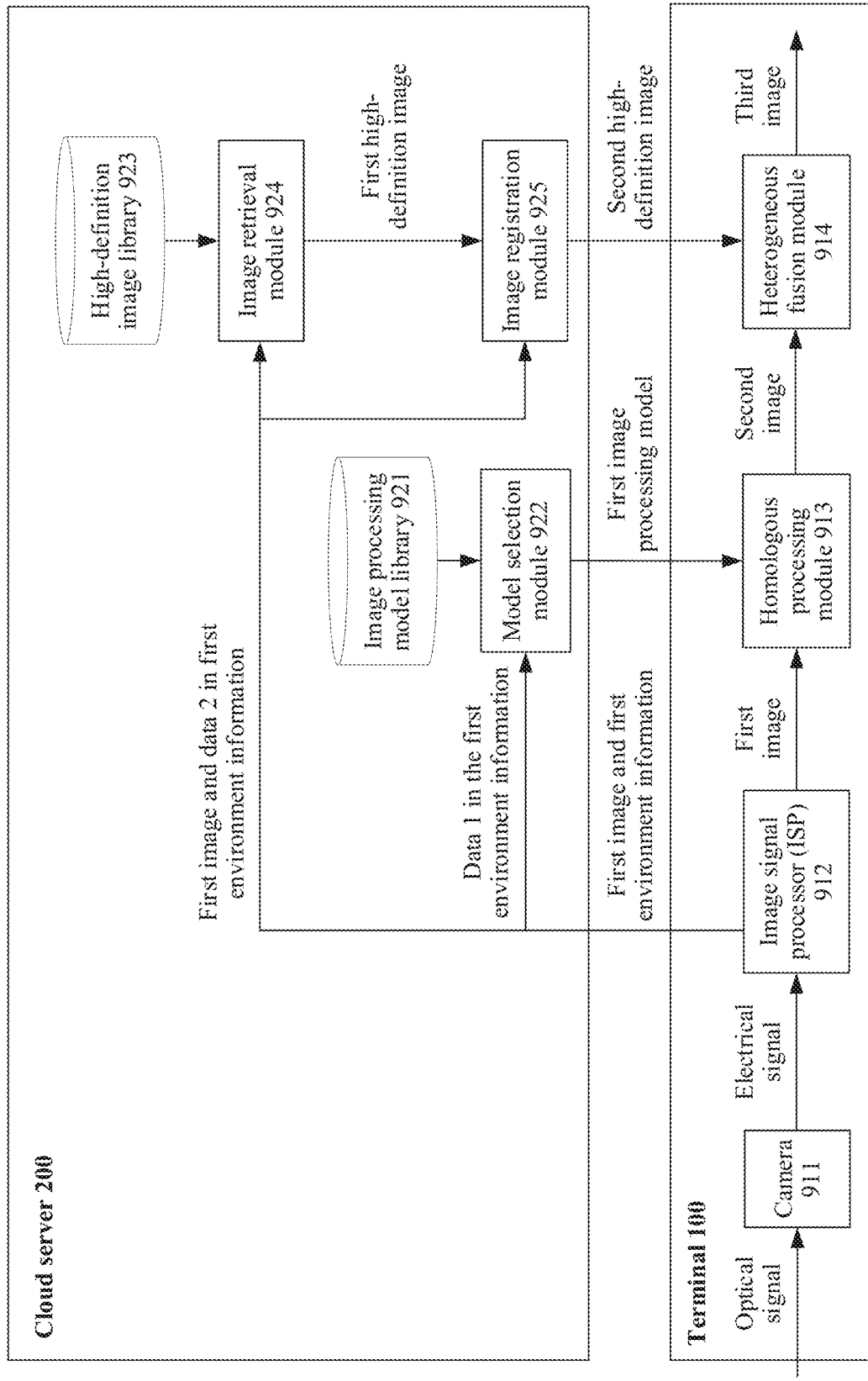
FIG. 9 is a schematic diagram of an architecture of an image processing system according to an embodiment of this application.

FIG. 9 is a schematic diagram of an architecture of an image processing system 900 according to an embodiment of this application. As shown in FIG. 9, the image processing system 900 may include a terminal 100 and a cloud server 200.

The terminal 100 may include a camera 911, an image signal processor 912, a homologous processing module 913, and a heterogeneous fusion module 914.

The camera 911 may be configured to: when a user performs photographing, capture an optical signal, convert the optical signal into an electrical signal, and send the electrical signal to the image signal processor 912.

The image signal processor 912 may convert the electrical signal sent by the camera 911 into a digital image signal, which is also referred to as a first image. A format of the first image may be a raw image, a YUV image, an RGB image, or the like. The image signal processor 912 may further obtain first environment information (including one or more of geographic location information, weather information, season information, time information, a photographing parameter, photographing posture information, and the like) of the first image from one or more sensors (not shown in the figure) of the terminal 100 and a network to which the terminal 100 is connected.

The homologous processing module 913 may be configured to perform, based on a first image processing model sent by the cloud server 200, optimization processing on the first image generated by the image signal processor 912, to obtain a second image.

The heterogeneous fusion module 914 may be configured to perform image fusion on the second image obtained through processing by the homologous processing module 913 and a second high-definition image sent by the cloud server 200, to obtain a third image.

The cloud server 200 may include an image processing model library 921, a model selection module 922, a high-definition image library 923, an image retrieval module 924, and an image registration module 925.

The image processing model library 921 may be configured to store a plurality of image processing models obtained through classification based on photographing environments.

The model selection module 922 may be configured to determine, from the image processing model library 921 based on data 1 in the first environment information sent by the terminal 100, the first image processing model matching the data 1. The data 1 may be all or a part of the first environment information. For example, when the first environment information includes geographic location information, weather information, season information, time information, a photographing parameter, and photographing posture information, the data 1 may include the geographic location information and the weather information.

The high-definition image library 923 may be configured to store a plurality of high-definition images and second environment information of the high-definition images.

The image retrieval module 924 may be configured to retrieve a first high-definition image from the high-definition image library 923 based on the first image and data 2 in the first environment information. A similarity between a photographing environment of the first high-definition image and a photographing environment of the first image falls within a first preset range, and a similarity between photographed content of the first high-definition image and photographed content of the first image falls within a second preset range. The data 2 may be all or a part of the first environment information. For example, when the first environment information includes geographic location information, weather information, season information, time information, a photographing parameter, and photographing posture information, the data 2 may include the geographic location information, the season information, the time information, and the photographing posture information.

The image registration module 925 may be configured to perform image registration on the first high-definition image based on the first image, to obtain the second high-definition image. The cloud server 200 may send the second high-definition image to the terminal 100.

According to the image processing system 900 provided in this embodiment of this application, the terminal can be equipped with a photographing and imaging system by combining processing capabilities of the terminal and the cloud server and fully using high-quality image data and an image processing algorithm. The cloud server may obtain, through matching by using an image and environment information (for example, geographic location information, weather information, time information, a photographing parameter, or photographing posture information) of the image that are uploaded by the terminal, an image processing algorithm suitable for the image and high-quality image data that has same photographed content as the image and has a similar photographing environment to the image. Quality and an effect of the image uploaded by the terminal can be improved by using the image processing algorithm and the high-quality image data. In this way, images photographed in different environments can present different styles and effects. In addition, the terminal can break through an imaging quality limit of the terminal, so that a common camera on the terminal can also achieve an effect of a professional digital single-lens reflex device, thereby greatly improving photographing quality of the terminal and photographing experience of the user while reducing costs of the mobile phone.

The following describes an image processing system 1000 in this application.

Figure 10:
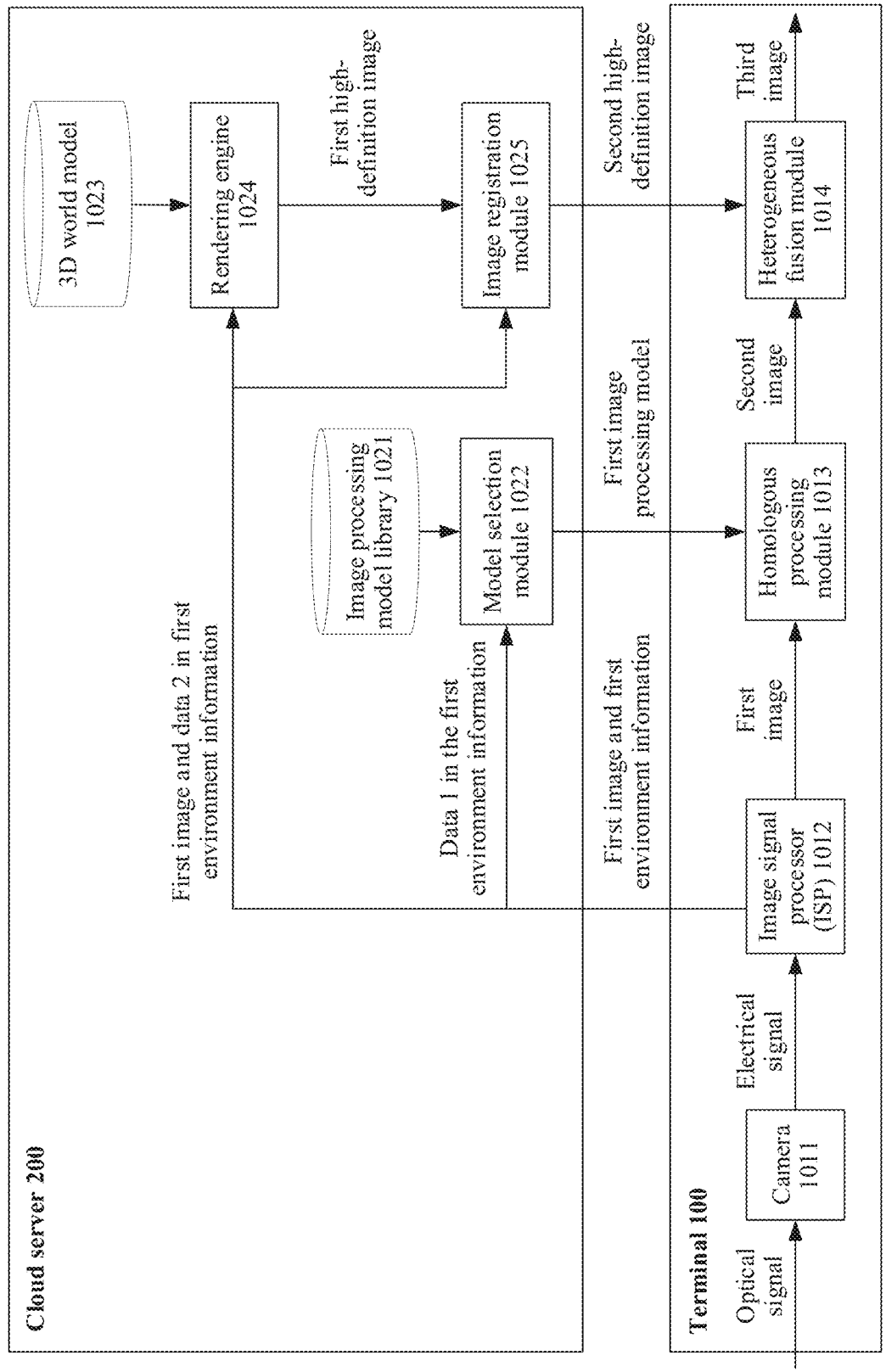
FIG. 10 is a schematic diagram of an architecture of still another image processing system according to an embodiment of this application.

FIG. 10 is a schematic diagram of an architecture of an image processing system 1000 according to an embodiment of this application. As shown in FIG. 10, the image processing system 1000 may include a terminal 100 and a cloud server 200.

The terminal 100 may include a camera 1011, an image signal processor 1012, a homologous processing module 1013, and a heterogeneous fusion module 1014.

The camera 1011 may be configured to: when a user performs photographing, capture an optical signal, convert the optical signal into an electrical signal, and send the electrical signal to the image signal processor 1012.

The image signal processor 1012 may convert the electrical signal sent by the camera 1011 into a digital image signal, which is also referred to as a first image. A format of the first image may be a raw image, a YUV image, an RGB image, or the like. The image signal processor 1012 may further obtain first environment information (including one or more of geographic location information, weather information, season information, time information, a photographing parameter, photographing posture information, and the like) of the first image from one or more sensors (not shown in the figure) of the terminal 100 and a network to which the terminal 100 is connected.

The homologous processing module 1013 may be configured to perform, based on a first image processing model sent by the cloud server 200, optimization processing on the first image generated by the image signal processor 1012, to obtain a second image.

The heterogeneous fusion module 1014 may be configured to perform image fusion on the second image obtained through processing by the homologous processing module 1013 and a second high-definition image sent by the cloud server 200, to obtain a third image.

The cloud server 200 may include an image processing model library 1021, a model selection module 1022, a 3D world model 1023, a rendering engine 1024, and an image registration module 1025.

The image processing model library 1021 may be configured to store a plurality of image processing models obtained through classification based on photographing environments.

The model selection module 1022 may be configured to determine, from the image processing model library 1021 based on data 1 in the first environment information sent by the terminal 100, the first image processing model matching the data 1. The data 1 may be all or a part of the first environment information. For example, when the first environment information includes geographic location information, weather information, season information, time information, a photographing parameter, and photographing posture information, the data 1 may include the geographic location information and the weather information.

The 3D world model 1023 includes 3D map information of a real world.

The rendering engine 1024 may be configured to render a first high-definition image from the 3D world model 1023 based on data 2 in the first environment information of the first image. A similarity between photographed content of the first high-definition image and photographed content of the first image falls within a preset range, and a photographing environment of the first high-definition image is the same as a photographing environment of the first image. The data 2 may be all or a part of the first environment information. For example, when the first environment information includes geographic location information, weather information, season information, time information, a photographing parameter, and photographing posture information, the data 2 may include the geographic location information, the season information, the time information, and the photographing posture information.

The image registration module 1025 may be configured to perform image registration on the first high-definition image based on the first image, to obtain the second high-definition image. The cloud server 200 may send the second high-definition image to the terminal 100.

According to the image processing system 1000 provided in this embodiment of this application, the terminal can be equipped with a photographing and imaging system by combining processing capabilities of the terminal and the cloud server and fully using high-quality image data and an image processing algorithm. The cloud server may obtain, through matching by using an image and environment information (for example, geographic location information, weather information, time information, a photographing parameter, or photographing posture information) of the image that are uploaded by the terminal, an image processing algorithm suitable for the image and high-quality image data that has same photographed content as the image and has a similar photographing environment to the image. Quality and an effect of the image uploaded by the terminal can be improved by using the image processing algorithm and the high-quality image data. In this way, images photographed in different environments can present different styles and effects. In addition, the terminal can break through an imaging quality limit of the terminal, so that a common camera on the terminal can also achieve an effect of a professional digital single-lens reflex device, thereby greatly improving photographing quality of the terminal and photographing experience of the user while reducing costs of the mobile phone.

The following describes an image processing system 1100 in this application.

Figure 11:
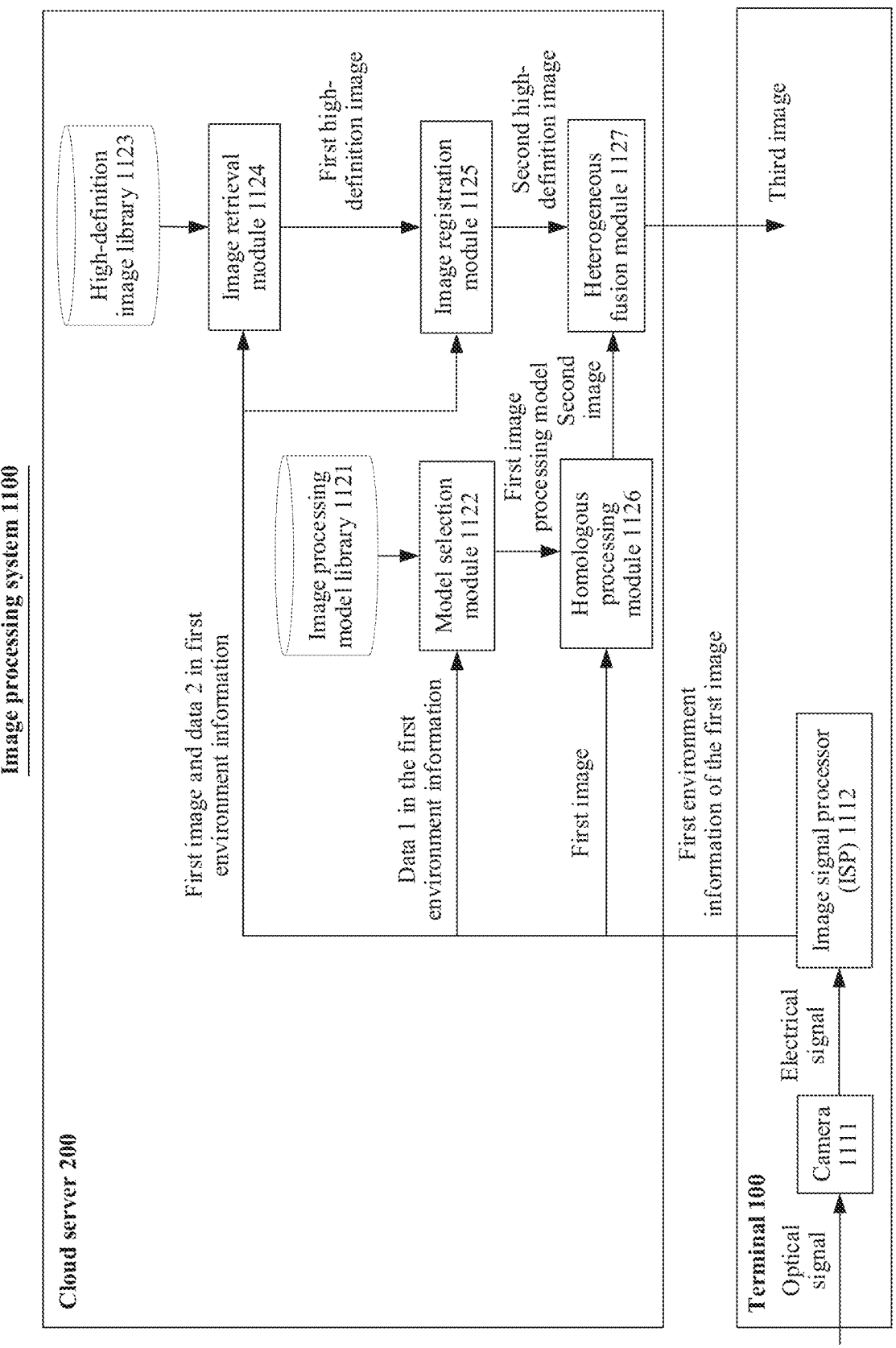
FIG. 11 is a schematic diagram of an architecture of still another image processing system according to an embodiment of this application.

FIG. 11 is a schematic diagram of an architecture of an image processing system 1100 according to an embodiment of this application. As shown in FIG. 11, the image processing system 1100 may include a terminal 100 and a cloud server 200.

The terminal 100 may include a camera 1111 and an image signal processor 1112.

The camera 1111 may be configured to: when a user performs photographing, capture an optical signal, convert the optical signal into an electrical signal, and send the electrical signal to the image signal processor 1112.

The image signal processor 1112 may convert the electrical signal sent by the camera 1111 into a digital image signal, which is also referred to as a first image. A format of the first image may be a raw image, a YUV image, an RGB image, or the like. The image signal processor 1112 may further obtain first environment information (including one or more of geographic location information, weather information, season information, time information, a photographing parameter, photographing posture information, and the like) of the first image from one or more sensors (not shown in the figure) of the terminal 100 and a network to which the terminal 100 is connected.

The cloud server 200 may include an image processing model library 1121, a model selection module 1122, a high-definition image library 1123, an image retrieval module 1124, an image registration module 1125, a homologous processing module 1126, and a heterogeneous fusion module 1127.

The image processing model library 1121 may be configured to store a plurality of image processing models obtained through classification based on photographing environments.

The model selection module 1122 may be configured to determine, from the image processing model library 1121 based on data 1 in the first environment information sent by the terminal 100, a first image processing model matching the data 1. The data 1 may be all or a part of the first environment information. For example, when the first environment information includes geographic location information, weather information, season information, time information, a photographing parameter, and photographing posture information, the data 1 may include the geographic location information and the weather information.

The high-definition image library 1123 may be configured to store a plurality of high-definition images and second environment information of the high-definition images.

The image retrieval module 1124 may be configured to retrieve a first high-definition image from the high-definition image library 1123 based on the first image and data 2 in the first environment information of the first image. A similarity between a photographing environment of the first high-definition image and a photographing environment of the first image falls within a first preset range, and a similarity between photographed content of the first high-definition image and photographed content of the first image falls within a preset range. The data 2 may be all or a part of the first environment information. For example, when the first environment information includes geographic location information, weather information, season information, time information, a photographing parameter, and photographing posture information, the data 2 may include the geographic location information, the season information, the time information, and the photographing posture information.

The image registration module 1125 may be configured to perform image registration on the first high-definition image based on the first image, to obtain a second high-definition image.

The homologous processing module 1126 may be configured to perform, based on the first image processing model selected by the model selection module 1122, optimization processing on the first image sent by the terminal 100, to obtain a second image.

The heterogeneous fusion module 1127 may be configured to perform image fusion on the second image obtained through processing by the homologous processing module 1126 and the second high-definition image, to obtain a third image. The cloud server 200 may send the third image to the terminal 100.

According to the image processing system 1100 provided in this embodiment of this application, the terminal can be equipped with a photographing and imaging system by combining processing capabilities of the terminal and the cloud server and fully using high-quality image data and an image processing algorithm. The cloud server may obtain, through matching by using an image and environment information (for example, geographic location information, weather information, time information, a photographing parameter, or photographing posture information) of the image that are uploaded by the terminal, an image processing algorithm suitable for the image and high-quality image data that has same photographed content as the image and has a similar photographing environment to the image. Quality and an effect of the image uploaded by the terminal can be improved by using the image processing algorithm and the high-quality image data. In this way, images photographed in different environments can present different styles and effects. In addition, the terminal can break through an imaging quality limit of the terminal, so that a common camera on the terminal can also achieve an effect of a professional digital single-lens reflex device, thereby greatly improving photographing quality of the terminal and photographing experience of the user while reducing costs of the mobile phone.

The following describes an image processing system 1200 in this application.

Figure 12:
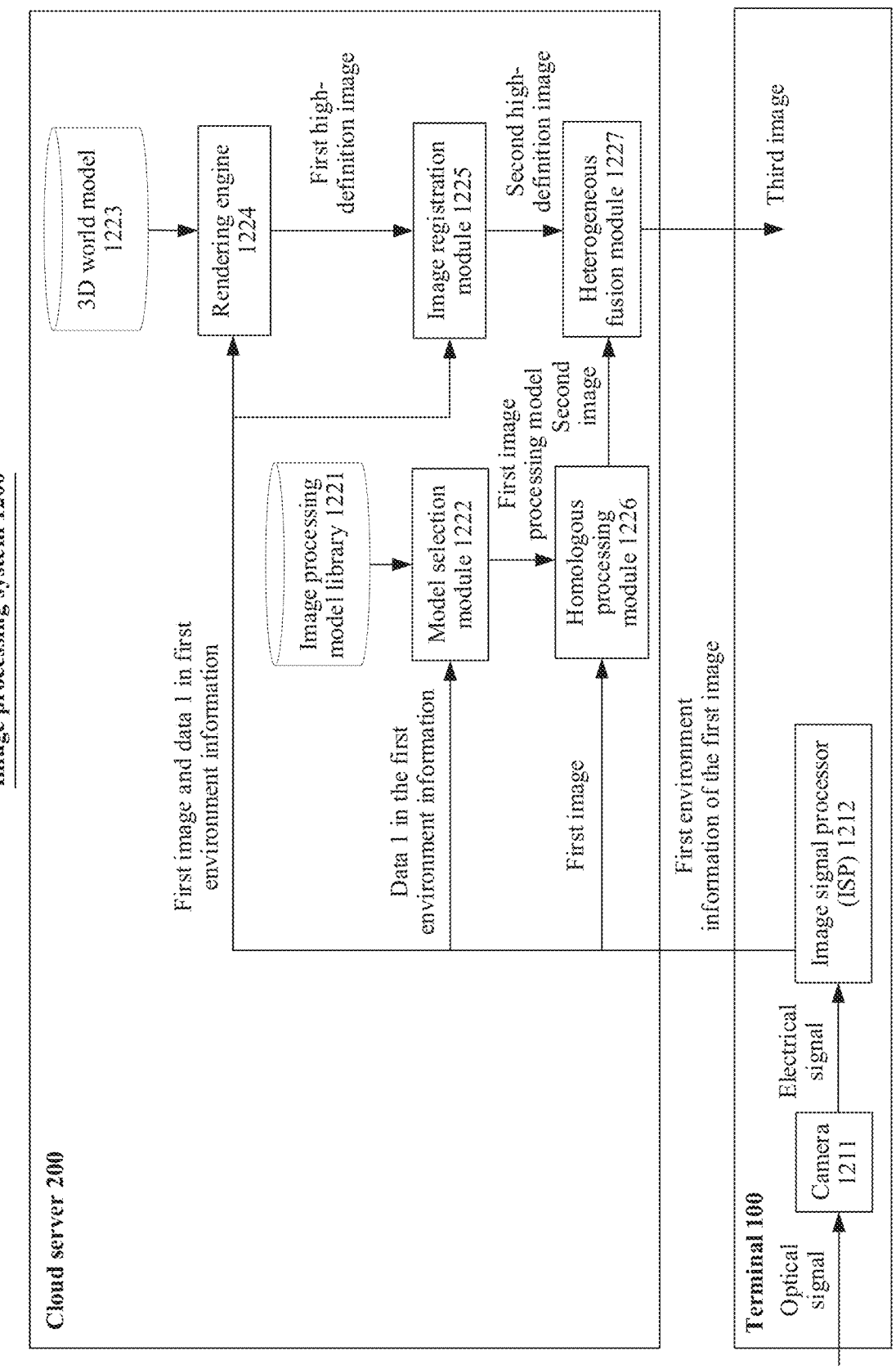
FIG. 12 is a schematic diagram of an architecture of still another image processing system according to an embodiment of this application.

FIG. 12 is a schematic diagram of an architecture of an image processing system 1200 according to an embodiment of this application. As shown in FIG. 12, the image processing system 1200 may include a terminal 100 and a cloud server 200.

The terminal 100 may include a camera 1211 and an image signal processor 1212.

The camera 1211 may be configured to: when a user performs photographing, capture an optical signal, convert the optical signal into an electrical signal, and send the electrical signal to the image signal processor 1212.

The image signal processor 1212 may convert the electrical signal sent by the camera 1211 into a digital image signal, which is also referred to as a first image. A format of the first image may be a raw image, a YUV image, an RGB image, or the like. The image signal processor 1212 may further obtain first environment information (including one or more of geographic location information, weather information, season information, time information, a photographing parameter, photographing posture information, and the like) of the first image from one or more sensors (not shown in the figure) of the terminal 100 and a network to which the terminal 100 is connected.

The cloud server 200 may include an image processing model library 1221, a model selection module 1222, a 3D world model 1223, a rendering engine 1224, an image registration module 1225, a homologous processing module 1226, and a heterogeneous fusion module 1227.

The image processing model library 1221 may be configured to store a plurality of image processing models obtained through classification based on photographing environments.

The model selection module 1222 may be configured to determine, from the image processing model library 1221 based on data 1 in the first environment information sent by the terminal 100, a first image processing model matching the data 1 in the first environment information. The data 1 may be all or a part of the first environment information. For example, when the first environment information includes geographic location information, weather information, season information, time information, a photographing parameter, and photographing posture information, the data 1 may include the geographic location information and the weather information.

The 3D world model 1223 includes 3D map information of a real world.

The rendering engine 1224 may be configured to render a first high-definition image from the 3D world model 1223 based on data 2 in the first environment information of the first image. A similarity between photographed content of the first high-definition image and photographed content of the first image falls within a preset range, and a photographing environment of the first high-definition image is the same as a photographing environment of the first image. The data 2 may be all or a part of the first environment information. For example, when the first environment information includes geographic location information, weather information, season information, time information, a photographing parameter, and photographing posture information, the data 2 may include the geographic location information, the season information, the time information, and the photographing posture information.

The image registration module 1225 may be configured to perform image registration on the first high-definition image based on the first image, to obtain a second high-definition image.

The homologous processing module 1226 may be configured to perform, based on the first image processing model selected by the model selection module 1222, optimization processing on the first image sent by the terminal 100, to obtain a second image.

The heterogeneous fusion module 1227 may be configured to perform image fusion on the second image obtained through processing by the homologous processing module 1226 and the second high-definition image, to obtain a third image. The cloud server 200 may send the third image to the terminal 100.

According to the image processing system 1200 provided in this embodiment of this application, the terminal can be equipped with a photographing and imaging system by combining processing capabilities of the terminal and the cloud server and fully using high-quality image data and an image processing algorithm. The cloud server may obtain, through matching by using an image and environment information (for example, geographic location information, weather information, time information, a photographing parameter, or photographing posture information) of the image that are uploaded by the terminal, an image processing algorithm suitable for the image and high-quality image data that has same photographed content as the image and has a similar photographing environment to the image. Quality and an effect of the image uploaded by the terminal can be improved by using the image processing algorithm and the high-quality image data. In this way, images photographed in different environments can present different styles and effects. In addition, the terminal can break through an imaging quality limit of the terminal, so that a common camera on the terminal can also achieve an effect of a professional digital single-lens reflex device, thereby greatly improving photographing quality of the terminal and photographing experience of the user while reducing costs of the mobile phone.

The following describes a data construction system in embodiments of this application.

Figure 13:
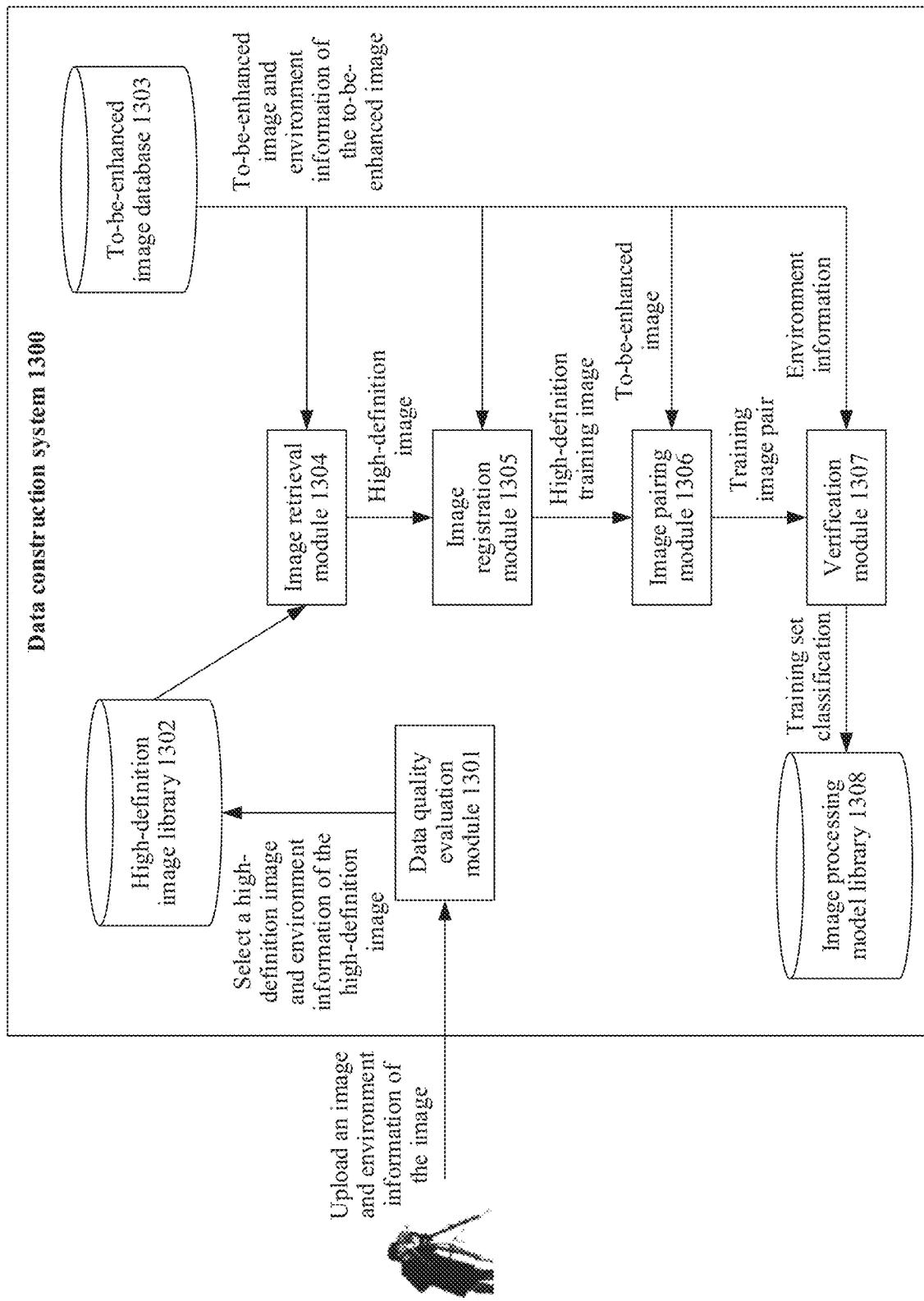
FIG. 13 is a schematic diagram of an architecture of a data construction system according to an embodiment of this application.

FIG. 13 is a schematic diagram of an architecture of a data construction system 1300 according to an embodiment of this application. As shown in FIG. 13, the data construction system 1300 may include a data quality evaluation module 1301, a high-definition image library 1302, a to-be-enhanced image database 1303, an image retrieval module 1304, an image registration module 1305, an image pairing module 1306, a verification module 1307, and an image processing model library 1308.

A professional photographer or a photography enthusiast may upload images and environment information of the images to the data quality evaluation module 1301.

The data quality evaluation module 1301 may be configured to: evaluate image quality of the images uploaded by the professional photographer or the photography enthusiast, remove a low-quality image, for example, an image with low definition or incomplete environment information, from the images, select a high-definition image and environment information of the high-definition image, and upload the high-definition image and the environment information of the high-definition image to the high-definition image library 1302.

The to-be-enhanced image database 1303 may store a plurality of to-be-enhanced images and environment information of the plurality of to-be-enhanced images.

The image retrieval module 1304 may be configured to: retrieve a to-be-enhanced image and environment information of the to-be-enhanced image from the to-be-enhanced image database 1303, and retrieve, from the high-definition image data 1302, a high-definition image that has same environment information as the to-be-enhanced image and has similar photographed content to the to-be-enhanced image.

The image retrieval module 1305 may be configured to perform image registration on the high-definition image based on the to-be-enhanced image, to obtain a high-definition training image.

The image pairing module 1306 may be configured to bind the to-be-enhanced image and the high-definition training image as a training image pair.

The verification module 1307 may be configured to: filter out an image pair with a relatively large alignment deviation, and classify an image pair with a relatively small alignment deviation into a corresponding training set type based on environment information, to train an image processing model in the image processing model library 1308.

According to the data construction system 1300 provided in this embodiment of this application, the image processing model library in the cloud server 200 can be optimized and updated, so that training efficiency of the image processing model is improved.

Figure 14:
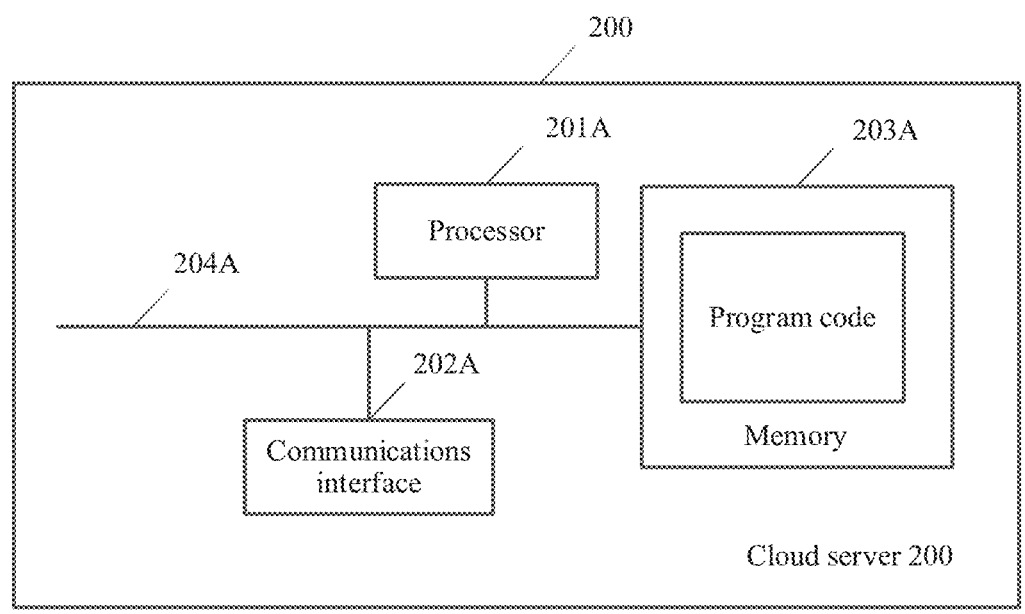
FIG. 14 is a schematic diagram of a structure of a cloud server according to an embodiment of this application.

The following describes a schematic diagram of a structure of a cloud server 200 in embodiments of this application. FIG. 14 is a schematic diagram of a structure of a cloud server 200 according to an embodiment of this application. The cloud server 200 is applied to the image processing system 900 described in FIG. 9, the image processing system 1000 described in FIG. 10, the image processing system 1100 described in FIG. 11, or the image processing system 1200 described in FIG. 12.

As shown in FIG. 14, the cloud server 200 includes one or more processors 201A, communications interfaces 202A, and memories 203A. The processor 201A, the communications interface 202A, and the memory 203A may be connected by using a bus or in another manner. An example in which the processor 201A, the communications interface 202A, and the memory 203A are connected by using a bus 204A is used in this embodiment of this application.

The processor 201A may include one or more general-purpose processors, for example, CPUs. The processor 201A may be configured to run program code related to a device running control method.

The communications interface 202A may be a wired interface (for example, an Ethernet interface) or a wireless interface (for example, a cellular network interface or a wireless local area network interface), and is configured to communicate with another node. In this embodiment of this application, the communications interface 202A may be specifically configured to communicate with the electronic device 100.

The memory 203A may include a volatile memory (volatile memory), for example, a RAM. Alternatively, the memory may include a nonvolatile memory (nonvolatile memory), for example, a ROM, a flash memory (flash memory), an HDD, or a solid-state drive SSD. Alternatively, the memory 203A may include a combination of the foregoing types of memories. The memory 203A may be configured to store a group of program code, so that the processor 201A invokes the program code stored in the memory 203A to implement the method implemented by the server in embodiments of this application.

It should be noted that the server shown in FIG. 14 is merely an implementation in this embodiment of this application. During actual application, the server may alternatively include more or fewer components. This is not limited herein.

Figure 15:
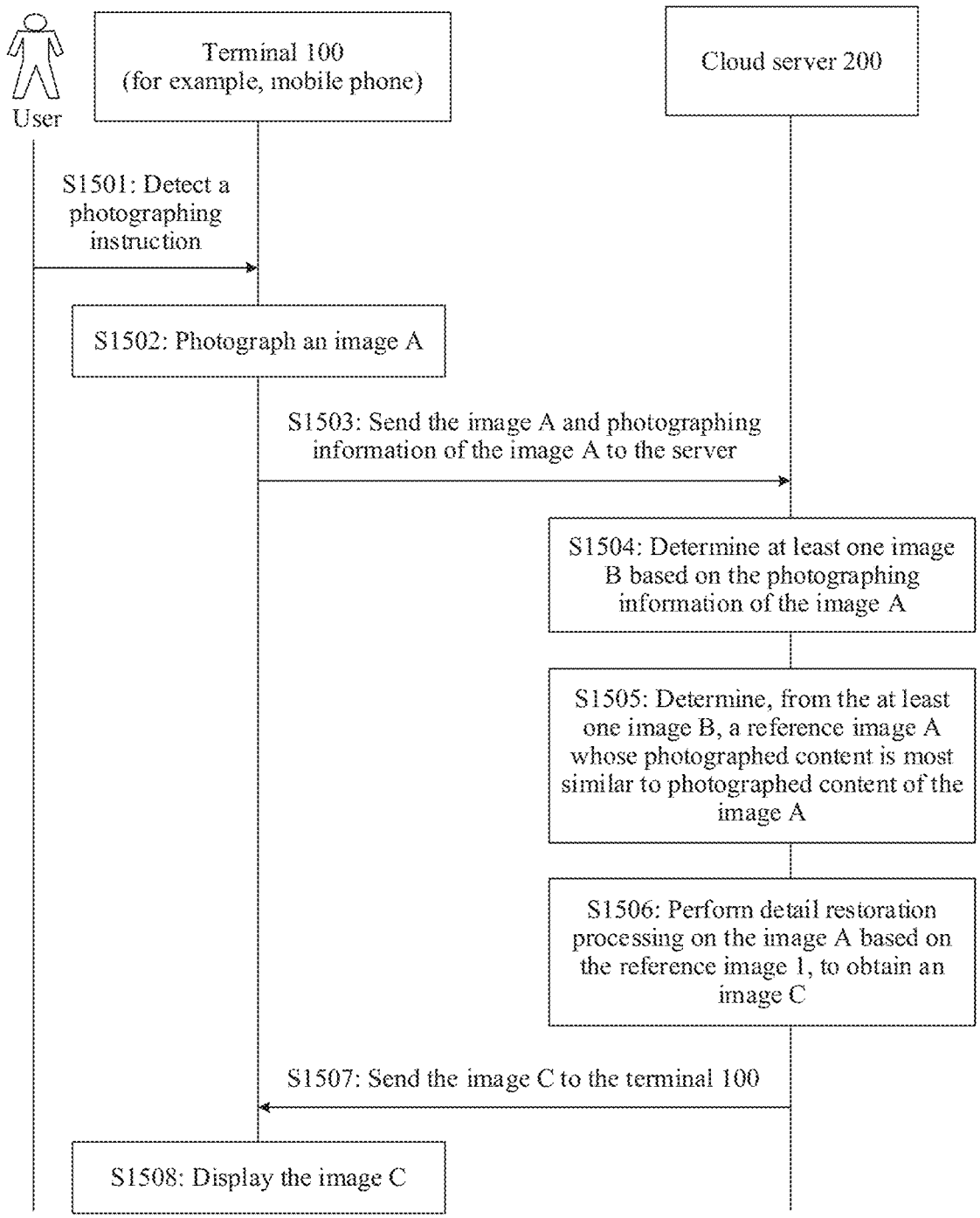
FIG. 15 is a schematic flowchart of an image processing method according to an embodiment of this application.
Figure 16:
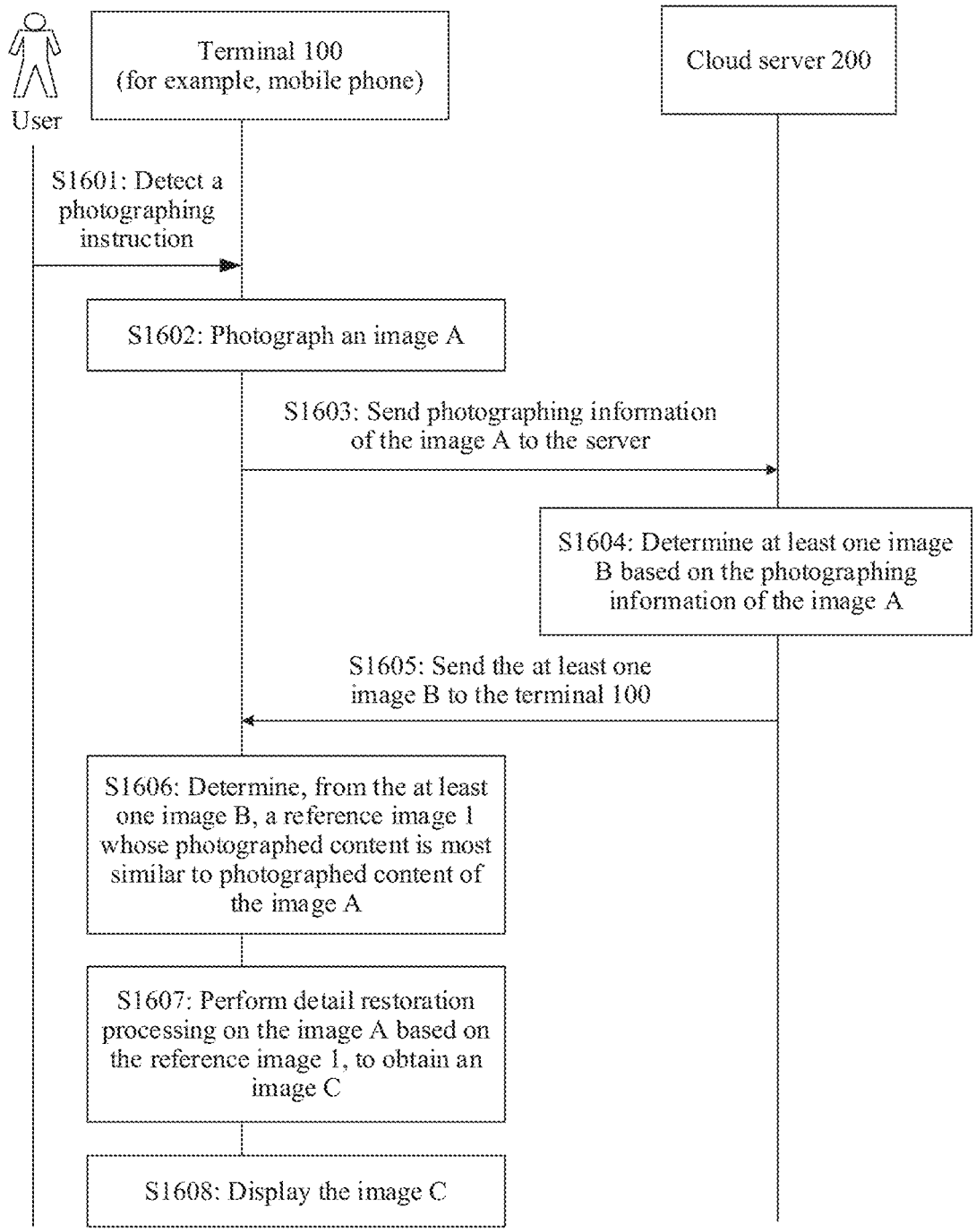
FIG. 16 is a schematic flowchart of another image processing method according to an embodiment of this application.
Figure 17:
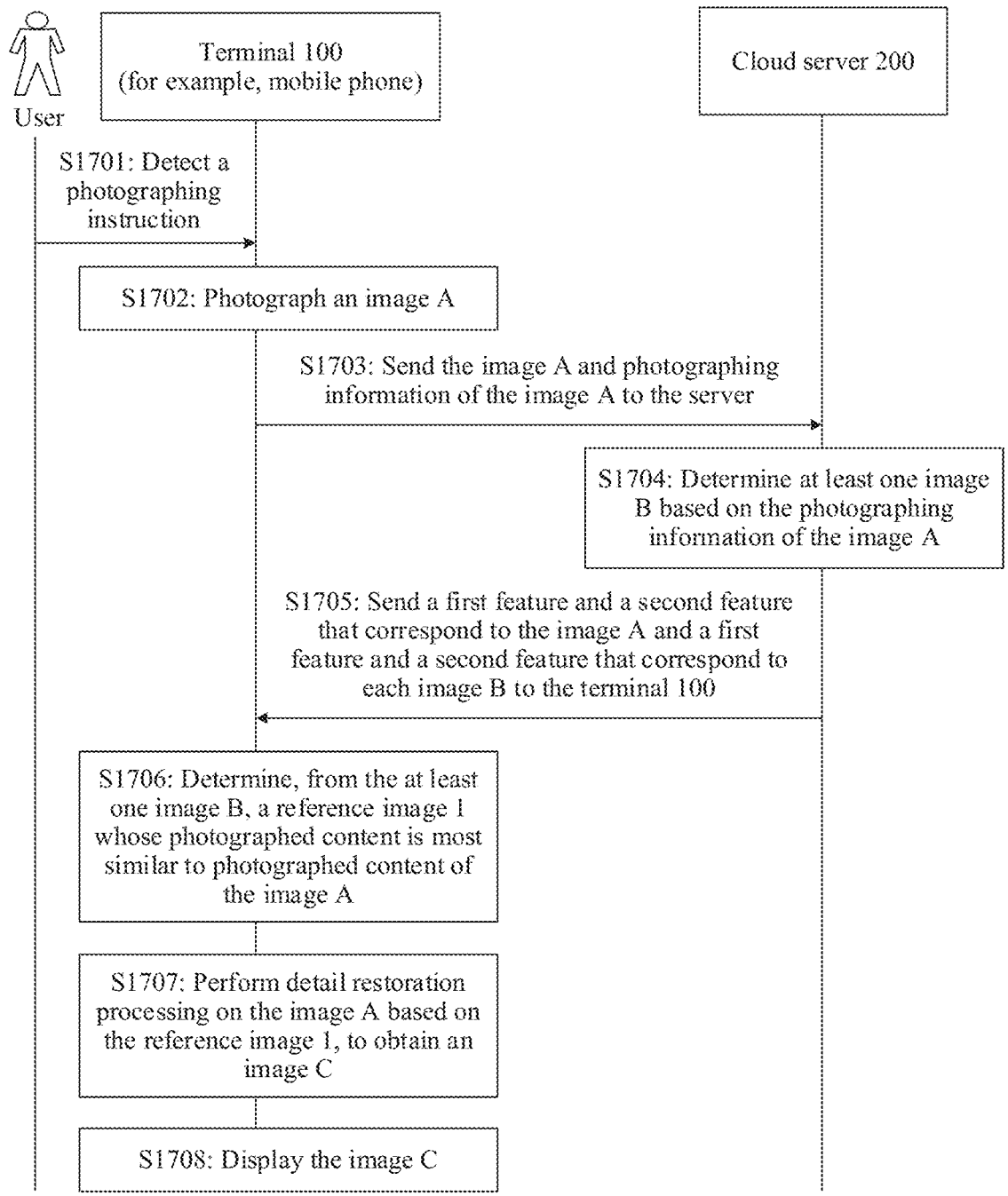
FIG. 17 is a schematic flowchart of still another image processing method according to an embodiment of this application.

The following describes examples of the image processing method in embodiments of this application with reference to FIG. 15 to FIG. 17.

FIG. 15 is a schematic flowchart of an image processing method according to an embodiment of this application. In this embodiment, a terminal 100 sends an image A and photographing information of the image A to a cloud server 200, and the cloud server 200 determines a reference image 1 from a high-definition image library. Photographing information of the reference image 1 is similar to the photographing information of the image A, and photographed content of the reference image 1 is also consistent with photographed content of the image A. The cloud server 200 performs detail restoration processing on the image A based on the reference image 1, to obtain an image C. and returns the image C to the terminal 100. As shown in FIG. 15, the image processing method includes but is not limited to the following steps.

S1501: The terminal 100 detects a photographing instruction.

To help the terminal 100 obtain the photographing information of the photographed image A, a GPS of the terminal 100 may be enabled, and the terminal 100 may be connected to a network.

Optionally, an application (application, APP) used to upload the image A and the photographing information of the image A may be installed on the terminal 100. Optionally, the application may include but is not limited to a photographing application, an image edition application, or the like. An account may be further used for login to the application on the terminal 100.

A user may initiate the photographing instruction by using a touchscreen operation, or may initiate the photographing instruction by using a key. The terminal 100 detects the photographing instruction, and photographs the image A. The terminal 100 may further obtain photographing geographic location information of the image A by using the GPS. Optionally, the terminal 100 may further obtain, as photographing weather condition information of the image A, weather condition information of the photographing geographic location information from the network. Optionally, the terminal 100 may further obtain a photographing ratio of the image A.

S1502: The terminal 100 photographs the image A.

Because of a limitation of an imaging device, when photographing is performed at a large ratio, resolution of the image A is relatively low, and details are relatively blurred.

S1503. The terminal 100 sends the image A and the photographing information of the image A to the cloud server.

In some embodiments, the terminal 100 may send the image A and the photographing information of the image A to the cloud server by using the photographing application or the image edition application. The cloud server corresponds to the photographing application or the image edition application.

The high-definition image library may be configured on the cloud server, and the high-definition image library stores a plurality of high-definition images, photographing information of each of the plurality of high-definition images, and a first feature and a second feature that correspond to each of the plurality of high-definition images. The first feature may be extracted by using a retrieval network, the second feature may be extracted by using a resorting network, and the resorting network may be a feature extraction network that is more complex than the retrieval network. Therefore, the second feature extracted by using the resorting network is finer than the first feature extracted by using the retrieval network, in other words, the second feature can express more detailed features of the image. In this embodiment of this application, rough quick retrieval may be performed by using the first feature extracted by using the retrieval network, and more accurate retrieval may be further performed by using the second feature extracted by using the resorting network, to determine the reference image 1 whose photographed content is most similar. For details, refer to descriptions in subsequent embodiments, and details are not described.

For example, based on a plurality of geographical areas, the plurality of high-definition images are separately collected by using a high-definition photographing device, so that the plurality of collected high-definition images constitute the high-definition image library. The geographical area may be a large geographical area obtained through classification. For example, Shenzhen, Guangzhou, and Chongqing may be used as large geographical areas.

A first feature corresponding to each of the plurality of high-definition images is extracted by using the retrieval network. For example, each of the plurality of high-definition images may be input into the retrieval network, to obtain the first feature corresponding to each high-definition image.

A second feature corresponding to each of the plurality of high-definition images is extracted by using the resorting network. For example, each of the plurality of high-definition images may be input into the resorting network, to obtain the second feature corresponding to each high-definition image.

The plurality of high-definition images and first features and the second features that correspond to the plurality of high-definition images are classified and stored based on photographing information (the photographing information includes but is not limited to photographing geographic location information, photographing weather condition information, a photographing ratio, and the like) of the high-definition images. The photographing weather condition information may include a sunny day, a cloudy day, a foggy day, a rainy day, or the like when the high-definition image is photographed.

For ease of retrieval, the plurality of high-definition images may be classified into a plurality of large types based on photographing geographical areas of the high-definition images. For example, all high-definition images whose geographical areas belong to Shenzhen are classified into a large type, and all high-definition images whose geographical areas belong to Guangzhou are classified into another large type. It may be understood that geographical areas may be obtained through classification in another manner. For example, geographical areas may be obtained through classification based on scenic spot names. This is not limited in this embodiment of this application.

All high-definition images belonging to a same geographical area are further classified based on the photographing information of the high-definition images. For example, a plurality of high-definition images with same or similar photographing ratios, same or similar GPS information, and same photographing weather condition information may be classified into a same type. Certainly, during classification, referenced photographing information may be selected based on an actual case. For example, a plurality of high-definition images with same or similar photographing ratios and same or similar GPS information may be classified into a same type while photographing weather condition information is not considered. This is not limited in this embodiment of this application.

That photographing ratios are the same or similar may mean that an absolute value of a difference between the photographing ratios is less than or equal to a specified ratio threshold. That GPS information is the same or similar may mean that a distance between geographic locations indicated by the GPS information may be less than or equal to a specified distance threshold.

It may be understood that the GPS information in this embodiment of this application is GPS information of a geographic location at which a photographing device (for example, the terminal 100 or high-definition photographing devices deployed in a plurality of geographical areas) is located when an image is photographed.

When classifying and storing a high-definition image, the cloud server may store a first feature and a second feature that correspond to the high-definition image together for subsequent retrieval. It should be noted that in this embodiment of this application, resolution of the high-definition image stored in the high-definition image library is greater than that of the image A photographed by the terminal 100.

S1504: The cloud server 200 determines the at least one image B based on the photographing information of the image A.

In some embodiments, the cloud server 200 receives the image A and the photographing information of the image A that are sent by the terminal 100, and determines the at least one image B from the high-definition image library based on the photographing information of the image A. A degree of matching between photographing information of each of the at least one image B and the photographing information of the image A is greater than a first threshold.

The photographing information may include one or more of the following information: a photographing ratio, photographing geographic location information, photographing weather condition information, and the like.

Optionally, when the photographing information includes photographing geographic location information, a degree of matching between photographing geographic location information of each of the at least one image B and the photographing geographic location information of the image A is greater than the first threshold. For example, a distance between a photographing geographic location of the image B and a photographing geographic location of the image A is less than or equal to a distance threshold. Consistency of photographing angles of the image A and the subsequently retrieved reference image 1 whose photographed content is most similar to the photographed content of the image A can be ensured by matching the geographic location information.

Optionally, when the photographing information includes a photographing ratio, a degree of matching between a photographing ratio of each of the at least one image B and the photographing ratio of the image A is greater than the first threshold. For example, an absolute value of a difference between the photographing ratio of the image B and the photographing ratio of the image A is less than or equal to a ratio threshold. By matching the photographing ratios, it can be ensured that magnification ratios of the image A and the at least one image B do not differ greatly. Correspondingly, consistency of magnification ratios of the image A and the subsequently retrieved reference image 1 whose photographed content is most similar to the photographed content of the image A can also be ensured.

Optionally, when the photographing information includes photographing weather condition information, a degree of matching between photographing weather condition information of each of the at least one image B and the photographing weather condition information of the image A is greater than the first threshold, for example, both the image A and the image B are photographed on a sunny day, a rainy day, or a foggy day. By matching the weather condition information, consistency of transparency of the image A and the at least one image B can be ensured. Correspondingly, consistency of transparency of the image A and the subsequently retrieved reference image 1 whose photographed content is most similar to the photographed content of the image A can also be ensured.

Optionally, the high-definition images in the high-definition image library may be classified and stored based on photographing information. For details, refer to the descriptions in the foregoing embodiment. Details are not described herein again. When determining the at least one image B based on the photographing information of the image A, the cloud server 200 may determine a corresponding type based on the photographing information of the image A, to obtain the at least one image B from the determined type.

For example, if the photographing information of the image A includes photographing geographic location information, a geographical area to which the photographing geographic location information belongs is determined based on the photographing information, and then the at least one image B with highly matched photographing information is determined from high-definition images belonging to the geographical area. The high-definition images belonging to the geographical area may also be classified and stored based on photographing information. For example, a plurality of high-definition images with same or similar photographing ratios, same or similar GPS information, and same photographing weather condition information are classified into a same type, and the photographing ratio, the GPS information, and the weather condition information are used as classification labels. When determining the at least one image B, the cloud server 200 may determine a corresponding type based on matching between the photographing information of the image A and the classification labels, so that the at least one image B is determined from the type, and a first feature and a second feature that correspond to each of the at least one stored image B are obtained.

S1505: The cloud server 200 determines, from the at least one image B, the reference image 1 whose photographed content is most similar to the photographed content of the image A.

In some embodiments, the cloud server 200 may extract, by using the retrieval network, a first feature corresponding to the image A, and calculate a similarity between the first feature corresponding to the image A and the first feature corresponding to each of the at least one image B, to obtain M most similar images B. It may be understood that the first feature corresponding to each image B may be extracted by using the retrieval network and stored in the high-definition image library in advance. For details, refer to the descriptions in the foregoing embodiment. Details are not described herein again.

For example, the cloud server 200 may sort, in descending order, similarities between the first feature corresponding to the image A and first features corresponding to all of the at least one image B, and use, as the M most similar images B, images B corresponding to M largest similarities.

It may be understood that similarity measurement is performed by using the first feature extracted by using the retrieval network, so that the M images B whose photographed content is approximately similar to the photographed content of the image A can be obtained.

To more accurately determine, from the M images B, an image B whose photographed content is most similar to the photographed content of the image A, in this embodiment of this application, the cloud server 200 may further extract, by using the resorting network, a second feature corresponding to the image A, calculate a similarity between the second feature corresponding to the image A and a second feature corresponding to each of the M images B, to obtain a most similar image B. and use the image B as the reference image 1. It may be understood that the second feature corresponding to each image B may be extracted by using the resorting network and stored in the high-definition image library in advance. For details, refer to the descriptions in the foregoing embodiment. Details are not described herein again.

For example, the cloud server 200 may sort, in descending order, similarities between the second feature corresponding to the image A and second features corresponding to all of the M images B, and use, as the reference image 1, an image B corresponding to a largest similarity.

It should be noted that because the second feature is finer than the first feature, the second feature can express more detailed features of the image. Therefore, a result of similarity sorting performed based on the first feature may be different from a result of similarity sorting performed based on the second feature. It may be understood that the M approximately similar images B may be obtained by performing similarity matching based on the first feature, and then the most similar reference image 1 may be obtained by performing similarity matching based on the second feature. A degree of matching between the photographing information of the reference image 1 and the photographing information of the image A is relatively high, and the photographed content of the reference image 1 is quite similar to the photographed content of the image A. Therefore, in the method in this embodiment of this application, the reference image 1 with a quite similar photographing angle, quite similar photographed content, image transparency, and the like, and relatively high resolution can be obtained, so that detail restoration can be better performed on the image A with relatively low resolution.

S1506: The cloud server 200 performs detail restoration processing on the image A based on the reference image 1, to obtain the image C.

In some embodiments, resolution of the image A is relatively low, and correspondingly, definition is relatively low. The cloud server 200 performs detail restoration processing on the image A based on the reference image 1, to obtain the image C. Resolution of the image C is greater than the resolution of the image A, and correspondingly, definition of the image C is greater than the definition of the image A.

Optionally, the reference image 1 and the image A may be input into a deep learning neural network, high-frequency information of the reference image 1 may be extracted by using the deep learning neural network, and detail restoration may be performed on the image A by using the high-frequency information, to obtain the image C with higher definition.

For example, before detail restoration processing is performed on the image A based on the reference image 1, a proportion of the photographed content of the reference image 1 in the photographed content of the image A may be further determined. The proportion can reflect whether the photographed content included in the retrieved reference image 1 covers the photographed content included in the entire image A.

If the proportion of the photographed content of the reference image 1 in the photographed content of the image A is less than a second threshold, photographed content matching the photographed content of the reference image 1 is removed from the photographed content of the image A to obtain an image A obtained after the removal. The second threshold may be set as actually required. For example, the second threshold may be set to 80%. If the proportion of the photographed content of the reference image 1 in the photographed content of the image A is less than 80%, it indicates that the photographed content included in the reference image 1 does not cover the photographed content included in the entire image A, and photographed content, namely, the image A obtained after the removal, other than the photographed content included in the reference image 1 may be further retrieved from the photographed content included in the image A.

Further, a reference image 2 whose photographed content is most similar to photographed content of the image A obtained after the removal is determined from the at least one image B with highly matched photographing information.

For a method for determining, from the at least one image B, the reference image 2 whose photographed content is most similar to the photographed content of the image A obtained after the removal, refer to the method for determining the reference image 1 in the foregoing embodiment. Details are not described herein again.

After the reference image 1 and the reference image 2 are obtained, detail restoration processing may be performed on the image A based on the reference image 1 and the reference image 2, to obtain the image C.

It may be understood that after the reference image 1 and the reference image 2 are obtained, a proportion of the photographed content of the reference image 1 and the photographed content of the reference image 2 in the photographed content of the image A may be further determined. If the proportion is still less than the second threshold, photographed content matching the photographed content of the reference image 1 and the photographed content of the reference image 2 may be further removed from the photographed content of the image A to obtain an image A obtained after the removal, and a reference image 3 whose photographed content is most similar to photographed content of the image A obtained after the removal is further retrieved from the at least one image B. The process is repeated until a proportion of photographed content of at least one obtained reference image in the photographed content of the image A is greater than or equal to the second threshold, and then detail restoration processing is performed on the image A based on the at least one obtained reference image, to obtain the image C with higher resolution.

It may be understood that a proportion of photographed content of the at least one reference image in the photographed content of the image A may be understood as a proportion of an intersection between the photographed content of the at least one reference image and the photographed content of the image A in the photographed content of the image A.

S1507: The cloud server 200 sends the image C to the terminal 100.

S1508: The terminal 100 displays the image C.

In some embodiments, the terminal 100 receives the image C. and displays the image C. Optionally, to help the user perform comparison, the terminal 100 may display the image A and the image C. The photographed content of the image C is the same as the photographed content of the image A, but the image C has higher definition.

In the embodiment shown in FIG. 15, the terminal needs to send only the photographed image A with relatively low resolution to the cloud server, the cloud server retrieves a reference image with highly matched photographing information and highly similar photographed content, and the cloud server performs detail restoration processing on the image A based on the reference image to obtain the image C, and returns the image C to the terminal. In this implementation, a configuration requirement for the terminal can be reduced, and compatibility is high.

FIG. 16 is another schematic flowchart of an image processing method according to an embodiment of this application. In this embodiment, a terminal 100 sends photographing information of an image A to a cloud server 200, and the cloud server 200 determines at least one image B from a high-definition image library based on the photographing information of the image A. A degree of matching between photographing information of the image B and the photographing information of the image A is greater than a first threshold. The cloud server 200 sends the at least one image B to the terminal 100, and the terminal 100 determines, from the at least one image B, a reference image 1 whose photographed content is most similar to photographed content of the image A As shown in FIG. 16, the image processing method includes but is not limited to the following steps.

S1601: The terminal 100 detects a photographing instruction.

S1602: The terminal 100 photographs the image A.

For step S1601 and step S1602, refer to step S1501 and step S1502 in the embodiment of FIG. 15. Details are not described herein again.

S1603. The terminal 100 sends the photographing information of the image A to the cloud server 200.

In some embodiments, the terminal 100 may send the photographing information of the image A to the cloud server by using a photographing application or an image edition application. The cloud server corresponds to the photographing application or the image edition application.

The high-definition image library may be configured on the cloud server, and the high-definition image library stores a plurality of high-definition images and photographing information of each of the plurality of high-definition images. For example, based on a plurality of geographical areas, the plurality of high-definition images are separately collected by using a high-definition photographing device, so that the plurality of collected high-definition images constitute the high-definition image library. The geographical area may be a large geographical area obtained through classification. For example, Shenzhen, Guangzhou, and Chongqing may be used as large geographical areas.

The plurality of high-definition images are classified and stored based on photographing information (the photographing information includes but is not limited to photographing geographic location information, photographing weather condition information, a photographing ratio, and the like) of the high-definition images. The photographing weather condition information may include a sunny day, a cloudy day, a foggy day, a rainy day, or the like when the high-definition image is photographed.

For ease of retrieval, the plurality of high-definition images may be classified into a plurality of large types based on photographing geographical areas of the high-definition images. For example, all high-definition images whose geographical areas belong to Shenzhen are classified into a large type, and all high-definition images whose geographical areas belong to Guangzhou are classified into another large type. It may be understood that geographical areas may be obtained through classification in another manner. For example, geographical areas may be obtained through classification based on scenic spot names. This is not limited in this embodiment of this application.

All high-definition images belonging to a same geographical area are further classified based on the photographing information of the high-definition images. For example, a plurality of high-definition images with same or similar photographing ratios, same or similar GPS information, and same photographing weather condition information may be classified into a same type. Certainly, during classification, referenced photographing information may be selected based on an actual case. For example, a plurality of high-definition images with same or similar photographing ratios and same or similar GPS information may be classified into a same type while photographing weather condition information is not considered. This is not limited in this embodiment of this application.

That photographing ratios are the same or similar may mean that an absolute value of a difference between the photographing ratios is less than or equal to a specified ratio threshold. That GPS information is the same or similar may mean that a distance between geographic locations indicated by the GPS information may be less than or equal to a specified distance threshold.

It may be understood that the GPS information in this embodiment of this application is GPS information of a geographic location at which a photographing device (for example, the terminal 100 or high-definition photographing devices deployed in a plurality of geographical areas) is located when an image is photographed.

In this embodiment of this application, resolution of the high-definition image stored in the high-definition image library is greater than that of the image A photographed by the terminal 100.

S1604: The cloud server 200 determines the at least one image B based on the photographing information of the image A.

The cloud server 200 may determine the at least one image B whose photographing information highly matches the photographing information of the image A. For a specific determining method, refer to step S1504 in the embodiment of FIG. 15. Details are not described herein again.

S1605: The cloud server 200 sends the at least one image B to the terminal 100.

S1606: The terminal 100 determines, from the at least one image B, the reference image 1 whose photographed content is most similar to the photographed content of the image A.

In some embodiments, the terminal 100 receives the at least one image B sent by the cloud server 200.

Further optionally, the terminal 100 may separately extract, by using a retrieval network, a first feature corresponding to each of the at least one image B and a first feature corresponding to the image A. For example, each of the at least one image B may be input into the retrieval network to obtain the first feature corresponding to each image B. The image A is input into the retrieval network to obtain the first feature corresponding to the image A.

The terminal 100 calculates a similarity between the first feature corresponding to the image A and the first feature corresponding to each of the at least one image B, to obtain M most similar images B.

For example, the cloud server 200 may sort, in descending order, similarities between the first feature corresponding to the image A and first features corresponding to all of the at least one image B, and use, as the M most similar images B, images B corresponding to M largest similarities.

It may be understood that similarity measurement is performed by using the first feature extracted by using the retrieval network, so that the M images B whose photographed content is approximately similar to the photographed content of the image A can be obtained.

To more accurately determine, from the M images B, an image B whose photographed content is most similar to the photographed content of the image A, in this embodiment of this application, the terminal 100 may separately extract, by using a resorting network, a second feature corresponding to each of the M images B and a second feature corresponding to the image A. For example, each of the M images B may be input into the resorting network to obtain the second feature corresponding to each image B. The image A is input into the resorting network to obtain the second feature corresponding to the image A.

The terminal 100 calculates a similarity between the second feature corresponding to the image A and the second feature corresponding to each of the M images B, to obtain a most similar image B, and uses the image B as the reference image 1.

For example, the cloud server 200 may sort, in descending order, similarities between the second feature corresponding to the image A and second features corresponding to all of the M images B, and use, as the reference image 1, an image B corresponding to a largest similarity.

S1607: The terminal 100 performs detail restoration processing on the image A based on the reference image 1, to obtain an image C.

For specific steps in which the terminal 100 performs detail restoration processing on the image A, refer to step S1506 in the embodiment of FIG. 15. Details are not described herein again.

S1608. The terminal 100 displays the image C.

For step S1608, refer to step S1608 in the embodiment of FIG. 15. Details are not described herein again.

In the embodiment of FIG. 16, the cloud server returns the at least one image B with highly matched photographing information to the terminal, and the terminal extracts, based on a requirement of the terminal, a feature corresponding to the at least one image B and a feature corresponding to the image A, without extracting features of all images in the entire high-definition image library, so that a waste of processing resources is avoided.

FIG. 17 is still another schematic flowchart of an image processing method according to an embodiment of this application. In this embodiment, a terminal 100 sends an image A and photographing information of the image A to a cloud server 200, and the cloud server 200 determines at least one image B from a high-definition image library based on the photographing information of the image A. A degree of matching between photographing information of the image B and the photographing information of the image A is greater than a first threshold. The cloud server 200 further extracts a first feature and a second feature that correspond to the image A, sends the first feature and the second feature that correspond to the image A and a first feature and a second feature that correspond to each image B to the terminal 100, and the terminal 100 determines, from the at least one image B, a reference image 1 whose photographed content is most similar to photographed content of the image A. As shown in the figure, the image processing method includes but is not limited to the following steps.

S1701: The terminal 100 detects a photographing instruction.

S1702: The terminal 100 photographs the image A.

S1703: The terminal 100 sends the image A and the photographing information of the image A to the cloud server 200.

S1704: The cloud server 200 determines the at least one image B based on the photographing information of the image A.

For step S1701 to step S1704, refer to step S1701 to step S1704 in the embodiment of FIG. 17. Details are not described herein again.

S1705: The cloud server sends the first feature and the second feature that correspond to the image A and the first feature and the second feature that correspond to each image B to the terminal 100.

In some embodiments, the cloud server 200 may extract, by using a retrieval network, the first feature corresponding to the image A, and extract, by using a resorting network, the second feature corresponding to the image A.

The cloud server 200 sends, to the terminal 100, the first feature and the second feature that correspond to the image A and the first feature and the second feature that correspond to each of the at least one image B stored in the high-definition image library.

S1706: The terminal 100 determines, from the at least one image B, the reference image 1 whose photographed content is most similar to the photographed content of the image A.

In some embodiments, the terminal 100 determines, based on the received first feature and second feature that correspond to the image A and the received first feature and second feature that correspond to each of the at least one image B, the reference image 1 whose photographed content is most similar to the photographed content of the image A. For a specific determining method, refer to step S1505 in the embodiment of FIG. 15. Details are not described herein again.

S1707: The terminal 100 performs detail restoration processing on the image A based on the reference image 1, to obtain an image C.

In some embodiments, for a procedure in which the terminal 100 performs detail restoration processing on the image A based on the reference image 1, refer to step S1506 in the embodiment of FIG. 15. Details are not described herein again.

S1708: The terminal 100 displays the image C.

For step S1708, refer to step S1508 in the embodiment of FIG. 15. Details are not described herein again.

In the embodiment shown in FIG. 17, the cloud server extracts the feature corresponding to the image and the feature corresponding to the stored image, and the terminal performs matching based on the feature corresponding to the image A and the feature corresponding to the at least one image B that are returned by the cloud server, to obtain the reference image 1, so that there is no need to occupy much memory of the terminal to store image features.

Figure 18:
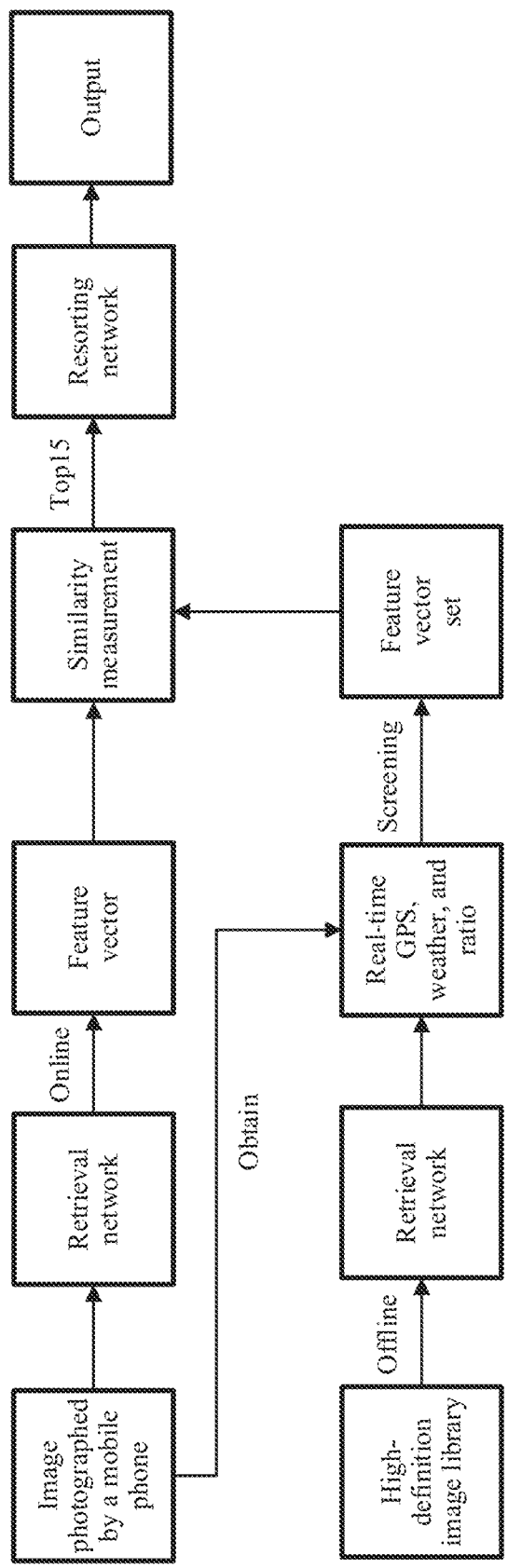
FIG. 18 is a diagram of a framework of an image processing solution according to an embodiment of this application.

FIG. 18 is a diagram of a framework of an image processing solution according to an embodiment of this application. As shown in the figure, a first feature of a high-definition image in a high-definition image library of a cloud server is extracted offline by using a retrieval network.

The cloud server not only extracts, online by using the retrieval network, a first feature (namely, a feature vector) corresponding to an image photographed by a mobile phone, but also obtains a feature vector set from the high-definition image library through screening based on photographing information (including real-time GPS information, weather condition information, a photographing ratio, and the like) of the image photographed by the mobile phone. A degree of matching between photographing information of a high-definition image in the feature vector set and the photographing information of the image photographed by the mobile phone is greater than a first threshold. That the first feature is extracted online may mean that the mobile phone and the cloud server are connected by using a network, the image photographed by the mobile phone is obtained through the network connection, and the first feature of the image is extracted.

Further, similarity measurement is performed between a first feature in the feature vector set and the first feature corresponding to the image photographed by the mobile phone, to obtain M most similar images. For example, if M is 15, 15 most similar high-definition images are obtained.

Second features corresponding to all of the 15 most similar high-definition images are extracted by using a resorting network, and a second feature corresponding to the image photographed by the mobile phone is extracted by using the resorting network. Then similarity measurement is performed between the second features corresponding to all of the 15 high-definition images and the second feature corresponding to the image photographed by the mobile phone, to obtain a most similar reference image. The reference image may be a high-definition image whose photographing angle is highly consistent with a photographing angle of the image photographed by the mobile phone, whose photographing ratio is similar to a photographing ratio of the image photographed by the mobile phone, and whose photographing weather condition information is consistent with photographing weather condition information of the image photographed by the mobile phone.

Detail restoration is performed, based on the reference image, on the image photographed by the mobile phone, to obtain an image whose definition is greater than definition of the image photographed by the mobile phone.

Figure 19:
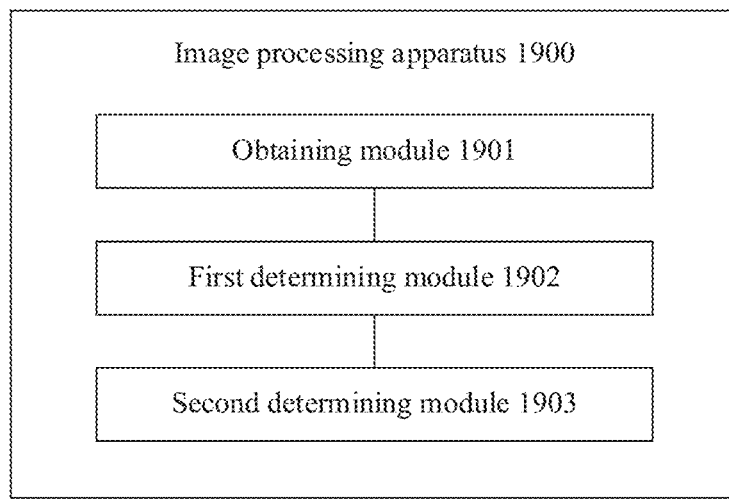
FIG. 19 is a schematic diagram of a structure of an image processing apparatus according to an embodiment of this application.

FIG. 19 is a schematic diagram of a structure of an image processing apparatus according to an embodiment of this application. As shown in the figure, the image processing apparatus may include an obtaining module 1901, a first determining module 1902, and a second determining module 1903.

The obtaining module 1901 is configured to obtain a photographed image A and photographing information of the image A.

The first determining module 1902 is configured to determine at least one image B based on the photographing information of the image A. A degree of matching between photographing information of the image B and the photographing information of the image A is greater than a first threshold, and resolution of the image B is greater than that of the image A.

The second determining module 1903 is configured to determine, from the at least one image B, a reference image 1 whose photographed content is most similar to photographed content of the image A.

Optionally, the photographing information includes one or more of the following information: a photographing ratio, photographing geographic location information, and photographing weather condition information.

Optionally, the image processing apparatus may further include:

a restoration processing module, configured to perform detail restoration processing on the image A based on the reference image 1, to obtain an image C, where resolution of the image C is greater than the resolution of the image A; and an output module, configured to output the image C.

Optionally, the second determining module 1903 may include:

an obtaining unit, configured to separately obtain a first feature corresponding to each of the at least one image B and a first feature corresponding to the image A, where one image B corresponds to one first feature;

a first determining unit, configured to determine, based on a similarity between the first feature corresponding to each of the at least one image B and the first feature corresponding to the image A, M images B whose photographed content is most similar to the photographed content of the image A, where M is an integer greater than or equal to 1; and a second determining unit, configured to determine, from the M images B, the reference image 1 whose photographed content is most similar to the photographed content of the image A.

Optionally, the second determining unit is specifically configured to:

separately obtain a second feature corresponding to each of the M images B and a second feature corresponding to the image A, where one image B corresponds to one second feature; and determine, from the M images B as the reference image 1 based on a similarity between the second feature corresponding to each of the M images B and the second feature corresponding to the image A, an image B whose photographed content is most similar to the photographed content of the image A.

The second feature is finer than the first feature.

Optionally, the image processing apparatus may further include:

a third determining module, configured to determine a proportion of photographed content of the reference image 1 in the photographed content of the image A;

a removal processing module, configured to: if the proportion is less than a second threshold, remove photographed content matching the photographed content of the reference image 1 from the photographed content of the image A to obtain an image A obtained after the removal, and a fourth determining module, configured to determine, from the at least one image B, a reference image 2 whose photographed content is most similar to photographed content of the image A obtained after the removal.

The restoration processing module is specifically configured to perform detail restoration processing on the image A based on the reference image 1 and the reference image 2, to obtain the image C.

It may be understood that the foregoing modules and/or units may be software, hardware, or a combination of software and hardware. For detailed descriptions of the steps, refer to the descriptions in the foregoing method embodiments. Details are not described herein again.

The following describes an image processing method provided in another embodiment of this application.

Currently, to obtain a relatively large field of view (field of view, FOV) during photographing or video recording, the terminal 100 usually performs photographing by using a relatively small zoom ratio. A smaller zoom ratio used indicates a larger field of view of an image photographed by the terminal 100 and more image content included in the image. For example, the terminal 100 may perform photographing by using a wide-angle lens or an ultra-wide-angle lens, to reduce a zoom ratio and increase an FOV of a photographed image. However, the field of view of the photographed image is negatively correlated with image quality of the photographed image. A photographing component on the terminal 100 alone cannot achieve both a large field of view and high-definition image quality of a photographed image. For example, when the wide-angle lens is used to photograph an image or a video, a field of view of a photographed image is relatively large, but image quality of the photographed image is relatively blurred, details and texture of a photographed object are also unclear, and in particular, details and texture of a distant view are more blurred.

Therefore, this application provides an image processing method, to send, to a cloud server 200 by using a high-definition image database on the cloud server 200, a low-definition image of a small zoom ratio (namely, a large angle of view) that is photographed on a terminal 100. The cloud server 200 segments the low-definition image of the small zoom ratio based on a zoom ratio of a high-definition image in the high-definition image library, to obtain a plurality of image blocks. For each image block, the cloud server may perform retrieval and matching in the high-definition image library to obtain one or more high-definition reference images, and then perform image quality improvement by using an image enhancement network that is based on the high-definition reference images, to obtain a plurality of high-definition image blocks. Finally, the cloud server stitches the plurality of high-definition image blocks into a super-definition image with higher resolution and higher definition, and returns the super-definition image to the terminal 100. In this way, with use of a processing capability of the cloud server 200, a photographed image obtained when the terminal 100 photographs an image or a video not only has a relatively large field of view, but also has rich details and texture and definition that can be achieved in a case of a large zoom ratio.

Figure 20:
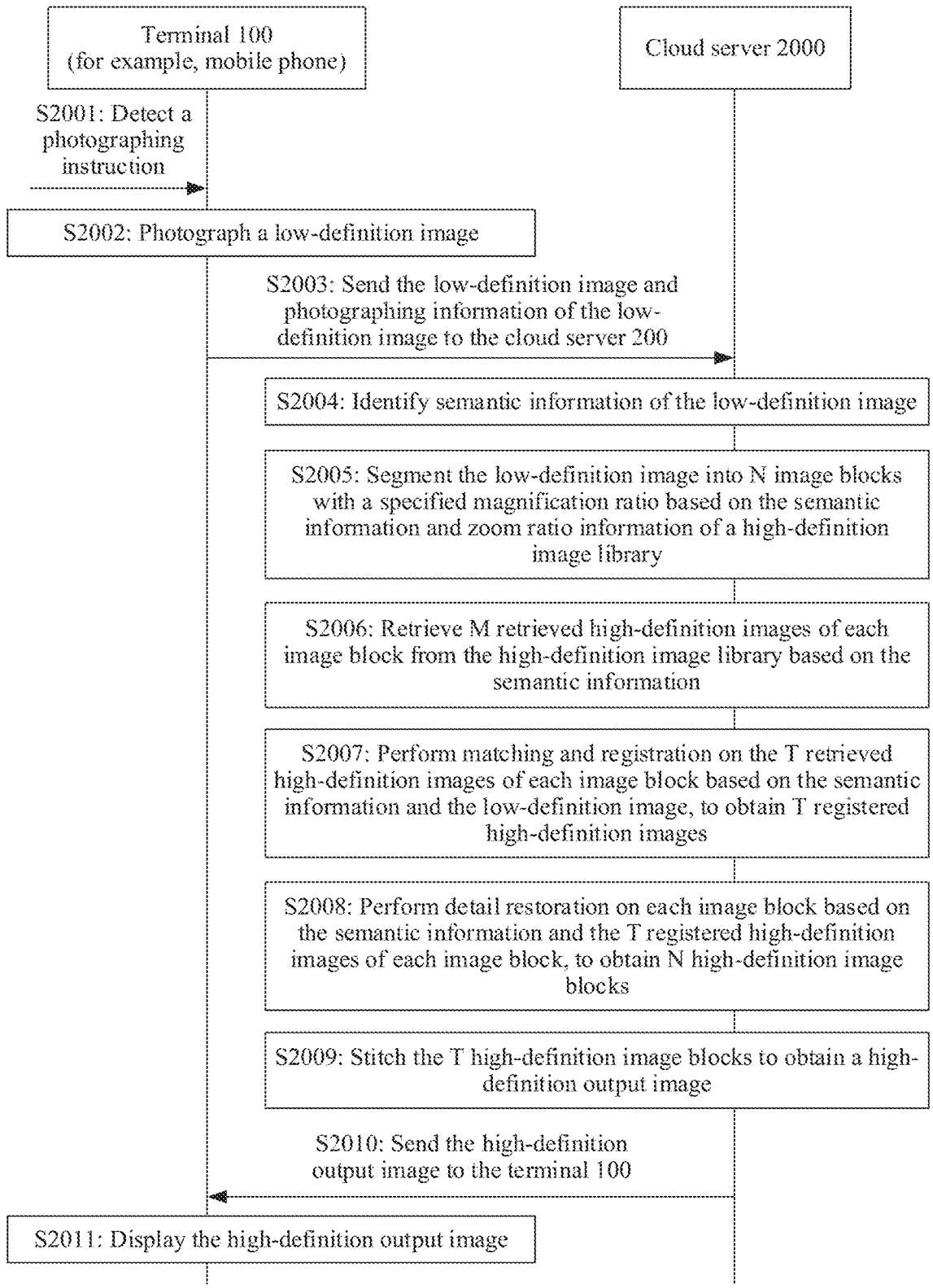
FIG. 20 is a schematic flowchart of another image processing method according to an embodiment of this application.

FIG. 20 is a schematic flowchart of another image processing method according to an embodiment of this application.

As shown in FIG. 20, the method may include but is not limited to the following steps.

S2001: A terminal 100 detects a photographing instruction.

An application (application, APP) used to upload a low-definition image may be installed on the terminal 100. Optionally, the application may include but is not limited to a photographing application, an image edition application, or the like. An account may be further used for login to the application on the terminal 100.

A user may initiate the photographing instruction by using a touchscreen operation, or may initiate the photographing instruction by using a key. The terminal 100 detects the photographing instruction, and photographs a low-definition image.

S2002: After detecting the photographing instruction, the terminal 100 photographs the low-definition image, and obtains photographing information of the low-definition image.

Because of a limitation of an imaging apparatus on the terminal 100, resolution of the low-definition image is relatively low, and details are relatively blurred. The photographing information of the low-definition image includes a zoom ratio and one or more of the following: geographic location information, weather information, season information, time information, a photographing parameter (for example, an aperture or exposure time), photographing posture information, and the like. For example, the terminal 100 may photograph the low-definition image at a zoom ratio of 1.

A smaller zoom ratio indicates a larger field of view of the low-definition image, fewer details in the low-definition image, and a more blurred low-definition image.

S2003: The terminal 100 sends the low-definition image and the photographing information of the low-definition image to a cloud server 200.

After photographing the low-definition image, the terminal 100 may automatically upload the low-definition image and the photographing information of the low-definition image to the cloud server 200. Alternatively, after photographing the low-definition image, the terminal 100 may receive an operation of the user, and upload the low-definition image to the cloud server 200.

In a possible implementation, the terminal 100 may also upload a low-definition image saved in a gallery to the cloud server 200.

S2004: The cloud server 200 identifies semantic information of the low-definition image.

After receiving the low-definition image sent by the terminal 100, the cloud server 200 identifies, by using a semantic segmentation model, areas in which different types of image content in the low-definition image are located, and obtains a semantic segmentation mask (mask) image of the low-definition image. The semantic segmentation mask (mask) image can mark the areas in which different types of image content in the low-definition image are located. The cloud server 200 may mark types of the image content in the low-definition image.

Figure 21A:
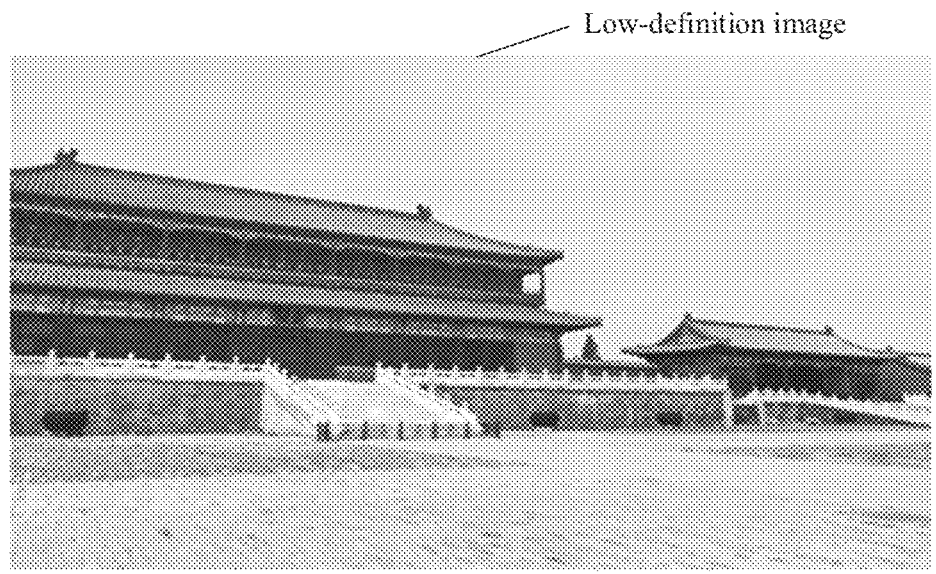
FIG. 21A is a schematic diagram of a low-definition image according to an embodiment of this application.

For example, as shown in FIG. 21A, the types of the image content in the low-definition image may include the sky, a building, the ground, and the like. The cloud server 200 may identify, by using the semantic segmentation model, areas in which the sky, the building, and the ground are located in the low-definition image, to obtain the semantic segmentation mask image.

Figure 21B:
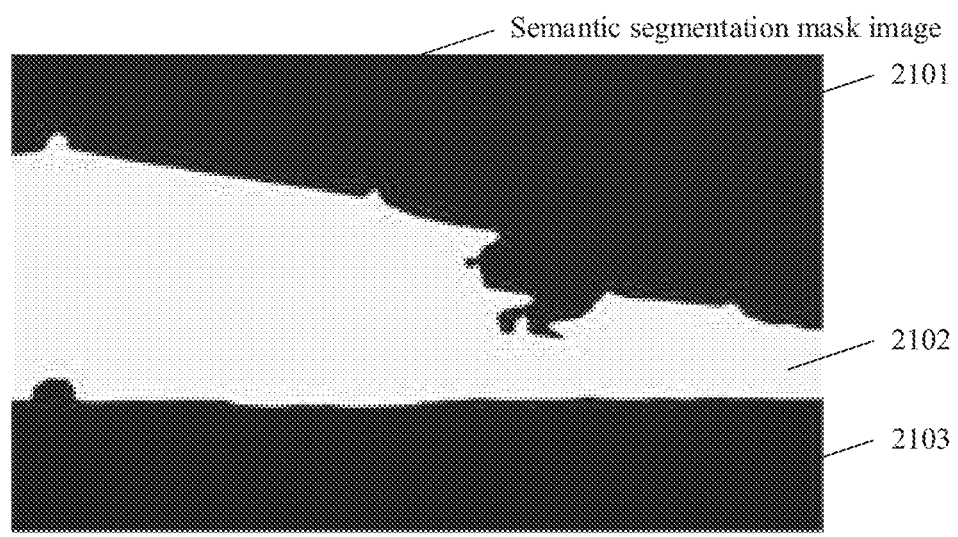
FIG. 21B is a semantic segmentation mask image of a low-definition image according to an embodiment of this application.

As shown in FIG. 21B, the semantic segmentation mask image includes an area 2101, an area 2102, and an area 2103. The area 2101 is used to represent an area in which the sky is located in the low-definition image, the area 2102 is used to represent an area in which the building is located in the low-definition image, and the area 2103 is used to represent an area in which the ground is located in the low-definition image.

S2005: The cloud server 200 segments the low-definition image into N image blocks with a specified magnification ratio based on the semantic information and zoom ratio information of a high-definition image library.

The high-definition image library may be configured on the cloud server 200, and the high-definition image library stores a plurality of high-definition images and photographing information of each of the plurality of high-definition images. The photographing information of the high-definition image may include one or more of the following: a zoom ratio, geographic location information, weather information, season information, time information, a photographing parameter (for example, an aperture or exposure time), photographing posture information, and the like. When the high-definition image library is configured on the cloud server 200, the high-definition image library in the high-definition image library may have a fixed zoom ratio (for example, a zoom ratio of 10).

The cloud server 200 may determine a quantity of image blocks based on the zoom ratio of the high-definition image in the high-definition image library and the zoom ratio of the low-definition image. The zoom ratio of the high-definition image is greater than or equal to the zoom ratio of the low-definition image, and a larger difference between the zoom ratio of the high-definition image and the zoom ratio of the low-definition image indicates a larger quantity of image blocks. A zoom ratio of each image block and the zoom ratio of the high-definition image are the same or similar or meet a preset proportion relationship.

For example, if the zoom ratio of the high-definition image may be a zoom ratio of 10, and the zoom ratio of the low-definition image may be a zoom ratio of 1, the cloud server 200 may segment the low-definition image into N image blocks based on a window of the zoom ratio of 10. A size of each image block is the same as a size of the window of the zoom ratio of 10.

Figure 21C:
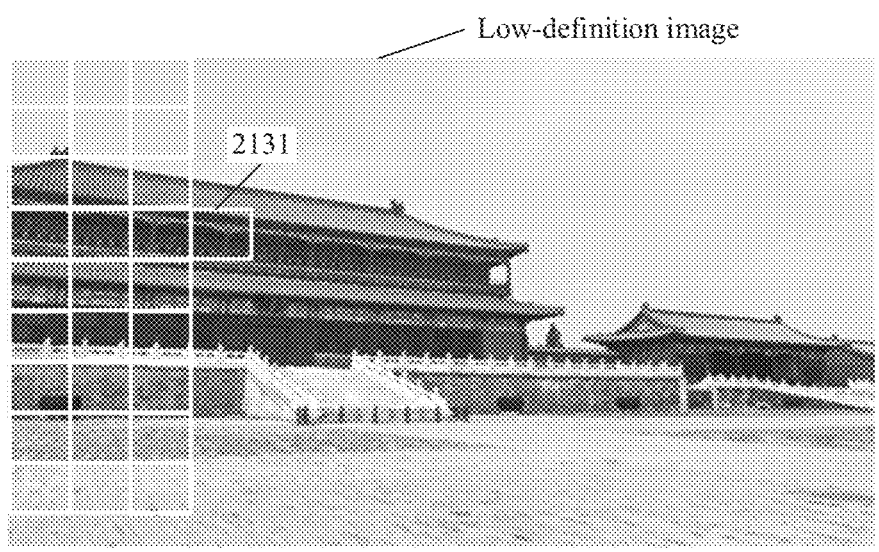
FIG. 21C is a schematic diagram of segmentation of a low-definition image according to an embodiment of this application.
Figure 21D:
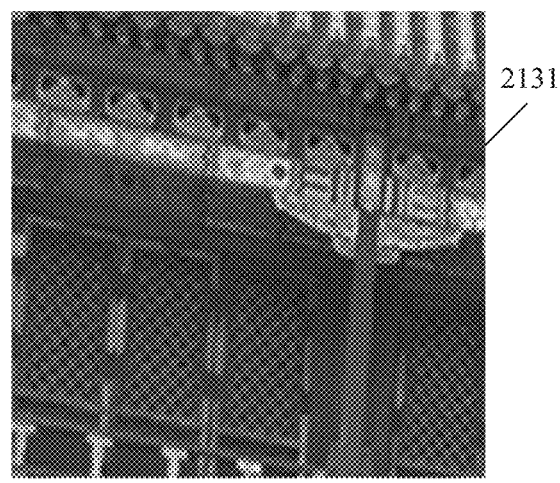
FIG. 21D is a schematic diagram of an image block according to an embodiment of this application.

As shown in FIG. 21C, the low-definition image may be segmented into N image blocks. FIG. 21C shows only an example of some of the N image blocks. An image block 2131 may be specifically shown in FIG. 21D.

The cloud server 200 may also segment the semantic segmentation mask image of the low-definition image by using a same window size, to obtain mask blocks corresponding to the image blocks. The cloud server 200 may mark types of the image blocks.

S2006: The cloud server 200 retrieves T retrieved high-definition images of each image block from the high-definition image library based on the semantic information, where T is a positive integer.

The semantic information may include the types of the image blocks in the low-definition image. In some embodiments, the cloud server 200 may use different retrieval policies for different types of image blocks.

For example, the types of the image blocks may include the sky, a building, and the ground. Because texture of the sky area and texture of the ground area are relatively simple, the cloud server 200 may perform neither image retrieval nor detail restoration on image blocks of the types "sky" and "ground". Because of rich texture and details of the building area, for an image block of the type "building", the cloud server 200 may retrieve a retrieved high-definition image corresponding to the image block of the type "building".

The cloud server 200 may retrieve, from the high-definition image library based on the photographing information of the low-definition image (which may also be referred to as first environment information in other embodiments) and an image block, T retrieved high-definition images corresponding to the image block.

In a possible implementation, the cloud server 200 determines at least one first matched image from the high-definition image library based on the photographing information of the low-definition image. A degree of matching between photographing information of the first matched image and the photographing information of the low-definition image is greater than a first threshold, and resolution of the first matched image is greater than the resolution of the low-definition image. The cloud server separately obtains a first feature corresponding to each of the at least one first matched image and a first feature corresponding to a first-type image block. One first matched image corresponds to one first feature. The cloud server determines, from the at least one first matched image based on a similarity between the first feature corresponding to each of the at least one first matched image and the first feature corresponding to the first image block, T retrieved high-definition images whose photographed content is most similar to photographed content of the first-type image block.

In a possible implementation, the cloud server determines, based on the similarity between the first feature corresponding to each of the at least one first matched image and the first feature corresponding to the first-type image block, at least one second matched image whose first feature is most similar to the first feature of the first-type image block. The cloud server separately obtains a second feature corresponding to each of the at least one second matched image and a second feature corresponding to the first-type image block. One second matched image corresponds to one second feature. The cloud server determines, based on a similarity between the second feature corresponding to each of the at least one second matched image and the second feature corresponding to the first-type image block, T retrieved high-definition images whose second features are most similar to the second feature of the first-type image block. The second feature is finer than the first feature.

For a specific process in which the cloud server 200 performs image retrieval on the image block, refer to the foregoing embodiment shown in FIG. 18. Details are not described herein again.

S2007: The cloud server 200 performs matching and registration on the T retrieved high-definition images of each image block based on the semantic information and the low-definition image, to obtain T registered high-definition images.

In some embodiments, the cloud server 200 may use different matching and registration policies for different types of image blocks by using the semantic information as prior guidance information.

For example, the types of the image blocks may include the sky, a building, and the ground. Because texture of the sky area and texture of the ground area are relatively simple, the cloud server 200 may perform neither image matching and registration nor detail restoration on image blocks of the types "sky" and "ground". Because of rich texture and details of the building area, for an image block of the type "building", after retrieving T retrieved high-definition images corresponding to the image block of the type "building", the cloud server 200 may perform image registration on the high-definition images to obtain T registered high-definition images.

S2008: The cloud server 200 performs detail restoration on each image block based on the semantic information and the T registered high-definition images of each image block, to obtain N high-definition image blocks.

Figure 22:
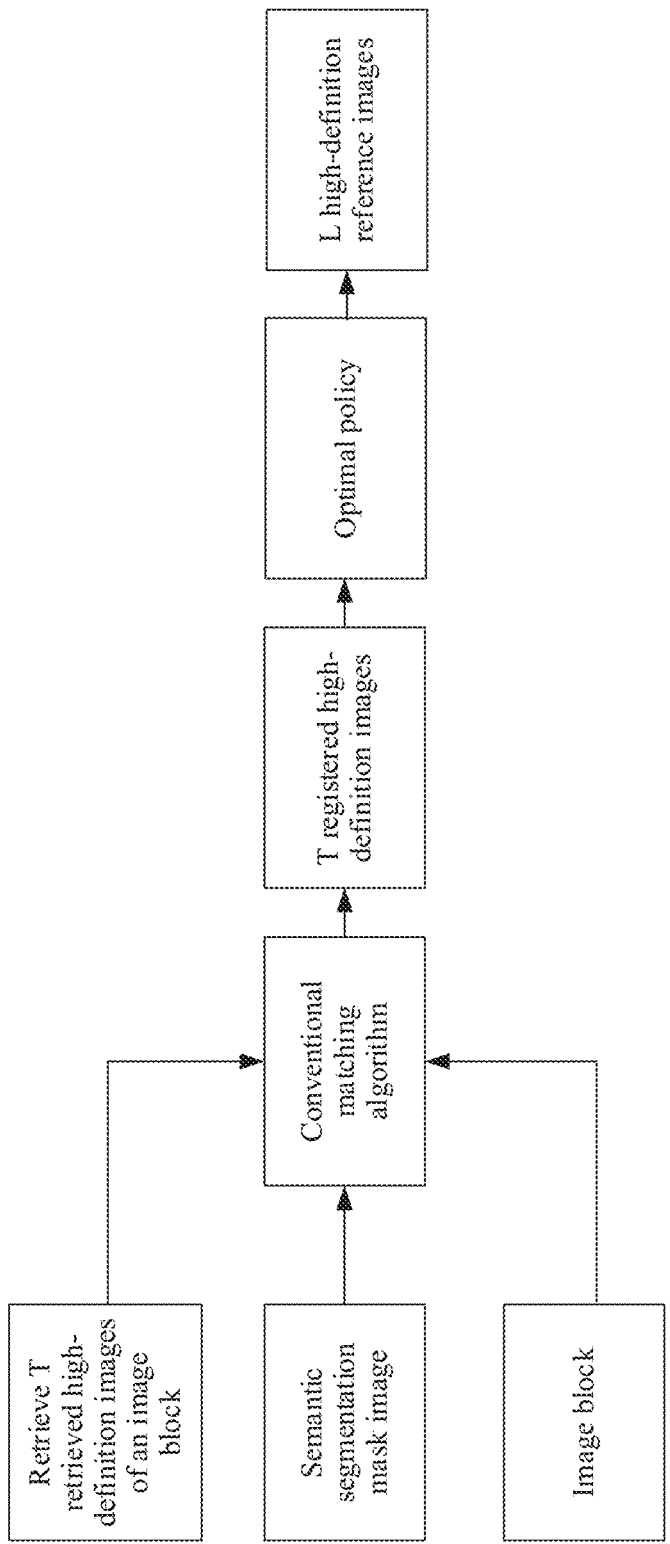
FIG. 22 is a schematic flowchart of image registration according to an embodiment of this application.

The cloud server 200 may perform, in the following process, image registration on the T retrieved high-definition images corresponding to the image block:

As shown in FIG. 22, the cloud server 200 may determine a type of an image block based on the semantic segmentation mask image of the low-definition image, to determine whether registration needs to be performed on the image block. If image registration needs to be performed, the cloud server 200 may obtain, by using a conventional matching algorithm, a feature point that is in the image block and that matches a feature point in each retrieved high-definition image. Then the cloud server 200 may obtain an image spatial coordinate transformation parameter between the image block and each retrieved high-definition image by using matched feature point pairs in the image block and each retrieved high-definition image. The cloud server 200 may perform image registration on each retrieved high-definition image based on the image spatial coordinate transformation parameter, to obtain T registered high-definition images.

Specifically, the cloud server adjusts, based on the image spatial coordinate transformation parameter between the image block and the T retrieved high-definition images, a feature point that is in each retrieved high-definition image and that matches a feature point in the first-type image block to a same location as that in the image block, to obtain the T registered high-registration images.

The conventional matching algorithm may include but is not limited to either of the following two algorithms: a grayscale template-based matching algorithm and a feature-based matching algorithm. The grayscale template-based algorithm includes a mean absolute difference (mean absolute differences, MAD) algorithm, a sum of absolute differences (sum of absolute differences, SAD) algorithm, a sum of squared differences (sum of squared differences, SSD) algorithm, a mean square difference (mean square differences, MSD) algorithm, a normalized cross correlation (normalized cross correlation, NCC) algorithm, a sequential similarity detection algorithm (sequential similarity detection algorithm, SSDA), a Hadamard transform algorithm (sum of absolute transformed difference. SATD), a local grayscale value coding algorithm, and the like. The feature-based matching algorithm may include but is not limited to one or more of the following: a FAST algorithm, an ORB algorithm, a SIFT algorithm, a SURF algorithm, an LBP algorithm, a conventional optical flow method, and the like.

In a possible implementation, after obtaining the T registered high-definition images, the cloud server 200 may select L optimal high-definition reference images from the T registered high-definition images based on an optimal policy. L is a positive integer, and L is less than or equal to T.

The optimal policy may be selecting, from the T registered high-definition images, L high-definition reference images best matching the image block. In some possible implementations, the optimal policy may be selecting L high-definition reference images for which image spatial locations of matched feature point pairs are most similar in image spatial locations of matched feature point pairs in the image block and the T registered high-definition images.

In some embodiments, the cloud server 200 may use different detail restoration policies for different types of image blocks by using the semantic information as prior guidance information.

For example, the types of the image blocks may include the sky, a building, and the ground. Because texture of the sky area and texture of the ground area are relatively simple, the cloud server 200 may perform neither image matching and registration nor detail restoration on image blocks of the types "sky" and "ground". Because of rich texture and details of the building area, for an image block of the type "building", the cloud server 200 may perform detail restoration on the image block after obtaining L high-definition reference images of the image block.

The cloud server 200 may perform, in the following process, detail restoration on the image block by using the L registered high-definition images.

Figure 23A:
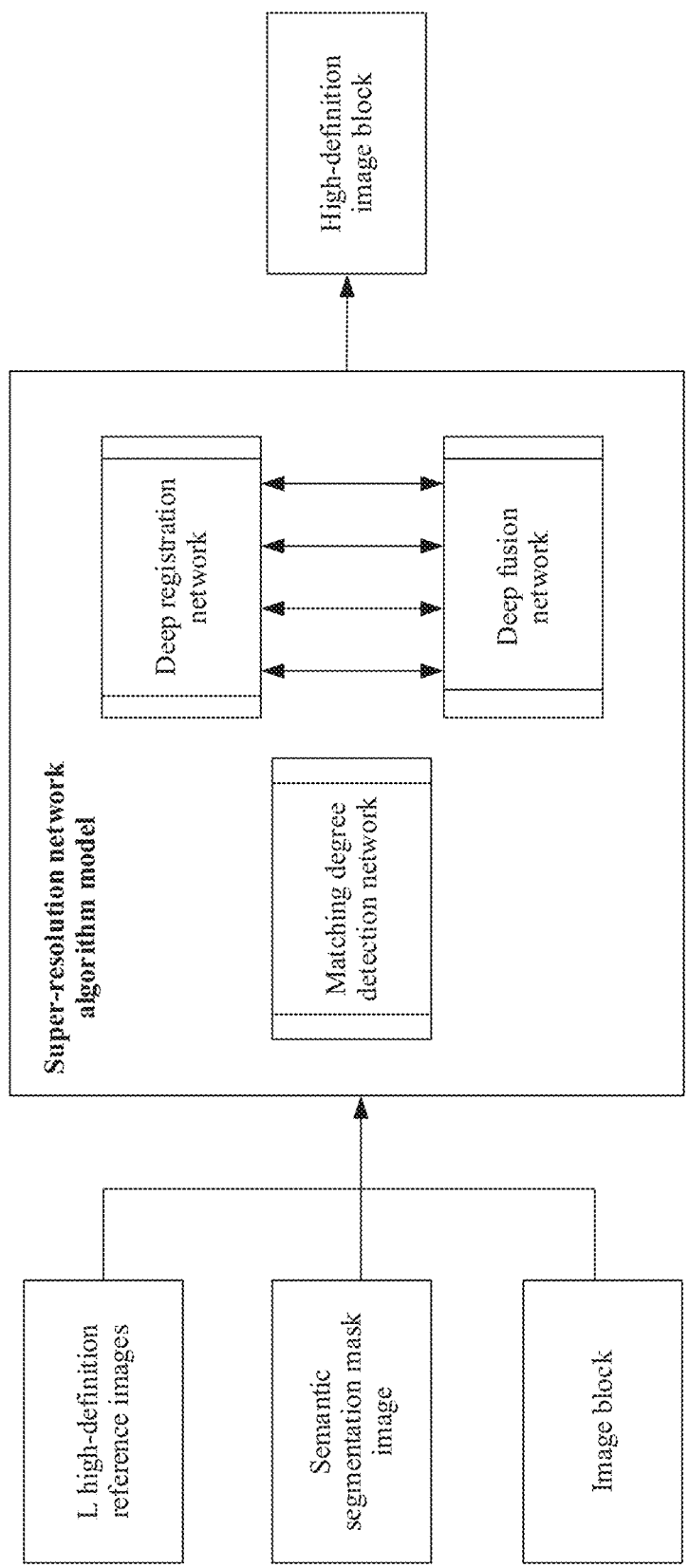
FIG. 23A is a schematic flowchart of image detail restoration according to an embodiment of this application.

As shown in FIG. 23A, the cloud server 200 may determine a type of an image block based on the semantic segmentation mask image of the low-definition image, to determine whether detail restoration needs to be performed on the image block. If image detail restoration needs to be performed, the cloud server 200 may input L high-definition reference images and the image block into a super-resolution network algorithm model, and performs detail restoration on the image block by using detail and texture information in the L high-definition reference images, to improve resolution in the image block to obtain a high-definition image block. The super-resolution network algorithm model may include a matching degree detection network, a deep registration network, and a deep fusion network. The matching degree detection network may be used to detect an area that is in the high-definition reference image and whose content is inconsistent with that in the image block. The deep registration network may be used to perform pixel-level registration on an area that is in the high-definition reference image and whose content is consistent with that in the image block. The deep fusion network may be used to fuse high-frequency details in the high-definition reference image into the image block, to improve resolution of the image block to obtain a high-definition image block.

Figure 23B:
FIG. 23B is a schematic diagram of a high-definition reference image according to an embodiment of this application.
Figure 23C:
FIG. 23C is a schematic diagram of a high-definition image block according to an embodiment of this application.

For example, as shown in FIG. 23B, the cloud server 200 may obtain, through the image registration process shown in FIG. 22, a high-definition reference image 2331 corresponding to the image block 2131. The cloud server 200 may input the image block 2131 and the high-definition reference image 2331 into the super-resolution network algorithm model, and fuse high-frequency detail information in the high-definition reference image 2331 into the image block 2131 to obtain a high-definition image block 2332 shown in FIG. 23C.

S2009: The cloud server 200 stitches the N high-definition image blocks to obtain a high-definition output image.

After obtaining the high-definition image blocks corresponding to each image block, the cloud server 200 may stitch, based on a location of the image block in the low-definition image, the high-definition image blocks corresponding to each image block, to obtain the high-definition output image.

In some embodiments, because detail restoration is not performed on some types of image blocks, the cloud server 200 may directly stitch the image blocks on which detail restoration is not performed and another high-definition image block obtained after detail restoration, to obtain the high-definition output image.

For example, the cloud server 200 does not perform detail restoration on the image blocks of the types "sky" and "ground" in the low-definition image, and performs detail restoration on the image block of the type "building" in the low-definition image. Therefore, the cloud server 200 may stitch the image blocks of the types "sky" and "ground" in the low-definition image and a high-definition image block corresponding to the image block of the type "building", to obtain a high-definition output image.

S2010: The cloud server 200 sends the high-definition output image to the terminal 100.

S2011: The terminal 100 displays the high-definition output image.

The high-definition output image may also be referred to as a third image or an image C in the foregoing embodiment.

For an occasion on which the terminal 100 displays the high-definition output image and an application interface, refer to the foregoing interface interaction embodiments. Details are not described herein again.

In some embodiments, before step S2004, the cloud server 200 may first obtain a first image processing model by performing matching by using the photographing information (which may also be referred to as first environment information in the foregoing embodiment) of the low-definition image (which may also be referred to as a first image or an image A in the foregoing embodiment), perform optimization processing on the low-definition image, and sequentially perform subsequent step S2004 to step S2009 on a low-definition image obtained after the optimization processing. For a matching process of the first image processing model and optimization processing performed on the low-definition image by using the first image processing model, refer to the embodiments shown in FIG. 8 to FIG. 11. Details are not described herein again.

According to the image processing method provided in this embodiment of this application, the following can be implemented: An image with a relatively small zoom ratio is segmented based on a zoom ratio that is similar to a zoom ratio of the high-definition image library on the cloud, the image is amplified to some extent, retrieval and matching are performed on the high-definition image library on the cloud, then image quality improvement is performed by using an image enhancement network that is based on a reference image, and final results are stitched into a super-definition image with higher resolution and higher definition. In this way, with the help of semantic information, an image is locally enhanced, and then overall stitching and fusion are performed to obtain a super-definition image with higher resolution, so that incorrect retrieval and matching in a case of lacking a feature information area are effectively resolved.

The following describes an image processing method provided in another embodiment of this application.

Figure 24A:
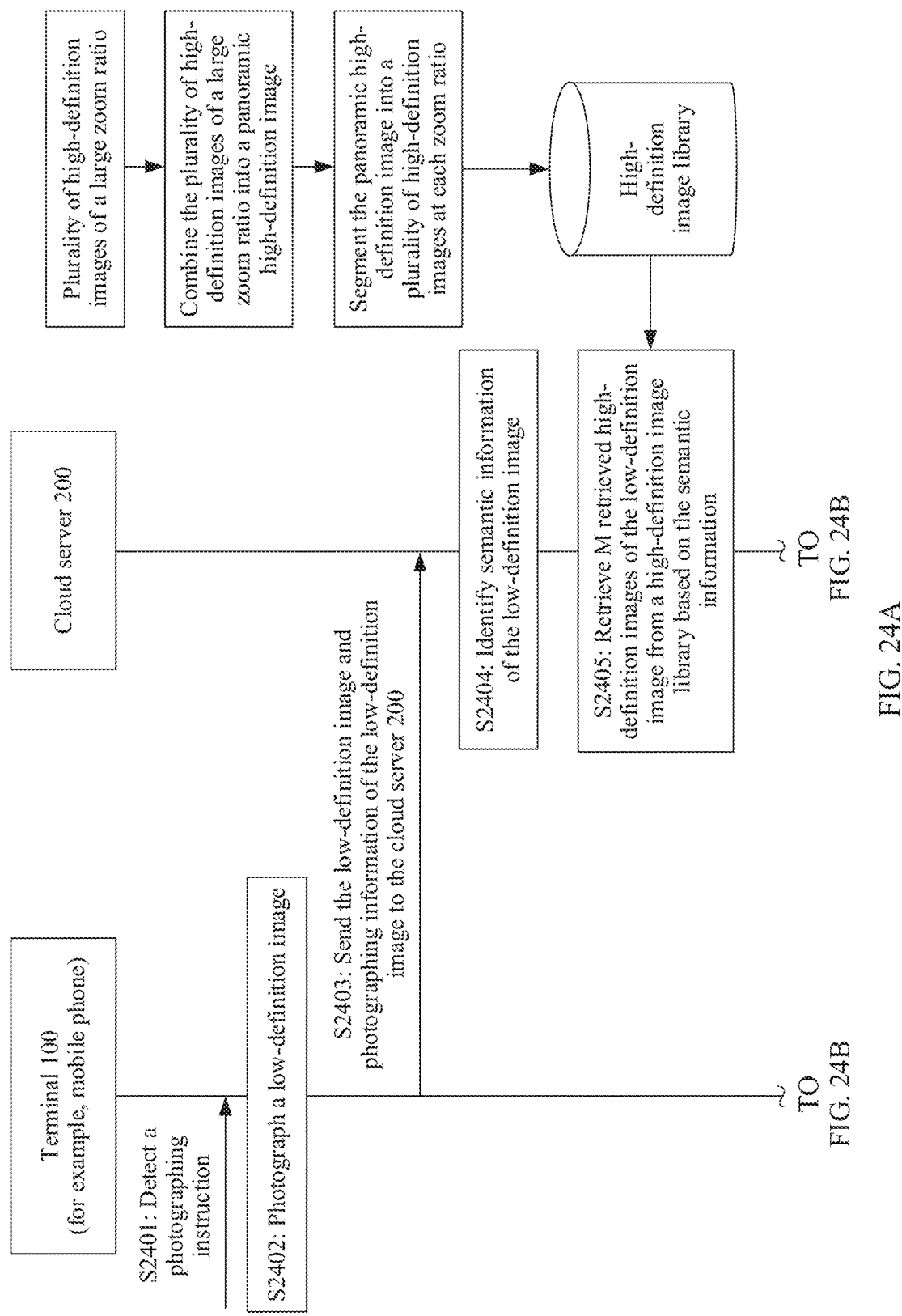

FIG. 24A and FIG. 24B are a schematic flowchart of an image processing method according to an embodiment of this application.

A high-definition image library may be configured on a cloud server 200. The high-definition image library may store a plurality of high-definition images and photographing information (which may also be referred to as second environment information in the foregoing embodiment) of the high-definition images. The photographing information of the high-definition image may include a zoom ratio and one or more of the following: geographic location information, weather information, season information, time information, a photographing parameter (for example, an aperture or exposure time), photographing posture information, and the like. When constructing the high-definition image library, a construction apparatus may obtain a plurality high-definition images of a large zoom ratio for a same photographed object at a same geographic location, and then the construction apparatus may combine the plurality of high-definition images of a large zoom ratio into a panoramic high-definition image based on correlation of image content. Then the construction apparatus may separately segment the panoramic high-definition image based on segmentation sizes corresponding to a plurality of zoom ratios, so that the panoramic high-definition image is segmented into a plurality of high-definition images at each zoom ratio. A larger zoom ratio indicates a smaller segmentation size and a larger zoom ratio of high-definition images obtained after the segmentation.

Figure 25A:
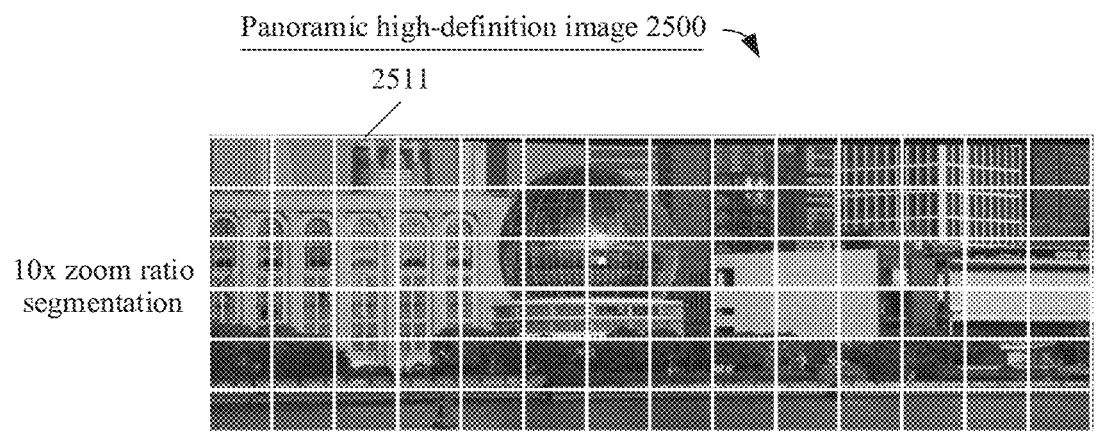
FIG. 25A is a schematic diagram of segmentation of a panoramic high-definition image according to an embodiment of this application.
Figure 25B:
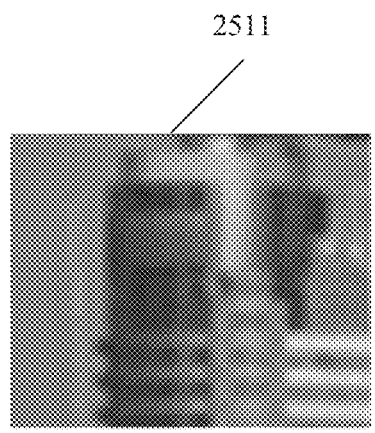
FIG. 25B is a diagram of an example of a high-definition image obtained by segmenting a panoramic high-definition image according to an embodiment of this application.
Figure 25C:
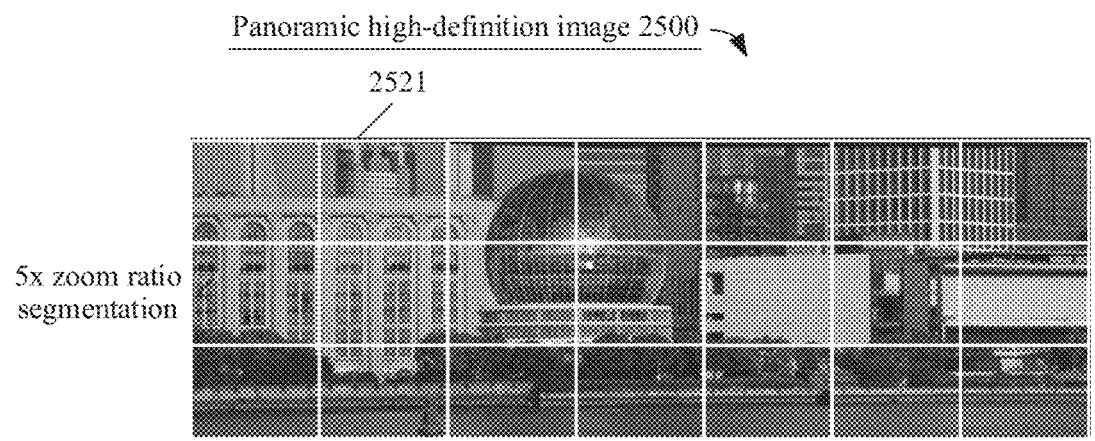
FIG. 25C is another schematic diagram of segmentation of a panoramic high-definition image according to an embodiment of this application.
Figure 25D:
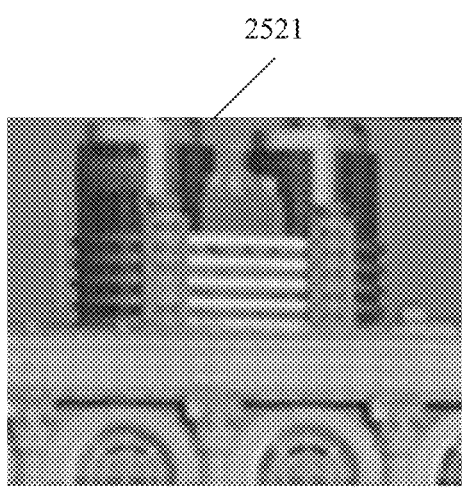
FIG. 25D is a diagram of an example of a high-definition image obtained by segmenting a panoramic high-definition image according to an embodiment of this application.

For example, as shown in FIG. 25A, the construction apparatus may stitch high-definition images of a large zoom ratio into a panoramic high-definition image 2500. The construction apparatus may separately segment the panoramic image 2500 at zoom ratios such as 5, 10, and 20, so that a plurality of high-definition images are obtained through segmentation at each zoom ratio. As shown in FIG. 25A, when the construction apparatus segments the panoramic high-definition image at the zoom ratio of 10, for a size of each high-definition image obtained through segmentation, refer to a high-definition image 2511 in FIG. 25B. As shown in FIG. 25C, when the construction apparatus segments the panoramic high-definition image at the zoom ratio of 5, for a size of each high-definition image obtained through segmentation, refer to a high-definition image 2521 in FIG. 25D. A larger zoom ratio used for segmentation of the panoramic high-definition image 2500 indicates a larger quantity of high-definition images obtained through segmentation and less image information included in each high-definition image. Both FIG. 25A and FIG. 25C show only segmentation of the panoramic image.

As shown in FIG. 24A and FIG. 24B, the image processing method may include but is not limited to the following steps.

S2401: A terminal 100 detects a photographing instruction.

For detailed content, refer to step S2001 in the embodiment shown in FIG. 20. Details are not described herein again.

S2402: The terminal 100 photographs a low-definition image after detecting the photographing instruction.

For detailed content, refer to step S2002 in the embodiment shown in FIG. 20. Details are not described herein again.

S2403: The terminal 100 sends the low-definition image and photographing information of the low-definition image to a cloud server 200.

For detailed content, refer to step S2003 in the embodiment shown in FIG. 20. Details are not described herein again.

S2404: The cloud server 200 identifies semantic information of the low-definition image.

For detailed content, refer to step S2004 in the embodiment shown in FIG. 20. Details are not described herein again.

S2405: The cloud server 200 retrieves T retrieved high-definition images of the low-definition image from a high-definition image library based on the semantic information.

Specifically, the cloud server 200 may retrieve, from the high-definition image library based on the semantic information of the low-definition image, T retrieved high-definition images whose content is similar to content of the low-definition image.

In some embodiments, the cloud server 200 may retrieve, from the high-definition image library based on the semantic information of the low-definition image and the photographing information of the low-definition image (which may also be referred to as first environment information in other embodiments), the T retrieved high-definition images whose content is similar to the content of the low-definition image. For a specific process in which the cloud server 200 performs image retrieval on an image block, refer to the foregoing embodiment shown in FIG. 18. Details are not described herein again.

S2406: The cloud server 200 performs registration on the T retrieved high-definition images of the low-definition image based on the semantic information and the low-definition image, to obtain T registered high-definition images of the low-definition image.

For a process of performing registration on the low-definition image by using the T retrieved high-definition images, refer to the foregoing embodiment shown in FIG. 22. Details are not described herein again.

S2407: The cloud server 200 performs restoration on the low-definition image based on the semantic information and the T registered high-definition images of the low-definition image, to obtain a high-definition output image.

For a process of performing registration on the low-definition image by using the T registered high-definition images, refer to the foregoing embodiment shown in FIG. 23A Details are not described herein again.

S2408: The cloud server 200 sends the high-definition output image to the terminal 100.

S2409: The terminal 100 displays the high-definition output image.

The high-definition output image may also be referred to as a third image or an image C in the foregoing embodiment.

For an occasion on which the terminal 100 displays the high-definition output image and an application interface, refer to the foregoing interface interaction embodiments. Details are not described herein again.

In a possible implementation, after performing registration on the T retrieved high-definition images of the low-definition image based on the semantic information and the low-definition image, to obtain the T registered high-definition images of the low-definition image, the cloud server 200 may send the T registered high-definition images to the terminal 100. The terminal 100 performs restoration on the low-definition image based on the T registered high-definition images of the low-definition image, to obtain the high-definition output image.

In this embodiment of this application, a panoramic image is constructed by performing stitching on the high-definition image library on the cloud server 200 by using a large quantity of high-definition images of a large zoom ratio, and then the panoramic image is segmented based on image sizes of different zoom ratios, to obtain high-definition images of the different zoom ratios. In this way, the cloud server 200 can retrieve, for a low-definition image photographed by the terminal 100, a high-definition reference image of a same or similar zoom ratio from the high-definition image library, so that an effect of performing detail restoration on the low-definition image by using the high-definition reference image is improved.

In conclusion, embodiments above are merely intended for describing the technical solutions of this application, but not for limiting this application. Although this application is described in detail with reference to embodiments above, persons of ordinary skill in the art should understand that they may still make modifications to the technical solutions described in embodiments above or make equivalent replacements to some technical features thereof, without departing from the scope of the technical solutions of embodiments of this application.

What is claimed is:

1. An image processing method implemented by a cloud server, wherein the image processing method comprises:

obtaining, from a terminal, a low-definition image and first photographing information that is for photographing the low-definition image, wherein the first photographing information comprises a first zoom ratio of the low-definition image;

identifying semantic information of the low-definition image;

determining based on a second zoom ratio of a high-definition image in a high-definition image library and the first zoom ratio, a quantity of N image blocks, wherein N is a positive integer;

segmenting, based on the quantity of N image blocks, the low-definition image into N image blocks;

marking, based on the semantic information, a type of image content in each of the N image blocks;

retrieving, from the high-definition image library, first T retrieved high-definition images matching first photographed content of a first-type image block in the low-definition image, wherein T is a positive integer;

performing, based on the first T retrieved high-definition images, a first detail restoration on the first-type image block to obtain a first-type high-definition image block, wherein a first resolution of the first-type high-definition image block is greater than a second resolution of the first-type image block;

replacing, based on the first-type high-definition image block, the first-type image block to obtain a high-definition output image; and sending, to the terminal, the high-definition output image.

2. The image processing method of claim 1, wherein the first photographing information further comprises one or more of geographic location information, weather information, season information, time information, a photographing parameter, or photographing posture information.

3. The image processing method of claim 1, further comprising:

determining, based on the first photographing information, at least one first matched image from the high-definition image library, wherein a degree of matching between second photographing information of the at least one first matched image and the first photographing information is greater than a first threshold, and wherein a third resolution of the at least one first matched image is greater than a fourth resolution of the low-definition image;

separately obtaining a first feature corresponding to each of the at least one first matched image and a second feature corresponding to the first-type image block, wherein one first matched image corresponds to one first feature or one second feature; and determining, from the at least one first matched image based on a first similarity between the first feature and the second feature, second T retrieved high-definition images comprising second photographed content similar to the first photographed content.

4. The image processing method of claim 3, further comprising:

determining, based on the first similarity, at least one second matched image comprising a third feature similar to the second feature;

separately obtaining a fourth feature corresponding to each of the at least one second matched image and a fifth feature corresponding to the first-type image block, wherein one second matched image corresponds to one fourth feature or one fifth feature; and determining, based on a second similarity between the fourth feature and the fifth feature, third T retrieved high-definition images comprising sixth features similar to the fifth feature, wherein the fourth feature, the fifth feature, and the sixth features are finer than the first feature, the second feature, and the third feature.

5. The image processing method of claim 1, further comprising:

obtaining an image spatial coordinate transformation parameter between the first-type image block and each of the first T retrieved high-definition images;

adjusting, based on the image spatial coordinate transformation parameter, a first feature point that is in each of the first T retrieved high-definition images and that matches a second feature point in the first-type image block to a same location as that in the first-type image block to obtain second T registered high-definition images; and performing, based on the second T registered high-definition images, a second detail restoration on the first-type image block to obtain the first-type high-definition image block.

6. The image processing method of claim 5, further comprising:

determining, from the first T registered high-definition images based on the image spatial coordinate transformation parameter, L high-definition reference images for which image spatial locations of matched feature point pairs are most similar, wherein L is a positive integer; and performing, based on the L high-definition reference images, a third detail restoration on the first-type image block to obtain the first-type high-definition image block.

7. The image processing method of claim 1, further comprising:

stitching second-type high-definition image blocks into the high-definition output image when the low-definition image comprises second-type image blocks; and stitching a third-type high-definition image block and a fourth-type high-definition image block into the high-definition output image when the low-definition image comprises a third-type image block and a fourth-type image block.

8. The image processing method of claim 1, wherein before segmenting the low-definition image into the N image blocks, the method further comprises:

determining, based on the first photographing information, an image processing model;

processing, using the processing model, the low-definition image to obtain a processed low-definition image; and segmenting, based on the quantity of N image blocks, the processed low-definition image into the N image blocks.

9. The image processing method of claim 8, further comprising processing, using the image processing model, a detail definition of the low-definition image, a dynamic range of the low-definition image, a contrast of the low-definition image, a noise of the low-definition image, or a color of the low-definition image.

10. A cloud server comprising:
a memory configured to store computer instructions; and
a processor coupled to the memory, wherein when executed by the processor, the computer instructions cause the cloud server to;

obtain, from a terminal, a low-definition image and first photographing information that is used for photographing the low-definition image, wherein the first photographing information comprises a first zoom ratio of the low-definition image;

identify, semantic information of the low-definition image;

determine, based on a second zoom ratio of a high-definition image in a high-definition image library and the first zoom ratio, a quantity of N image blocks, wherein N is a positive integer;

segment, based on the quantity of N image blocks, the low-definition image into N image blocks;

mark, based on the semantic information, a type of image content in each of the N image blocks;

retrieve, from the high-definition image library, first T retrieved high-definition images matching first photographed content of a first-type image block in the low-definition image, wherein T is a positive integer;

perform, based on the first T retrieved high-definition images, a first detail restoration on the first-type image block to obtain a first-type high-definition image block, wherein a first resolution of the first-type high-definition image block is greater than a second resolution of the first-type image block;

replace, based on the first-type high-definition image block, the first-type image block to obtain a high-definition output image; and send, to the terminal, the high-definition output image.

11. The cloud server of claim 10, wherein the first photographing information further comprises one or more of geographic location information, weather information, season information, time information, a photographing parameter, or photographing posture information.

12. The cloud server of claim 10, wherein when executed by the processor, the computer instructions further cause the cloud server to:

determine, based on the first photographing information, at least one first matched image from the high-definition image library, wherein a degree of matching between second photographing information of the at least one first matched image and the first photographing information is greater than a first threshold, and wherein a third resolution of the at least one first matched image is greater than a fourth resolution of the low-definition image;

separately obtain a first feature corresponding to each of the at least one first matched image and a second feature corresponding to the first-type image block, wherein one first matched image corresponds to one first feature or one second feature; and determine, from the at least one first matched image based on a first similarity between the first feature and the second feature, second T retrieved high-definition images comprising second photographed content similar to the first photographed content.

13. The cloud server of claim 12, wherein when executed by the processor, the computer instructions further cause the cloud server to:

determine, based on the first similarity, at least one second matched image comprising a third feature similar to the second feature;

separately obtain a fourth feature corresponding to each of the at least one second matched image and a fifth feature corresponding to the first-type image block, wherein one second matched image corresponds to one fourth feature or one fifth feature; and determine, based on a second similarity between the fourth feature and the fifth feature, third T retrieved high-definition images comprising sixth features similar to the fifth feature, wherein the fourth feature, the fifth feature, and the sixth features are finer than the first feature, the second feature, and the third feature.

14. The cloud server of claim 10, wherein when executed by the processor, the computer instructions further cause the cloud server to:

obtain an image spatial coordinate transformation parameter between the first-type image block and each of the first T retrieved high-definition images;

adjust, based on the image spatial coordinate transformation parameter, a first feature point that is in each of the first retrieved high-definition images and that matches a second feature point in the first-type image block to a same location as that in the first-type image block to obtain second T registered high-definition images; and perform, based on the second T registered high-definition images, a second detail restoration on the first-type image block to obtain the first-type high-definition image block.

15. The cloud server of claim 14, wherein when executed by the processor, the computer instructions further cause the cloud server to:

determine, from the first T registered high-definition images based on the image spatial coordinate transformation parameter, L high-definition reference images for which image spatial locations of matched feature point pairs are most similar, wherein L is a positive integer; and perform, based on the L high-definition reference images, a third detail restoration on the first-type image block to obtain the first-type high-definition image block.

16. The cloud server of claim 10, wherein when executed by the processor, the computer instructions further cause the cloud server to:

stitch second-type high-definition image blocks into the high-definition output image when the low-definition image comprises second-type image blocks; and stitch a third-type high-definition image block and a fourth-type high-definition image block into the high-definition output image when the low-definition image comprises a third-type image block and a fourth-type image block.

17. The cloud server of claim 10, wherein when executed by the processor, the computer instructions further cause the cloud server to:

determine, based on the first photographing information, an image processing model;

process, using the image processing model, the low-definition image to obtain a processed low-definition image; and segment, based on the quantity of N image blocks, the processed low-definition image into the N image blocks.

18. The cloud server of claim 17, wherein when executed by the processor, the computer instructions further cause the cloud server to process, using the image processing model, a detail definition of the low-definition image, a dynamic range of the low-definition image, a contrast of the low-definition image, a noise of the low-definition image, or a color of the low-definition image.

19. A computer program product comprising computer-executable instructions that are stored on a non-transitory computer-readable medium and that, when executed by a processor, cause a cloud server to:

obtain, from a terminal, a low-definition image and first photographing information that is used for photographing the low-definition image, wherein the first photographing information comprises a first zoom ratio of the low-definition image;

identify semantic information of the low-definition image;

determine, based on a second zoom ratio of a high-definition image in a high-definition image library and the first zoom ratio, a quantity of N image blocks, wherein N is a positive integer;

segment, based on the quantity of N image blocks, the low-definition image into N image blocks;

mark, based on the semantic information, a type of image content in each of the N image blocks;

retrieve, from the high-definition image library, first T retrieved high-definition images matching first photographed content of a first-type image block in the low-definition image, wherein T is a positive integer;

perform, based on the first T retrieved high-definition images, a first detail restoration on the first-type image block to obtain a first-type high-definition image block, wherein a first resolution of the first-type high-definition image block is greater than a second resolution of the first-type image block;

replace, based on the first-type high-definition image block, the first-type image block to obtain a high-definition output image; and send, to the terminal, the high-definition output image.

20. The computer program product of claim 19, wherein the first photographing information further comprises one or more of geographic location information, weather information, season information, time information, a photographing parameter, or photographing posture information.

* * * * *

UNITED STATES PATENT AND TRADEMARK OFFICE
CERTIFICATE OF CORRECTION

| | | |
|---|---|---|
| PATENT NO. | : 12,154,251 B2 | Page 1 of 1 |
| APPLICATION NO. | : 17/784342 | |
| DATED | : November 26, 2024 | |
| INVENTOR(S) | : Gang Chen et al. | |

It is certified that error appears in the above-identified patent and that said Letters Patent is hereby corrected as shown below:

On the Title Page

(72) Inventors: "Zhen Wang, Guangdong (CN)" should read "Zhen Wang, Shenzhen (CN)"

In the Claims

Claim 10, Column 78, Line 67: "cloud serve to;" should read "cloud serve to:"

Signed and Sealed this
Thirty-first Day of December, 2024

Derrick Brent
*Acting Director of the United States Patent and Trademark Office*